US012675971B2

(12) United States Patent
Yerebakan et al.

(10) Patent No.: US 12,675,971 B2
(45) Date of Patent: Jul. 7, 2026

(54) METHODS AND SYSTEMS FOR AUTOMATED FOLLOW-UP READING OF MEDICAL IMAGE DATA

(71) Applicant: Siemens Healthineers AG, Forchheim (DE)

(72) Inventors: Halid Yerebakan, Carmel, IN (US); Gerardo Hermosillo Valadez, West Chester, PA (US); Yoshihisa Shinagawa, Downingtown, PA (US); Simon Allen-Raffl, West Chester, PA (US); Mahesh Ranganath, Malvern, PA (US); Michael Rusitska, Utternreuth (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 159 days.

(21) Appl. No.: 18/565,238

(22) PCT Filed: Apr. 20, 2022

(86) PCT No.: PCT/EP2022/060437
§ 371 (c)(1),
(2) Date: Nov. 29, 2023

(87) PCT Pub. No.: WO2023/274599
PCT Pub. Date: Jan. 5, 2023

(65) Prior Publication Data
US 2025/0322641 A1 Oct. 16, 2025

(30) Foreign Application Priority Data

| Jun. 29, 2021 | (EP) | 21182340 |
| Jul. 27, 2021 | (EP) | 21188069 |
| Aug. 5, 2021 | (EP) | 21189986 |

(51) Int. Cl.
*G06V 10/75* (2022.01)
*G06T 7/00* (2017.01)
(Continued)

(52) U.S. Cl.
CPC .......... *G06V 10/757* (2022.01); *G06T 7/0014* (2013.01); *G06T 7/38* (2017.01);
(Continued)

(58) Field of Classification Search
CPC ............ G06V 10/757; G06V 30/1444; G06V 2201/03; G06T 7/38; G06T 7/0014; G06T 2207/20081
See application file for complete search history.

(56) References Cited

U.S. PATENT DOCUMENTS

| 2009/0067693 A1 | 3/2009 | Shinagawa et al. |
| 2009/0092300 A1 | 4/2009 | Jerebko et al. |

(Continued)

FOREIGN PATENT DOCUMENTS

| CN | 104346526 A | 2/2015 |
| JP | 2007279942 A | 10/2007 |

(Continued)

OTHER PUBLICATIONS

DICOM PS3.1 2020c standard.
(Continued)

*Primary Examiner* — Yuzhen Shen
(74) *Attorney, Agent, or Firm* — Harness, Dickey & Pierce, P.L.C.

(57) ABSTRACT

At least some example embodiments of methods and systems for generating display data of a medical image data set include identifying, for a target medical image series of a patient at a first point in time, a reference medical image series of the patient taken at a second point in time different from the first point in time. In particular, the selection may
(Continued)

be based on a comparison of respectively depicted body regions of the patient. Further, methods and systems may be directed to generating display data to cause a display device to display a rendering of the reference medical image series based on a registration between the target medical image series and the reference medical image series.

17 Claims, 21 Drawing Sheets

(51) Int. Cl.
*G06T 7/38* (2017.01)
*G06V 30/14* (2022.01)

(52) U.S. Cl.
CPC .................... *G06V 30/1444* (2022.01); *G06T 2207/20081* (2013.01); *G06T 2207/20084* (2013.01); *G06T 2207/30004* (2013.01); *G06V 2201/03* (2022.01)

(56) References Cited

U.S. PATENT DOCUMENTS

| | | | |
|---|---|---|---|
| 2011/0081066 A1 | 4/2011 | Jolly et al. | |
| 2012/0235679 A1 | 9/2012 | Xue et al. | |
| 2014/0003697 A1 | 1/2014 | Qian et al. | |
| 2015/0205917 A1* | 7/2015 | Mabotuwana | G16H 30/20 382/128 |
| 2016/0270753 A1 | 9/2016 | Kawamura | |

| | | | |
|---|---|---|---|
| 2016/0321427 A1 | 11/2016 | Bogoni et al. | |
| 2017/0046483 A1* | 2/2017 | Reicher | G06F 16/245 |
| 2018/0137244 A1 | 5/2018 | Sorenson et al. | |
| 2019/0005354 A1 | 1/2019 | Nakamura | |
| 2019/0005657 A1* | 1/2019 | Gao | G06V 10/758 |
| 2019/0392547 A1* | 12/2019 | Katouzian | G06N 3/0895 |
| 2021/0166406 A1 | 6/2021 | Sperl et al. | |
| 2022/0414883 A1 | 12/2022 | Shinagawa et al. | |
| 2023/0005136 A1 | 1/2023 | Yerebakan et al. | |
| 2023/0033783 A1 | 2/2023 | Shinagawa et al. | |
| 2023/0041553 A1 | 2/2023 | Shinagawa et al. | |

FOREIGN PATENT DOCUMENTS

| | | |
|---|---|---|
| JP | 2014512897 A | 5/2014 |
| JP | 2015080554 A | 4/2015 |
| JP | 2016174735 A | 10/2016 |
| JP | 2018183431 A | 11/2018 |
| JP | 2019010411 A | 1/2019 |
| KR | 20190105220 A | 9/2019 |

OTHER PUBLICATIONS

Yan K. et al.:"Self-supervised Learning of Pixel-wise Anatomical Embeddings in Radiological Images", arXiv:2012.02383v1 [cs.CV] Dec. 4, 2020, https://medical.sectra.com/product/sectra-anatomical-linking/.

Sectra Anatomical Linking "Find and synchronize points of interest in CT, MR and nuclear medicine images", https://medical.sectra.com/product/sectra-anatomical-linking/.

* cited by examiner

FIG 5

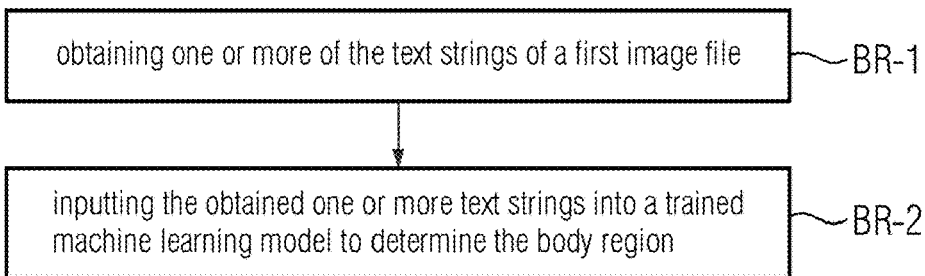

obtaining one or more of the text strings of a first image file —— BR-1 inputting the obtained one or more text strings into a trained machine learning model to determine the body region —— BR-2

FIG 6

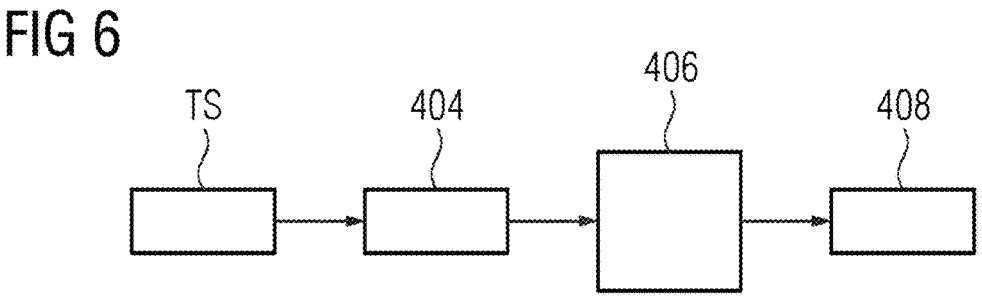

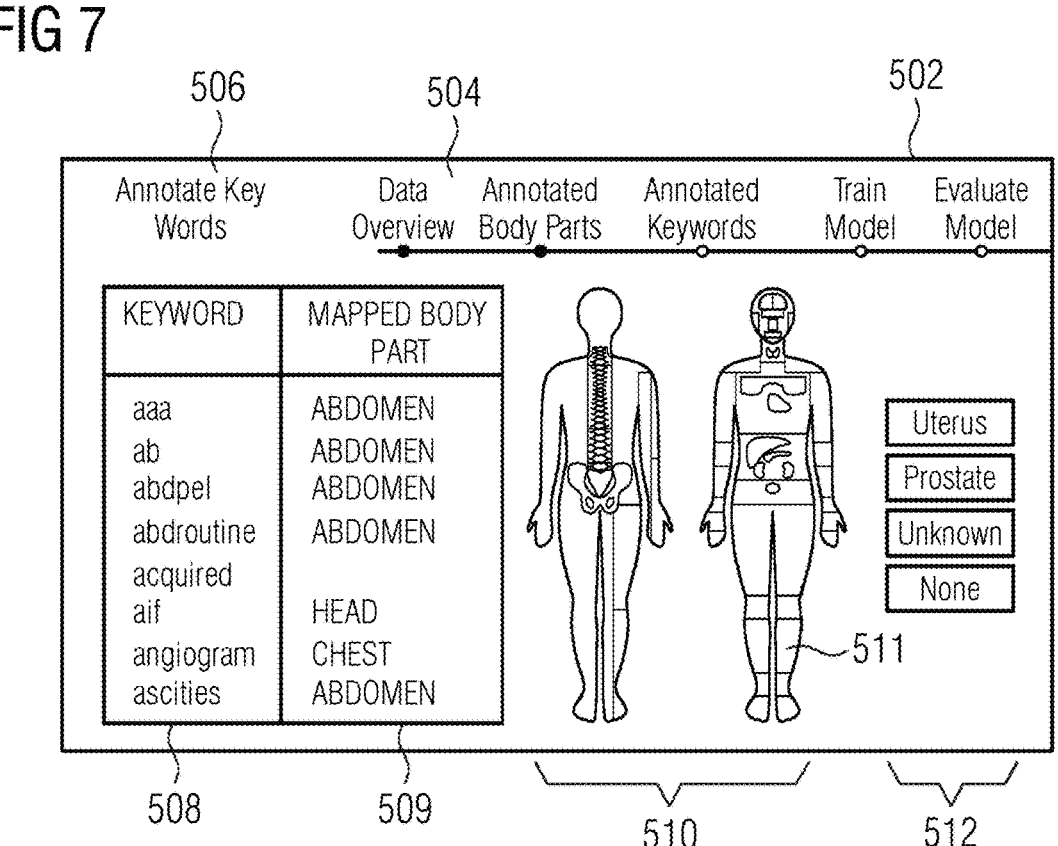

| 506 | 504 | 502 |
|---|---|---|

Annotate Key Words    Data Overview    Annotated Body Parts    Annotated Keywords    Train Model    Evaluate Model

| KEYWORD | MAPPED BODY PART |
|---|---|
| aaa | ABDOMEN |
| ab | ABDOMEN |
| abdpel | ABDOMEN |
| abdroutine | ABDOMEN |
| acquired | |
| aif | HEAD |
| angiogram | CHEST |
| ascities | ABDOMEN |

Uterus

Prostate

Unknown

None

511

508     509     510     512 comparing a first body region represented by first medical imaging data with second body regions represented by sets of second medical imaging data   —BR-3 selecting one or more sets of second medical imaging data as relevant to first medical imaging data based on the comparison of body regions   —BR-4

FIG 10

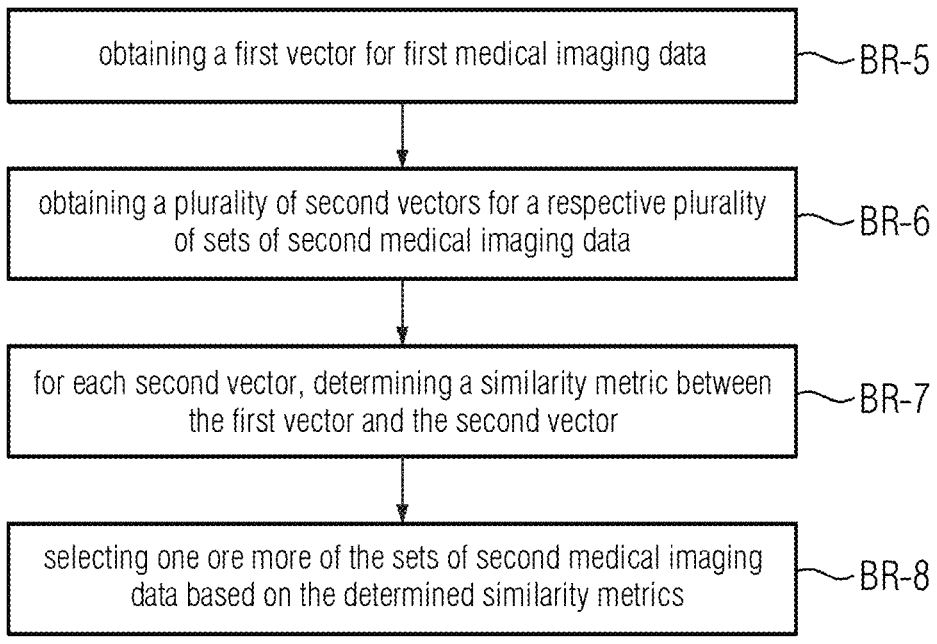

obtaining a first vector for first medical imaging data ~BR-5 obtaining a plurality of second vectors for a respective plurality of sets of second medical imaging data ~BR-6 for each second vector, determining a similarity metric between the first vector and the second vector ~BR-7 selecting one ore more of the sets of second medical imaging data based on the determined similarity metrics ~BR-8

FIG 11

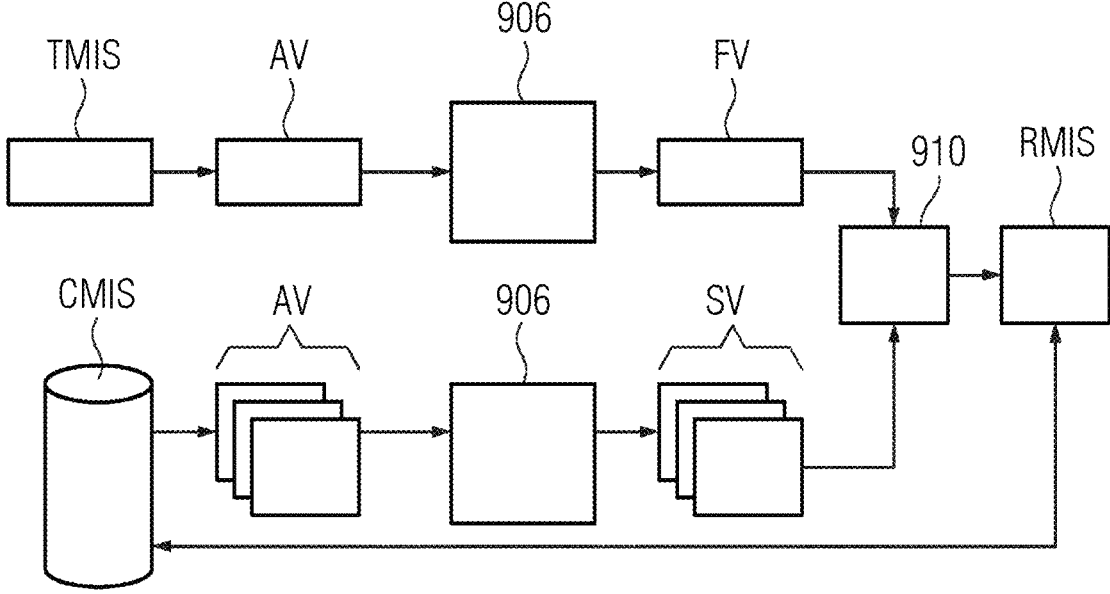

TMIS    AV    906    FV    910    RMIS

CMIS    AV    906    SV

TIMS

PM-774

PM-776

TMIS            RMIS obtaining a first portion of medical imaging data — RM-S12-1 determining a similarity metric between the first portion and each of a plurality of second portions of reference data — RM-S12-2 selecting a second portion based on the similarity metrics — RM-S12-3 annotating the first portion with words with which the selected second portion is annotated — RM-S12-4

TMIS

RM-210
RM-208
RM-206
RM-204
RM-202

1- grade I mucoid degradation of anterior horn of leteral meniscus   F1

2- acl mucoid degeneration   F2

3- intact pcl, with no abnormal signal   F3

...

RM-502     RM-504

RM-602 acl mucoid degeneration   RM-604

RM-702

Accept prior description
Interval increase
Interval decrease
No change
Edit description
Delete description

RM-704

TIS    LES    ROI

11

ML-43

ML-40

ML-44

ML-45

12

10

METHODS AND SYSTEMS FOR AUTOMATED FOLLOW-UP READING OF MEDICAL IMAGE DATA

PRIORITY STATEMENT

This application is the national phase under 35 U.S.C. § 371 of PCT International Application No. PCT/EP2022/060437 which has an International filing date of Apr. 20, 2022, which designated the United States of America, which claims priority under 35 U.S.C. § 119 to European Patent Application No. 21182340.6, filed Jun. 29, 2021, European Patent Application No. 21188069.5, filed Jul. 27, 2021 and European Patent Application No. 21189986.9, filed Aug. 5, 2021, the entire contents of each of which are hereby incorporated herein by reference.

FIELD

The present embodiments relate to medical image processing, such as image processing for x-ray images or magnetic resonance images or computed tomography images. Specifically, present embodiments relate to processing different medical image data sets of a patient to automatically identify image data sets taken at different time points for an ensuing comparison by a physician.

RELATED ART

Medical imaging, such as Magnetic Resonance Imaging (MRI), Computed Tomography (CT) and the like, is an invaluable tool for medical diagnosis. In clinical decision making, the progression of a patient's disease over time can be as, if not more, important to diagnosis than the current status of that disease. In order to help assess the progression of a patient's disease, medical professionals often wish to compare a target medical image of the patient with an appropriate reference medical image or series of medical images of the patient. In particular, the target medical image may be an image of a current study of the patient, while the reference medical image may an image from a previous study of the patient.

SUMMARY

However, there are often large of possible reference medical images for a patient, which may also be denoted as candidate medical images. For example, for any given patient, there may exist multiple previous studies taken at multiple previous times. Moreover, within each study, there may be multiple series of medical images each having different characteristics. Manually assessing the appropriateness of the previous medical images for comparison with, or otherwise their relevance to, the current medical image can be time consuming and burdensome for the medical professional. Further, the medical images are often stored in a storage remote from the medical professional's terminal and retrieving all of the prior medical images for a patient, which are often large in size, for the medical professional to assess is network resource intensive.

It is thus an object of embodiments herein described to provide systems and methods for automatically selecting medical images (e.g., previous or, in general, reference medical images) that are appropriate for comparison with or otherwise relevant to a given medical image (e.g., a current or, in general, target medical image).

This and other objects are solved by a method for generating display data, a corresponding system, a corresponding computer-program product, and a computer-readable storage medium according to the independent claims. Alternative embodiments are object of the dependent claims and aspects herein described.

BRIEF DESCRIPTION OF THE DRAWINGS

Characteristics, features and advantages of the above-described invention, as well as the manner they are achieved, become clearer and more understandable in the light of the following description of embodiments, which will be described in detail with respect to the figures. This following description does not limit the invention on the contained embodiments. Same components, parts or steps can be labeled with the same reference signs in different figures. In general, the figures are not drawn to scale. In the following:

FIG. 5 schematically depicts a method for determining a body region of a medical image study according to an embodiment;

FIG. 6 schematically depicts a data flow diagram between components according to an embodiment;

FIG. 7 is a schematic diagram illustrating a Graphical User Interface (GUI) according to an embodiment;

FIG. 10 schematically depicts a method for selecting a reference medical image series according to an embodiment;

FIG. 11 schematically depicts data flows between components in a method for selecting a reference medical image series according to an embodiment;

DETAILED DESCRIPTION

Figure 1:
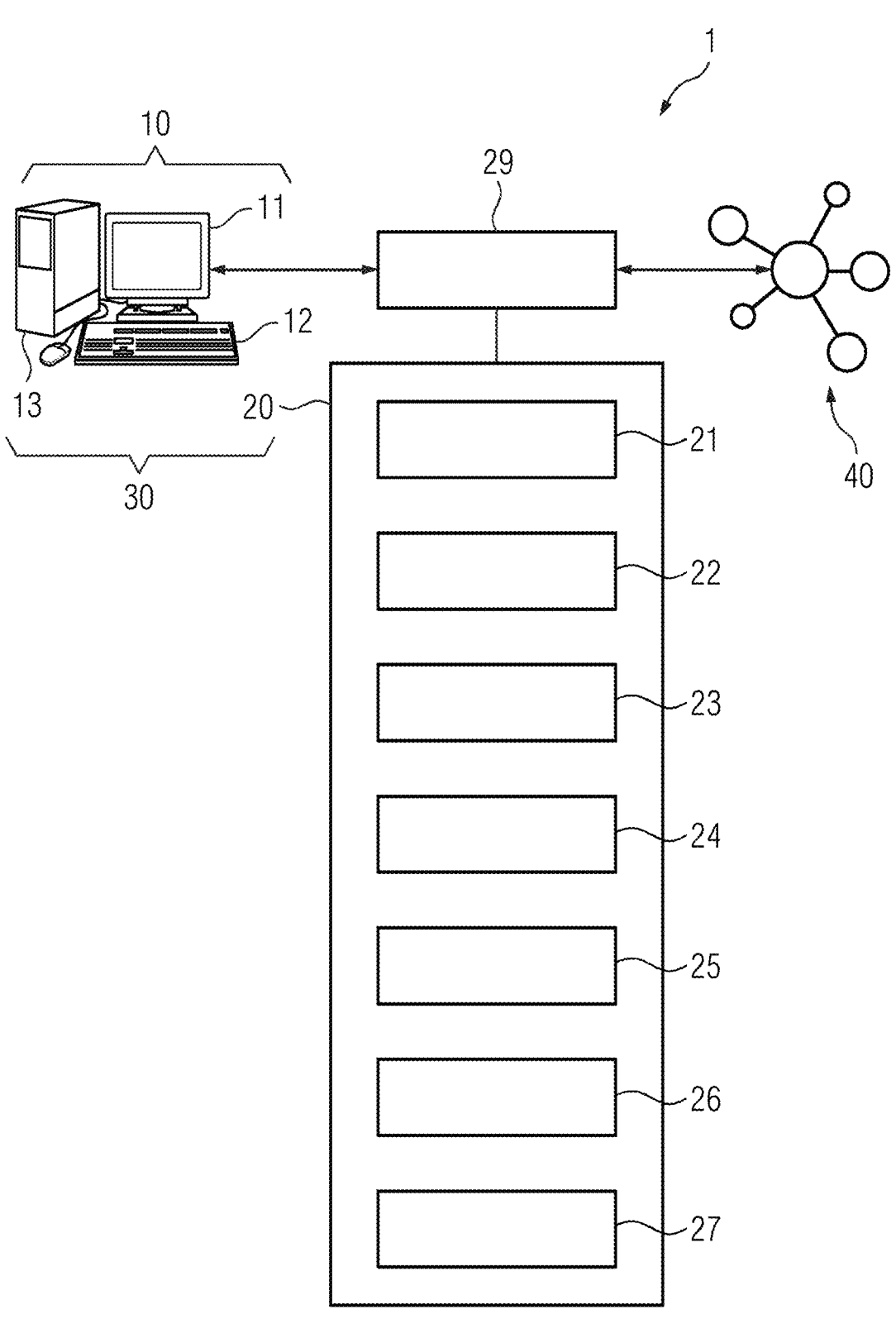
FIG. 1 schematically depicts an embodiment of a system for supporting evaluation of a target medical image series of a patient.

In the following, the technical solution according to the present invention is described with respect to the claimed apparatuses as well as with respect to the claimed methods. Features, advantages, or alternative embodiments described herein can likewise be assigned to other claimed objects and vice versa. In other words, claims addressing the inventive method can be improved by features described or claimed with respect to the apparatuses. In this case, e.g., functional features of the method are embodied by objective units or elements of the apparatus.

According to an aspect, a method for generating display data of a medical image data set is provided. The method comprises a plurality of steps. A first step is directed to receiving a target medical image series of a patient at a first point in time. A further step is directed to obtaining a region of interest of the target medical image series. A further step is directed to determining a target body region represented by the target image data series. A further step is directed to selecting a reference medical image study from a plurality of candidate medical image studies based on a comparison of the target body region with a plurality of candidate body regions, wherein each of the plurality of candidate body regions corresponds to one of the plurality of candidate medical image studies and each candidate medical image study comprises a plurality of candidate medical image series of the patient at a second point in time. A further step is directed to selecting, from the plurality of candidate medical image series of the reference medical image study, a reference medical image series based on a degree of comparability with the target medical image series. A further step is directed to performing a registration of the target medical image series and reference medical image series. A further step is directed to generating display data to cause a display device to display a rendering of the reference medical image series based on the region of interest and the registration.

In particular, a medical image series (i.e., the target medical image series, the candidate medical image series, the reference medical image series) may relate to one or more two-dimensional images. In particular, the medical image series can be three-dimensional images. In particular, the medical image series can be four-dimensional images, where there are three spatial and one time-like dimensions.

In particular, the type of the medical image series is related to the type of the medical imaging apparatus used for acquiring the medical image series. For example, a first X-ray image series and a second CT image series are comparable, even if they are recorded by different medical imaging apparatuses. In particular, two medical image series may be comparable if they correspond to the same anatomical region in the human body (body region). For example, a first X-ray image of a human lung and a second X-ray image of a human knee are not of comparable, even if they relate to the same patient and have been acquired with the medical image modality.

In particular, the type of a medical image series can be characterized by the modality used for creating the medical image and by the body region that is subject of the medical image series. Optionally, the type of the medical image can also be characterized by parameters (of the imaging modality) used for creating the medical image (e.g., there could be the distinction between a "low dose image" and a "high dose image").

The medical image series may respectively comprise image data, for example, in the form of an array of pixels or voxels. Such arrays of pixels or voxels may be representative of intensity, absorption, or other parameter as a function of three-dimensional position, and may, for example, be obtained by suitable processing of measurement signals obtained by a medical imaging modality.

A medical image series can be identical with or encapsulated in one or more image data files, in particular DICOM files. Whenever DICOM is mentioned herein, it shall be understood that this refers to the "Digital Imaging and Communications in Medicine" (DICOM) standard, for example according to the DICOM PS3.1 2020c standard (or any later or earlier version of said standard).

"Receiving" may mean that the target medical image series is acquired from the medical imaging modalities. Further "receiving" may mean that they are acquired from an appropriate memory such as a picture archiving and communication system (PACS) or any other suitable medical image storing facility.

The target medical image series may relate to an examination of the patient at a first time (first instance of time), while candidate medical image series of candidate studies may relate to an examination of the patient at a second time (second instance of time) different than the first time. The second time may be hours, days, weeks, months, or years after or before the first time. Further, there may be intervening scans or procedures between the first time and the second time.

One or more medical image series may be associated to a corresponding medical image study. In other words, a medical image study may comprise a plurality of different medical image series. The medical image series comprised in a medical image study may differ in their respective type. For instance, medical image series of a medical image series may be acquired with different modalities and/or with different parameters used for creating the medical image series. For instance, a medical image study may comprise different MRI medical image series that have been acquired with different MRI imaging parameters. For instance, one medical image series may be acquired in a T2 FLAIR setup, another medical image series may be a T1 series.

As the medical image series comprised in a medical image study represent a body region of the patient, it is possible to assign at least one body region to the medical image study. In particular, the medical image series comprised in a medical image study may (but do not necessarily have to) represent (at least roughly) the same body region of the patient.

Although the medical image series comprised in a medical image study inevitably are acquired at slightly different times, they may be seen as relating to the same instance in time for the follow-up reading workflow herein described. This is because time differences of a few minutes or even hours between the acquisition times of image series of a study still relate to the same state of a patient in a clinical sense.

In particular, the target medical study and the candidate medical image studies relate to the same patient. According to some implementations, the candidate medical studies may also relate to different patients than the patient of the target medical study. The latter case may permit to compare similar cases.

The region of interest represents an area within the target medical image series, which is of specific interest for the user analyzing the target medical image series. A region of interest may generally relate to the part of the target medical image series, the user is currently reviewing. This may relate to an image volume or an image plane. For instance, the region of instance may be an image slice of the target medical image series which may also be called "target slice". Further, the region of interest may be a part of an image slice of the target medical image series. As such, the region of interest may have an arbitrary shape, preferably the region of interest is of circular or quadratic form. In any case, a region of interest may be understood as a group of image elements like pixels or voxels within the target medical image series.

The region of interest may be defined by a user or semi-automatic or automatic by the computer-implemented method.

Thus, obtaining the region of interest may be based on processing one or more user inputs to designate the region of interest in the target medical image series. For instance, such user inputs may comprise scrolling to the target slice and/or defining a region of interest in the target slice.

Further, obtaining the region of interest may comprise automatically identifying an anatomical feature in the target medical image series wherein the anatomical feature is indicative of a pathological condition of a patient. In particular, this may involve applying a detection function configured to identify anatomical features in medical image data to the target medical image series.

A body region may relate to the body part of the patient depicted in an image series. Accordingly, the body region of a medical image study may represent the body parts of the patient depicted in the image data associated to the medical image study. As such, the body region is not a rigid descriptor of the anatomy of the patient spanned by the image data, e.g., in the form of anatomic coordinates, but rather a superordinate or coarse descriptor of the image data contents of a study. For instance, the body regions of individual medical image series of a study may be aggregated to derive a body region for a medical image study. According to some implementations, the body region may be a range of normalized or generalized coordinates for the anatomy of patients. In particular, these normalized or generalized coordinates may be defined along the craniocaudal or longitudinal axis of humans/patients.

Target and candidate body regions may be determined based on image data and non-image data associated with the respective medical image study. In particular, meta-data of a medical image study indicating the contents of a medical image study may be evaluated for determining target and candidate body regions.

A degree of comparability may be indicative how well two different medical image data series can be compared by a user. In particular, a degree of comparability of two medical image data series may be based on the respective types of the two medical image data series. Thereby, the type of a medical image series can be, as mentioned, characterized by the modality used for creating the medical image series, by one or more imaging parameters used for creating the medical image series, and/or by the body region that is subject of the medical image series.

Accordingly, the step of selecting a reference medical image series from the candidate medical image series of the reference medical image study may comprise determining, for each candidate medical image series, a degree of comparability with the target medical image series, wherein determining a degree of comparability may be based on comparing a type of the target medical image series with a type of a respective one of the candidate medical image series.

Performing a registration between the target medical image series and reference medical image series, according to some examples, may in general comprise registering a target image of the target medical image series (e.g., the region of interest or the target slice) with a reference image of the reference medical image series (e.g., in the form of a reference slice).

According to some examples, this may be based on an evaluation of image data similarities and/or finding corresponding locations as further described elsewhere herein. According to other examples, this may comprise obtaining a deformation field between the target medical image series and the reference medical image series that determines a relationship between the coordinate systems of the target medical image series and the reference medical image series such that each anatomical location in the target medical image series is mapped to the same anatomical location in the reference medical image series and vice versa. Thus, the deformation field may comprise a plurality of individual displacement vectors respectively associated with the pixels/voxels of the target image and the reference image.

According to some examples, the registration may comprise a rigid registration. A rigid registration may comprise a registration in which the coordinates of pixels/voxels in one image are subject to rotation and translation in order to register the image to another image. According to some examples, the registration may comprise and affine registration. An affine registration may comprise a registration in which the coordinates of data points in one image are subject to rotation, translation, scaling and/or shearing in order to register the image to another image. Thus, a rigid registration may be considered to be a particular type of affine registration. According to some examples, the registration may comprise a non-rigid registration. A non-rigid registration may provide different displacements for each pixel/voxel of the image to be registered and can, for example, use non-linear transformations, in which the coordinates of pixels/voxels in one image are subject to flexible deformations in order to register the image to another image. Non-linear transformations may, according to some examples, be defined using vector fields such as warp fields, or other fields or functions, defining an individual displacement for each pixel/voxel in an image. For more detailed information about image registration, reference is made to US 2011/0 081 066 and US 2012/0 235 679. Rigid image registration is very effective in cases when no anatomic change or deformations are expected. In comparison to rigid image registration, non-rigid image registration has a significantly greater flexibility as non-rigid image registrations can manage local distortions between two image sets (e.g., anatomical structure changes) but can be more complex to handle.

Providing a rendering based on the registration and the reference medical image series may, in particular, comprise identifying, based on the registration, those image data portions of the target medical image series which correspond to the region of interest, wherein the rendering is based on the thus identified image data portions of the target medical image series.

According to some examples, the rendering may be such that the region of interest is displayed in conjunction with the identified image data portions of the target medical image series.

The method of this aspect allows for a stepwise and directed selection and presentation of reference medical image data for a user that were captured in a way that they are readily comparable with the target medical image series. This may provide for efficient selection of previous medical images appropriate for comparison with a target medical image, for example as compared to opening and assessing all of the previous medical images for the patient. Moreover, the selection being based on body regions of the respective image studies allows for selection without having to extract or analyze the medical imaging data itself, and hence may allow for efficient selection. Moreover, the selection being based on body regions and degrees of comparability may allow for a flexible selection. For example, the comparison of body regions may be more robust and/or flexible with respect to non-exact matches between parameters, e.g., as compared to attempting to match the imaging coordinates directly.

According to an aspect, the target medical image study and each of the candidate medical image studies are respectively comprise one or more attributes each having an attribute value comprising a text string indicating content of the medical image study. Then, the step of determining the target body region may comprise obtaining one or more of the text strings of the target medical image study, and inputting the obtained one or more text strings into a trained machine learning model, the machine learning model having been trained to output a body region based on an input of one or more such text strings, and obtaining the output from the trained machine learning model thereby to determine the body region represented by the target medical image study. Further, at least one of the candidate body regions may be determined by obtaining one or more of the text strings of the candidate medical image study, and inputting the obtained one or more text strings into a trained machine learning model, the machine learning model having been trained to output a body region based on an input of one or more such text strings, and obtaining the output from the trained machine learning model thereby to determine the body region represented by the target medical image study.

In general, a trained machine learning model mimics cognitive functions that humans associate with other human minds. In particular, by training based on training data, the trained machine learning model is able to adapt to new circumstances and to detect and extrapolate patterns. Other terms for trained machine learning model may be trained function, trained mapping specification, mapping specification with trained parameters, function with trained parameters, algorithm based on artificial intelligence, or machine learned algorithm.

In general, parameters of a trained machine learning model can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning model can be adapted iteratively by several steps of training.

In particular, a trained machine learning model can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network or a convolutional deep neural network. Furthermore, a neural network can be an adversarial network, a deep adversarial network and/or a generative adversarial network.

According to some implementations, the machine learning model may be trained to output the body region in the form of a range of normalized or generalized coordinates for the anatomy of patients. In particular, these normalized or generalized coordinates may be defined along the craniocaudal or longitudinal axis of humans/patients.

Attributes and attribute values may generally relate to non-image data or meta-data associated with the respective medical image studies. Attribute values may be stored in the image data files of the respective medical image studies or separate therefrom. In particular, attribute values may also be stored in the electronic medical health record of the patient.

Attributes and attribute values may provide additional information with regard to the image data such as the body parts examined, the imaging modalities and protocols used and/or findings or annotations reported or created by a user and so forth. Further, non-image data may comprise information not directly related to the image data such as personal information of the patient such as gender, age, weight, insurance details, information about the treating physician and so forth.

According to an aspect, each of the medical image studies is associated with one or more DICOM image files, and the one or more attributes having attribute values comprising text strings indicating content of the medical imaging data thereof comprise one or more of the DICOM attributes 'Study Description', 'Series Description' and 'Body Part Examined'.

Determining the body region based on text strings extracted from medical image study attributes may be less resource intensive and hence more efficient than, for example, determining the body region by extracting and analyzing the medical imaging data itself (which is relatively large in terms of bits). In cases where the candidate medical image series are stored remotely over a network from a processing device configured to perform the methods herein described, determining the body region based on the (relatively small) text strings allows that the (relatively large) medical imaging data need not be transmitted over the network in order to determine the body region represented thereby, hence making efficient use of network resources.

Determining the body region by inputting the text strings into a trained machine learning model (e.g., trained neural network) may provide for efficient, flexible and/or robust determination of the body region, for example as compared to determining the body region by applying hard coded rules to the text strings. For example, hard coded rules require an exact match of the text string to a rule in order to provide a body region (and hence are inflexible with respect to text strings for which a match can be determined and/or are inefficient in the exhaustive nature of the set of rules needed to be coded for all possible text strings that could be used). On the other hand, a trained machine learning model (e.g., a trained neural network) generalizes from a training data set on which it is trained, and hence is both relatively efficient to obtain and is able to determine an appropriate body region even for text strings different from those in the training data set, and hence is relatively flexible/robust.

According to an aspect, the trained machine learning model is a trained neural network comprising a trained character-based neural network, in particular, a character-based recurrent neural network configured to take as input individual characters of the obtained one or more text strings, whereby inputting the obtained one or more text strings into the trained neural network comprises inputting individual characters of the obtained one or more text strings into the trained character-based neural network.

A benefit of character-based language models is their small vocabulary and flexibility in handling any text strings and other document structure. This is beneficial for medical applications, where attribute values are oftentimes not standardized between different medical institutions.

According to an aspect, the trained neural network is configured to output the body region in the form of one or more numerical values, representing a region of a human body, that an output portion of the trained neural network has calculated for the input one or more text strings.

Outputting the body region as one or more numerical values may allow for a precise and/or flexible determination of the body region represented by the medical imaging data of the respective medical image study. For example, the numerical values are continuous and hence may be able to define a body region more precisely and with more flexibility for example as compared to use of a limited set of predefined classes. This may, in turn, allow for flexible and/or precise comparison of body regions.

According to an aspect, the trained neural network is configured to output the body region in the form of a selection of a body region from a list of predefined body regions. This may have the advantage that the variability of results is reduced and with the medical image studies being mapped onto a set of predefined body regions a clearer association may be provided.

According to an aspect, the neural network is based on a training data set comprising a plurality of training text strings, each training text string being from an attribute value of an attribute of the medical image data file and indicating content of a medical image study associated with the medical image data file, each of the plurality of training text strings being labelled with a body region to which the training text string corresponds, the label being used as ground truth in the training of the neural network.

According to an aspect, the training data set has been generated using a Graphical User Interface, GUI, configured to: present one or more of the training text strings and a representation of a human body divided into selectable body regions to a user; and for each of the one or more presented training text strings, receive a user input selecting a body region from the representation, and label the training text string with a label indicating the selected body region.

According to an aspect each of the target and candidate image data series are associated with one or more attributes each having an attribute value indicative of an imaging parameter used to capture the respective medical imaging data series and the degrees of comparability are based on determining a correspondence of one or more attribute values between the target medical image series and a respective one of the plurality of candidate medical image data series.

According to an aspect, each of the medical image series is associated with one or more DICOM image files, and the one or more attributes having attribute comprising text strings indicating an imaging parameter used to capture the respective medical imaging data series.

The above aspect may allow for the selection of one or more reference medical image series that were captured using the same or similar imaging parameters as the image data of the target medical image series. This may provide for efficient selection of previous medical images appropriate for comparison with a target medical image data, for example as compared to opening and assessing all of the previous medical images for the patient. Moreover, the selection being based on attribute values AV allows for selection without having to extract or analyze the medical imaging data itself and hence may allow for efficient selection.

According to an aspect determining a degree of comparability comprises obtaining, for the target medical image series, a first feature vector, obtaining, for the respective one of the candidate medical image series comprised in the reference medical study, a second feature vector, and determining a comparability metric indicative of the degree of comparability between the first feature vector and the respective second feature vector of the candidate medical image series.

A feature vector may generally be conceived as a descriptor representing or characterizing the underlying medical image series. A feature vector as herein described may be based on image data and non-image data associated with a medical image series. In particular, a feature vector may be based on one or more attribute values.

In some examples, a feature vector may be determined by encoding image data and non-image data associated with the respective medical image series using a particular encoding algorithm (also referred to as "vectorizer)". Features of a feature vector may be visual features, such as a visual manifestation of a medical abnormality, a pattern, an anatomy, a medical landmark and so forth as indicated by the image of the respective medical image series. Further, a feature vector may comprise non image features, for instance relating to the imaging modality or imaging parameters used. Feature vectors may be calculated on-line, e.g., upon the selection of the reference medical image study. Alternatively, feature vectors may be held available as—pregenerated data items stored in a database, e.g., in association with the candidate medical image studies.

According to some examples, the degrees of comparability may be calculated by applying a metric ("comparability metric") representing how similar or comparable a candidate medical image series is with the target medical image series. Another expression for comparability metric may be similarity metric or distance metric. In some examples, the comparability metric may be configured to quantify a distance in vector or feature space between first and second feature vectors. According to some examples predetermined mathematical functions may be used to calculate such a distance such as the cosine similarity or the Euclidean distance and so forth. According to other examples, the comparability metric may comprise a learned metric which has been derived by machine learning. According to some implementations, the extraction of the feature vectors and/or the evaluation of a similarity metric as whole may be performed by one or more trained functions.

According to an aspect the target medical image series and the reference medical image series are associated with one or more attributes each having an attribute value indicative of an imaging parameter used to capture the medical imaging data of the image file, wherein the first feature vector is obtained based on the on one or more of the attribute values indicative of an imaging parameter used to capture the target medical image series, and the second feature vector is obtained based on the one or more of the attribute values indicative of an imaging parameter used to capture the respective one of the candidate medical image series.

According to an aspect, the step of determining a degree of comparability comprises inputting the target medical image series and the reference medical image series into a trained function configured to determine a degree of comparability of two medical image data series for follow-up reading.

In particular, the trained function may comprise a neural network. Thereby, a first group of neural network layers may be applied to extract first and second feature vectors. The feature vectors may be fed as input values to a second group of network layers which serve to determine a degree of comparability based on the extracted features vectors. However, both functions of the described neural network may likewise be carried out by separated, individual neural networks. In other words, image analysis for feature vector extraction can be carried out by a first neural network, and classification according to comparability can be carried out by a second neural network.

The selection of corresponding series being based on feature vectors may allow for a flexible selection. For example, the comparison of feature vectors in the feature space may be more robust and/or flexible with respect to non-exact matches between parameters, e.g., as compared to attempting to match the imaging parameters directly.

According to an aspect, first and second feature vectors comprise an indication of the imaging modality of target and candidate medical image data series, and the comparability metric comprises an imaging modality relevance score between the imaging modality of the medical image data series and the imaging modality of the respective one of the candidate medical image data series.

The imaging modality relevance score between two modalities may be a value representing the degree to which medical imaging data captured using one modality is relevant to (i.e., appropriate, or useful for comparison with) medical imaging data captured using another modality. In some examples, the imaging modality relevance score If two of the candidate medical image series both had the same body region as the target medical image series, but one series was captured using MR, but another set was captured using CT, the set that was captured using MR may be selected in preference.

The consideration of the modalities used for capturing the respective medical image data series further improves the comparability of the selected reference medical image series.

According to an aspect, the imaging modality relevance score factors in a probability that, given a first medical image series associated with a particular first imaging modality, a user will select for comparison with the first medical image series a second medical imaging series having a particular second imaging modality, the probability being based on statistical analysis of logged selections of the user on previous occasions.

The imaging modality relevance scores being based on statistical analysis of actual user interaction with the medical imaging data may help ensure that second medical imaging data of an appropriate modality is selected.

Further, user interactions may also be used for an online (ad hoc) automatic update of the behavior of the system.

According to an aspect, the reference medical image series depicts a reference image volume (which may be the body region represented by the reference medical image series). Then, the method further comprises a step of obtaining a plurality of candidate slices respectively depicting a certain section of the reference image volume. Further, the step of performing the registration comprises identifying, from the plurality of candidate slices, at least one reference slice based on degrees of image similarity between the image data comprised in the region of interest and individual candidate slices, and the step of generating display data comprises generating display data to cause the display device to display a rendering of the reference slice.

In some examples, the plurality of slices may represent a subset of the slices comprised in the reference medical image series. According to other examples, the plurality of slices may relate to all of the slices comprised in the reference medical image series.

A degree of image similarity may measure how similar image data is between two medical images (here: the region of interest and slices of the reference medical image series).

Image data may be similar in terms of contrast, gradients, texture, density, distortion, singularities, patterns, landmarks, masks, anatomies displayed and so forth.

Identifying the reference slice may mean evaluating, for each of the plurality of candidate slices in the reference medical image series, an image similarity metric representing an image similarity between image data of the region of interest and the respective slice of the reference medical image series. Based on this evaluation, the slice or the slices having the greatest degrees of image similarity with the image data of the region of interest may be selected and identified. For instance, all slices having a degree of image similarity above a predetermined threshold may be selected. Alternatively, the slice with the highest degree of image similarity may be selected. The result of determining a similarity metric between two images may be a degree of image similarity between the images.

In other words, according to the aspect, one or more slices in the reference medical image series are automatically identified which correspond to the region of interest. This automatic retrieval is based on a quantification of the respective image similarity between the target image data (here: the region of interest) and the reference image data (here: the respective slices of the reference medical image series). With that, a tool is provided capable of automatically retrieving those slices in the reference medical image series which are relevant in view of the reference image data in the form of the region of interest. Accordingly, a physician no longer has to scroll through the reference medical image series by hand in order to track down relevant slices. Not only this brings about a considerable time saving, but also renders the process less error prone and improves reproducibility. The matching of slices in the different medical image studies is based on an evaluation of degrees of similarities between individual images. In comparison to other methods, this has the advantage of comparably fast processing times. Moreover, image similarities often still yield reasonable results in cases where other methods, methods based on classical image registrations, or the detection of anatomic landmarks are not applicable. This may be the case if the variations between individual slices are so huge that no registration is possible or if no landmarks can be detected. Hence, it also becomes possible to readily synchronize very different image data, which may, e.g., have been acquired using different imaging protocols or imaging modalities.

According to an aspect, the target medical image data series depicts a target image volume (which may be the body region represented by the target medical image series) and comprises a plurality of target slices respectively depicting a certain section of the target image volume. The step of performing the registration may thus comprise identifying, for each of a plurality of the target slices one corresponding candidate slice so as to determine a slice correspondence between the target medical image series and the reference medical image data series, with the degrees of similarity being respectively based on a similarity between an individual target slice and an individual candidate slice of the reference medical image series. The step of determining the at least one reference slice is then based on the slice correspondence.

In other words, the method thus unambiguously matches slices in the target medical image series with corresponding slices in the reference medical image series based on image similarity considerations. With that, the slices in the two different medical image series are synchronized. Accordingly, when scrolling through the target medical image series, the user can be automatically provided with the respectively corresponding slice of the reference medical image series and vice versa. Hence, the user is brought into a position to directly compare the target medical image series and the reference medical image series side-by-side. According to some examples, the result of such a matching step may be provided in the form of data association that unambiguously assigns each of a plurality of slices of the first medical data set to a corresponding slice of plurality of slices of the second medical image series (CMIS). Such association may be referred to as slice correspondence.

In cases where the identification of corresponding slices is ambiguous, the method may make use of auxiliary conditions to pinpoint corresponding slices. Such auxiliary conditions may be the respective slice order in the target medical image series and/or the reference medical image series and/or a measure of the overall similarity. Therefore, according to an aspect, the step of identifying, for each of a plurality of slices of the target medical image series, one corresponding slice of the reference medical image series may additionally be based on the slice order in the target medical image series or the reference medical image series and/or may additionally be performed under the condition that (such that) the overall degree of image similarity is maximized. In this regard, the overall degree of image similarity may be the cumulative image similarity (the sum of the individual degrees of image similarity) between the corresponding slices of the target medical image series and the reference medical image series. The slice order can be conceived as the natural sequence of slices as determined by the imaging process or simply the anatomy of the patient.

According to an aspect, the step of performing the registration comprises determining an offset in the slice numbering between the target medical image series and the candidate medical image series based on the slice correspondence the step of determining the at least one reference slice is based on the offset.

With the determination of the offset, an easy way to register the target medical image series and the reference medical image series with one another may be provided. With that, when scrolling through the target medical image series, the user can be automatically provided with the respectively corresponding slice of the reference medical image series and vice versa.

According to an aspect, the step of performing the registration comprises extracting at least an image descriptor from the target medical image series. Further, it comprises respectively extracting a corresponding image descriptor from each of a plurality of candidate slices. Thereby, the degrees of image similarity are respectively based on a comparison between the extracted image descriptor of the target medical image series and the image descriptors of the candidate slices.

In some examples, an image descriptor may be a vector representing or characterizing the underlying image data of either the region of interest or the slices of the reference medical image series. In some examples, the image descriptor may be determined by encoding the region of interest or the respective slices of the reference medical image series using a particular image descriptor encoding algorithm. Features of the region of interest or the respective slices, such as a visual manifestation of a medical abnormality, a pattern, an anatomy, a medical landmark and so forth may be encoded in the respective image descriptor.

According to some examples, the degrees of image similarity may be calculated by applying an image similarity metric representing how similar individual image descriptors are. In some examples, the image similarity metric may be configured to quantify a distance in feature space between the image descriptor of the region of interest and the image descriptor of a respective one of the slices of the reference medical image series. According to some examples, predetermined mathematical functions may be used to calculate such a distance such as the cosine similarity or the Euclidean distance and so forth. According to other examples, the image similarity or distance metric may comprise a learned metric which has been derived by machine learning. According to some implementations, the extraction of the image descriptors and/or the evaluation of an image similarity metric as whole may be performed by one or more trained functions.

The selection of corresponding image data being based on image descriptors may allow for a flexible selection. For example, the comparison of image descriptors in the feature space may be more robust and/or flexible with respect to non-exact matches between parameters, e.g., as compared to attempting to rigid or non-rigid image registrations.

According to an aspect, the method further comprises extracting an image descriptor from each of a plurality of target slices wherein the degrees of similarity are respectively based on a comparison between the extracted image descriptors of the target and candidate slices.

According to an aspect, the step of obtaining the plurality of candidate slices comprises resampling the candidate medical data set based on the target medical image data set to define the plurality of candidate slices in the reference medical image data set.

The resampling is equally applicable to medical image series already having slices defined therein and medical image data series more or less depicting an isotropic image volume without any defined slices. According to some examples, resampling may comprise defining slices in the reference medical image series such that the slices have a slice thickness corresponding to a slice thickness of the target medical image series. Additionally or alternatively, a stacking direction of the slices may be set or adapted such that it corresponds to the target medical image series. By resampling the reference medical image series, the reference medical image series may thus be adapted to the target medical image series. Thereby, the comparability of the two series may be improved yielding an overall better result in terms of the ensuing follow-up reading.

According to an aspect, the step of identifying the at least one reference slice comprises applying a trained function on the target and reference medical image data series, wherein the trained function is adapted to determine degrees of similarities between two-dimensional medical images. Optionally, the trained function further applies a learned metric to determine degrees of similarity between two-dimensional medical images, the trained function preferably comprising a deep metric learned network.

According to some examples, the trained function comprises a distance metric learning network and, in particular, a deep distance metric learning network.

Distance metric learning (or simply, metric learning) aims at automatically constructing task-specific distance or image similarity metrics from supervised data, in a machine learning manner. The learned distance metric can then be used to perform various tasks such as, in this case, the identification of similar image data. In comparison to the usage of preset distance metrics, learned distance metrics may have the advantage that the learned metric is better adapted to the particular data and task of interest.

Deep distance metric learning networks may additionally transform the data into a new feature space with higher discrimination power before a metric (either learned or standard) is applied. The feature space may be such that extracted image features that are semantically similar are mapped onto nearby locations while dissimilar image features are pushed apart using an appropriate distance metric.

According to some examples, the trained function comprises a Siamese network. According to further examples, the trained function may comprise a fully convolutional Siamese network.

A Siamese network is a type of neural network that learns to compare two inputs based on a distance or similarity metric such that inputs that are closer in some semantics get a lower distance in comparison to two inputs that are further apart according to the same semantics. The semantics that need to be captured is fed to the network implicitly during the training processes. The semantics can be conceived as the vector space of the image descriptors. Accordingly, the semantics determine which image descriptors are extracted. The semantics may be extracted using branches of sub-networks with identical structure and parameters. The extracted image descriptors may be seen as a representation of the learned semantic. In particular, a Siamese network may comprise a structure with two branches of sub-networks with identical structure and parameters.

Based on a fully convolutional Siamese network at least one convolution processing and at least one pooling processing may be executed on, e.g., a first slice of the first image data set, thus obtaining image features (or the image descriptor) of that first image slice. Further, at least one convolution processing and at least one pooling processing may be executed on, e.g., a second slice of the second image data set, thus obtaining image features (or the image descriptor) of that second image slice. The output image features (or image descriptors) after convolution processing and pooling processing may be one or more feature vectors or maps with the same size. Parameters in the convolution processing or the pooling processing, for example, the sizes and number of convolution kernels used for each convolution layer, or each pooling layer may be preconfigured via the training process of the fully convolutional Siamese network. In particular, also a fully convolutional Siamese network may comprise a structure with two branches of sub-networks with identical structure and parameters.

According to some examples, the trained function comprises a triplet network.

Triplet networks may be conceived as an extension of Siamese networks, as triplet networks may comprise three branches of the same feedforward network. When fed with three samples, the network outputs intermediate values in the form of a pair of distances. Thereby, one sample is taken as the reference (or anchor) against which the others are compared. The intermediate values are then fed into a comparator to determine an output. Rather than directly comparing data labels, the triplet network allows learning by comparison of samples which poses lower requirements to the training data and could enable the usage as an unsupervised learning model.

According to some examples, the trained function is trained using a triplet loss function.

A triplet loss function is a loss function for machine learning algorithms where a reference (anchor) input is compared to a positive (truthy) input and a negative (false) input. The distance from the baseline (anchor) input to the positive input is minimized, and the distance from the reference input to the negative input is maximized. Transferred to the present case, the positive input could be a slice with verified similarity to a given reference slice. The similarity can, for instance, be verified by a user or be due to an verified adjacency of the slice to the reference slice in an image study. The latter has the advantage that training data can be obtained rather easily. The negative input may for instance be a slice that is less similar to the reference slice than the positive input. In particular, the negative input may be a slice that is not related to the reference slice, e.g., a slice from a different series or patient. By enforcing such an order of similarities, triplet loss models embed (i.e., extract image descriptors) in a way that a pair of similar slices are smaller in distance (or have a higher degree of similarity) than dissimilar slices. One advantage of this approach is that triplet loss functions are very flexible in terms of the training data required.

As an alternative, also other loss functions may be used, such as contrastive loss functions which are computed by contrasting two or more degrees of similarity of slice pairs, or categorical cross-entropy loss functions.

According to an aspect, the trained function is configured to determine degrees of similarities between two-dimensional medical images by comparing a first candidate image to a target image and comparing a second candidate image to the target image, the target image being extracted from the target medical image series and the candidate images being extracted from the reference medical image series, and determining which one of the first and second candidate images has a higher degree of similarity to the target image.

According to an aspect, the step of performing the registration comprises determining, in the reference medical image series, a location corresponding to the region of interest. Specifically, this may comprise generating a first local image descriptor based on image data of the region of interest, generating a second local image descriptor for each of a plurality of candidate locations in the reference medical image series, each second local image descriptor being generated based on image data of the reference medical image series located relative to the respective candidate location, calculating, for each of the plurality of candidate locations, a local image similarity metric indicating a degree of local image similarity between the first local image descriptor and the second local image descriptor for the candidate location, selecting a candidate location from among the plurality of candidate locations based on the calculated local image similarity metrics, determining the location corresponding to the region of interest in the reference medical image series based on the selected candidate location. Further, in the step of generating display data, the rendering is generated based on image data of the reference medical image series relative to the set selected candidate location.

A local image descriptor may be a vector representing or characterizing the underlying image data of the region of interest of the target medical image series and the image data extracted from the reference medical image series relative to the candidate locations. In some examples, the local image descriptor may be determined by encoding the corresponding image using a particular image descriptor encoding algorithm. Features of the region of interest or the respective slices, such as a visual manifestation of a medical abnormality, a pattern, an anatomy, a medical landmark and so forth may be encoded in the respective local image descriptor. According to some examples, the local image descriptor may comprise a pattern descriptor characterizing one or more pattens of the underlying image data.

According to some examples, the degrees of local image similarity may be calculated by applying an local image similarity metric representing how similar individual local image descriptors are. In some examples, the local image similarity metric may be configured to quantify a distance in feature space between the local image descriptor of the region of interest and the local image descriptor extracted relative to the candidate locations in the reference medical image series. According to some examples, predetermined mathematical functions may be used to calculate such a distance such as the cosine similarity or the Euclidean distance and so forth. According to other examples, the local image similarity or distance metric may comprise a learned metric which has been derived by machine learning. According to some implementations, the extraction of the local image descriptors and/or the evaluation of an local image similarity metric as whole may be performed by one or more trained functions. According to some implementations, the local image similarity metric may be implemented as pattern similarity metric and the local image similarity may be a pattern similarity between image patterns associated with the respective locations.

Accordingly, a technique for determining the location at which a given pattern or feature of the region of interest is represented in reference medical image series is provided for. Specifically, a known location at which a given pattern or feature is represented in the target medical image series (i.e., the region of interest) is used to determine the location at which the given pattern or feature is represented in the reference medical image series. This may, for example, reduce the burden for a user in finding relevant locations in the reference medical image series RMIS. Moreover, this determination is based on determining the local image similarity provides for fast, efficient, and/or flexible feature location especially in cases where classical image registration is not feasible. In addition, determining the local image similarity allows for a robust, consistent and stable feature location that is less prone to human error.

According to an aspect, the candidate locations are locations distributed through the reference medical image series in a predefined sampling pattern. Basing the local image descriptor extraction on a predetermined distribution or sampling pattern allows for a holistic sampling of the reference medical image series.

According to an aspect, the step of performing the registration further comprises determining, based on the selected candidate location, a plurality of candidate sub-resolution-locations in the reference medical image series and obtaining a third local image descriptor for each of the plurality of candidate sub-resolution-locations in the reference medical image series. Thereby, each third local image descriptor is generated based on image data of the reference medical image series located relative to the respective candidate sub-resolution-locations. Then, for each of the plurality of candidate sub-resolution-locations, a local image similarity metric is calculated indicating a degree of local image similarity between the first local image descriptor and the third local image descriptor for the candidate sub-resolution-location. Then, a candidate sub-resolution-location is selected from among the plurality of candidate sub-resolution-locations based on the calculated local image similarity metrics indicating the degree of local image similarity between the first local image descriptor and the respective third local image descriptor. Then, the location corresponding to the region of interest in the reference medical image series is selected based on the selected candidate sub-resolution-location. Thereby, the candidate sub-resolution-locations are locations distributed through the reference medical image series in a sub-resolution sampling pattern in the region of the selected candidate location, wherein a distance between the candidate sub-resolution-locations in the sub-resolution predefined pattern is less than a distance between the candidate locations in the predefined sampling pattern.

Such a hierarchical method of two sampling patterns at different spatial resolutions may allow for the location corresponding to the region of interest to be accurately determined in a quick and efficient manner, even where no locations of any features in the reference medical image series are known.

According to an aspect, the candidate locations are defined based on a learned policy network implementing a learned policy to iteratively determine the next candidate location based on at least one of the previous candidate locations so as to parse the reference medical image series for the location corresponding to the region of interest in the reference medical image series.

Further, the learned policy network may be trained to output, in each iteration, a probability distribution p(a) corresponding to actions a for determining the next candidate location and the next candidate location is determined by sampling the probability distribution p(a).

Thereby, the learned policy network is configured to define one or more of the candidate locations based on a mapping of the location of the region of interest onto the reference medical image data set.

A policy network may be seen as a trained function following a certain learned policy for iteratively performing a plurality of actions in order to fulfill the learned task. The policy of the learned policy network may be defined as the ability to select a next action to select a candidate location to iteratively find a location corresponding to the region of interest such that the long-term reward is favored. In other words, the way how distinct actions are selected starting at a given state of the trained functions is called "policy". The learned policy network thus includes a policy for actions on how to find a location in the reference medical image series corresponding to the region of interest. Thereby, iterative repositioning steps may evolve the current estimate for the corresponding location according to the policy, eventually identifying the corresponding location in the reference medical image series. Implementing the learned policy network as policy networks thus may be seen as one embodiment of reinforcement learnt trained functions.

One consequence of breaking the problem of finding corresponding locations down into multiple iteratively performed steps is that traditional learning schemes such as supervised learning become inadequate. This is because there usually only exist labels for the final state, i.e., the actual corresponding location, and not for the intermediate states on the way towards the final state. Thus, learned policy network have to learn to take actions in an environment in order to maximize some notion of a future cumulative reward (which will materialize when the actual corresponding location are reached). In this respect, reinforcement learning is a technique facilitating learning as an end-to-end cognitive process for a trained function, instead of a predefined methodology. In other words, the trained functions acquire the ability to develop strategies to cope with an uncertain environment (here: the medical image data) thereby increasing their flexibility.

By relying on reinforcement learning, it is possible to provide trained functions capable of decomposing a complex problem into a plurality of individual steps. At each step, the trained function may evaluate its current state on the basis of the input data and decide about the next action to advance to the next state. Applied to the present landmark detection problem, a current state may be seen as the current candidate location as the current estimate for the corresponding location and the state may be sampled using the aforementioned local image similarity. The actions may involve moving the current candidate location in the reference medical image series to advance to a new (improved) candidate location. This process may iteratively continue until the actions lead out of the image space of the reference medical image series (indicating that there are no valid landmarks comprised in the image data) or convergence is reached (i.e., there are no actions left to further improve the candidate location). Subdividing a problem into multiple partial problems in machine learning has the benefit that convergence behavior is improved, meaning that the trained functions are faster and yield better results. Moreover, the trained functions become more flexible in the sense that they may be applied to a considerably greater variety of medical image data. Thus, the usage of reinforcement-learnt trained functions synergistically contributes to a method improved in terms of speed, accuracy, and flexibility.

According to an embodiment, the learned policy network has been trained as a Markov decision process using policy gradients.

Employing a Markov decision process effectively means that the individual states and actions are regarded as being statistically independent of the preceding states. This is the basis of an approach of iteratively determining optimal policies during training. For each state, an action would be good that maximizes the future (cumulative) reward (cumulative because the individual rewards for each future action are summed up until convergence is reached). Using policy gradients is furthermore beneficial if the training data is scare and/or the input to the trained function is variable.

According to an aspect, learned policy network may thus be seen as being respectively trained to maximize a cumulative future reward value for a sequence of actions for identifying the corresponding location, preferably by respectively evaluating the gradient of the respective cumulative future reward with respect to one or more parameters of the respective trained function.

The behavior of the learned policy network may be seen as the intelligent selection of next actions that advance a candidate location in such a way that the cumulative future reward is maximized. That is, the learned policy network learns to determine the most favorable sequence of location changes required to accurately detect a corresponding location. Thus, a state of the learned policy network may be modeled as a local image similarity of the current candidate position. The subsequent behavior for the candidate position is responsive to what is observed within the state.

Determining the next actions based on a probability distribution (rather than by calculating concrete reward values for each action) has the advantage, that the method becomes more readily applicable to continuous, finely discretized actions or generally large action spaces.

According to an embodiment, the probability distributions reflect a learned policy of the learned policy network, which policy has been learned by evaluating a gradient of a respective cumulative future reward with respect to one or more parameters of the respective the learned policy network.

According to an embodiment, the learned policy network is configured to improve the candidate location until either a point of convergence of a likely corresponding location is found or the trajectory of improved predicted candidate locations leaves the image space of the reference medical image series reaching a point of convergence.

According to an aspect, the step of selecting at least one of the candidate medical image studies as reference medical image study comprises identifying, from the candidate medical image studies, a plurality of relevant medical image studies based on the comparison of the body regions, providing an indication of the plurality of relevant medical image studies to a user via a user interface, receiving a user selection via the user interface, the user selection indicating at least one of the relevant medical image studies, selecting the at least one indicated relevant medical image study as the reference medical image study.

The plurality of relevant medical image studies be seen as an automatically provided pre-selection, the user can select from. The indication of the plurality of relevant medical image studies may be provided to the user in the form of a list of studies where the user can select from. According to an example, the list may include further details associated with the respective relevant medical image study, such as the point in time the study was acquired, the modality and other imaging parameters, clinical parameters of the patient or the study, one or more medical records or excerpts therefrom. According to some implementations, the step of providing an indication of the plurality of relevant medical image studies to a user via a user interface may comprise providing a highlight on the plurality of relevant medical image studies in the set of available candidate medical image studies.

With the provision of the possibly relevant studies to a user and selecting one or more reference studies based on a user selection of one or more of the possibly relevant studies, a continuous human machine interaction is achieved for a directed selection of image studies for follow-up reading. According to an aspect, the user selections may be used/recorded as prior actions of a user on the basis of which the next study selection process for the user can be optimized.

Further, the step of identifying the plurality of relevant medical image studies comprises determining, for each relevant medical image studies a degree of conformance with the target medical image study based on the comparison of the respective body regions, and the step of providing an indication of the plurality of relevant medical image studies comprises providing the degrees of conformance to the user via the user interface. Thereby, the degree of conformance is preferably based on an anatomical overlap between the respective medical image studies based on the comparison of target and candidate body regions.

A degree of conformance may be an objective measure how well two image studies conform to one another. For instance, the degree of conformance may be calculated based on the body regions of the target medical image study and the respective candidate medical image study. Specifically, the degree of conformance may comprise an overlap of body regions determined based on the body regions of the target medical image study and the respective candidate medical image study. As an alternative or in addition to that, the modality relevance score as explained above, or a conformance of imaging parameters of the medical image series comprised in the target medical image study and the respective candidate medical image study may be factored-in to the degree of conformance.

By providing a degree of conformance, the user is given an objective measure how comparable two medical image studies are. The user is thus provided with further assistance for selecting the appropriate medical image study.

According to an aspect, the step of obtaining a region of interest of the target medical image series comprises receiving an input of a user indicative of the region of interest via a user interface.

According to an aspect, the user input comprises at least one of a) a selection of a (target) slice of a plurality of slices comprised in the target medical image series, wherein the target medical image series depicts an image volume, and the plurality of slices respectively depict a certain section of the image volume, b) a manual delineation of an image region within the target medical image series, and c) the indication of a single point of interest within the target medical image series (around which a region of interest may subsequently be defined).

By selecting the region of interest, the user can, in a way, set the target on the basis of which the reference medical image series is selected, and the registration is performed. Accordingly, the correct reference medical image series may be specifically selected according to this part of the reference medical image study the user is currently focusing at. For instance, if the region of interest designates a lung lesion, study and series search may be directed to retrieve prior images of the lung of the patient and, in particular, of the same part of the lung acquired with comparable imaging parameters.

According to on example, in the step of generating display data to cause a display device to display a rendering of the reference medical image series, the user input and, in particular, the manual delineation is applied to the reference medical image series based on the registration, preferably so as to select a corresponding image slice (reference slice) from the reference medical image series, or so as to crop the reference medical image series according to the manual delineation.

With that, the display data can be adapted to the region of interest. Accordingly, the user is provided with a visualization adapted to the region of interest which may improve the comparative reading for the user.

According to an aspect, the step of selecting at least one of the candidate image series as reference medical image series comprises identifying, from the candidate medical image series, a plurality of relevant medical image series relevant to the target medical imaging series based on the degrees of comparability, providing an indication of the plurality of relevant medical image series to a user via a user interface, the indication optionally comprising the respective degrees of comparability, receiving a user selection via the user interface, the user selection being directed to a dedicated one of the relevant medical image series, and selecting the dedicated one as the reference medical image series.

The plurality of relevant medical image series may be seen as an automatically provided pre-selection, the user can select from. The indication of the plurality of relevant medical image series may be provided to the user in the form of a list of series the user can select from.

With that, a continuous human machine interaction is achieved for a directed selection of image series for follow-up reading. According to an aspect, the user selections may be used/recorded as prior actions of a user on the basis of which the next series selection process for the user can be optimized.

According to an aspect, each of the target and reference medical image series is associated with at least one attribute having an attribute value indicative of an imaging parameter used to capture the respective medical imaging series, wherein the step of providing an indication of the plurality of relevant medical image series to the user via the user interface comprises providing an indication of the respective attribute values.

According to an aspect, the reference medical image study comprises one or more annotations corresponding to the reference image series. The method may further comprise obtaining, from the one or more annotations, at least a reference annotation relevant for the target medical image series and/or the region of interest, and providing the reference annotation, the reference annotation preferably comprising one or more first words.

Preferably, providing the reference annotation may comprise annotating the target medical image series and/or the region of interest with the at least one reference annotation.

Obtaining at least one reference annotation may comprise: determining, for each annotation a position within the reference medical image series the respective annotation is referring to, determining, for each position, preferably based on the registration, whether or not the position has a corresponding position in the target medical image series or the region of interest, and selecting an annotation as reference annotation if a corresponding position can be determined for the position of the annotation.

Thus, the at least one reference annotation may, in particular, relates to the reference slice.

Annotating the target medical image series and/or the region of interest may comprise annotating the target medical image series and/or the region of interest with the at least one reference annotation at the determined corresponding location.

According to the above aspect, prior annotations may automatically be provided which may facilitate the follow-up reading process by the user. By automatically annotating the target medical image series and/or the region of interest, the user can directly compare prior annotations with image features of the target medical image series According to an aspect, the step of obtaining at least one reference annotation comprises: obtaining, for each annotation, at least one position in the reference medical image series, and determining, for each position, a corresponding (or target) position in the target medical image series and/or the region of interest, the corresponding (or target) position corresponding to the at least one position. Thereby the step of annotating may comprise annotating the target medical image series and/or the region of interest with the reference annotation at the at least one target position.

Determining a corresponding position may be based on the aforementioned registration.

Further, determining a corresponding (or target) position or determining, for each position, whether or not the position has a corresponding position in the target medical image series or the region of interest, may be based on an image similarity evaluation. Specifically, these steps may comprise obtaining, for each annotation, at least one reference image patch of the reference medical image series, the reference image patch being located relative to the position of the annotation. Further, these steps may comprise determining, for each of a plurality of target image patches in the target medical image series and/or the region of interest, a local image similarity metric indicating a degree of local image similarity between the reference image patch and the respective target image patch. Further, these steps may comprise selecting a matching image patch from the plurality of target image patches based on the similarity metrics (if possible) and determining the corresponding (or target) position based on the matching image patch.

The degrees of local image similarity can be calculated with a local image similarity metric essentially as described before in connection with the registration step.

For instance, the target patch having the highest degree of local image similarity with the reference patch may be selected as the matching image patch. Further, a matching image patch may be identified if the degree of local image similarity is above a predefined threshold. If no target image patch can be identified the degree of local image similarity of which is above the predefined threshold, the associated annotation has no correspondence in the target medical image series and may therefore not be applicable to the target medical image series.

According to an aspect, the method may further comprise obtaining a medical report associated with the reference medical image study, obtaining one or more sections of text of the medical report, each section comprising one or more second words for each of the one or more sections and for each one of the reference annotations comparing one or more of the second words to the one or more first words of the reference annotations to identify a match, and associating at least one of the reference annotations with at least one of the first sections on the basis of the identified match. Optionally, associated first sections may be provided to a user via the user interface.

With that, based on an automated annotation of the target medical image series, corresponding sections of a previous medical report may be identified which may be relevant for reading the target medical image series. The user can thus directly determine which of the findings reported in the previous medical report have changed, without having to retrieve previous reports and relevant passages therein manually.

The comparison of the one or more words may be effected by a applying a machine learned classificatory to the first and second words, which has been trained to map similar words to similar region of a feature space. For example, the words may be encoded into a vector representation using word embeddings. For example, word embeddings map words onto vector space, where the words the vectors for each word may be generated by applying a word embedding model to a corpus of training text. An example of a known word embedding model is "Word2vec" which uses a neural network to learn word embeddings from a corpus of training text.

According to an aspect, the method further comprises identifying a user to be provided with the display data, obtaining one or more prior actions of the user, the prior actions being directed to at least one of a study selection action of selecting a reference medical image study from a plurality of candidate medical image studies, and a series selecting action of selecting a reference medical image series from a plurality of candidate medical image series of a medical image study. Thereby the step of selecting the reference medical image study may be based on the at least one study selection action. Further, the step of selecting the reference medical image series may be based on the at least one series selection action.

By taking into account prior actions of the user the (semi-) automated selection process as herein described can be adapted to the preferences of the user. With that, such series and studies can be selected, the user is likely to select if he would manually go through the available studies/series. Further, if the study and/or series selection is implemented by of machine learned functions, such prior actions may be used to further train the underlying machine learned functions.

Basing a selection process on at least one prior action may comprise (e.g., statistically) evaluating one or more prior action so as to determine a probability with which the user will select an individual candidate medical image study or series. The probability may then provide an additional basis in the step of selecting the reference medical image study or the step of selecting the reference medical image series.

to an aspect, the method may further comprise quantifying a change between the image data of the region of interest within the target medical image series and corresponding image data of the reference medical image series, and generating change display data to cause the display device to display a visualization of the change.

According to some examples, changes may be determined by transforming the target medical image series into the coordinate system of the reference medical image series or vice versa based on the registration so as to generate a transformed medical image series and determining the change based on the transformed medical image series (in particular, by comparing or subtracting the target medical image series or the reference medical image series with the transformed medical image series).

Changes may relate to a disease state of the patient. A change may relate to tissue changes between the target medical image series and the reference medical image series. A change may relate to a growth, shrinkage, appearance, or disappearance of an abnormality from the target medical image series to the reference medical image series (i.e., from the first instance of time to the second instance of time). Examples include the growth or shrinkage of nodules, the occurrence of new nodules and/or lesions and so forth.

A visualization of the change may comprise displaying a rendering of the target medical image series (the region of interest) and/or the reference medical image series with the change highlighted. The term "highlighted" in this context may mean that the change is visually enhanced in brightness, color, and/or intensity. In addition to that or as an alternative, the change may be highlighted using symbols. Further, the change may be highlighted using labels comprising semantic expressions. Highlighting may furthermore mean using a heatmap wherein, e.g., the amount of change is color-coded. For instance, shrinking nodules may be assigned a different color than growing nodules.

Specifically, generating the change display data may thus comprise at least one of: including the visualization of the change in the rendering of the reference medical image series, preferably as an overlay over the rendering of the reference medical image series, and including the visualization in a rendering of the region of interest, preferably as an overlay over the rendering of the region of interest.

By providing the user with a rendering with the change highlighted, the user can immediately infer what changes happened and where these changes occurred. This helps guiding the image reading and therefore increases the usability of the method and provides an improved assistance to the user for deriving a medical diagnosis.

According to an aspect, the target medical image series has been acquired using a first medical imaging modality and the reference medical image series has been acquired using a second medical imaging modality, wherein the first medical imaging modality is based on an imaging technology different from the imaging technology the second modality is based on. Thereby, the first modality may be based on an x-ray imaging technology (such as CT or X-ray projection) and the second medical image series (CMIS) being preferably based on a magnetic resonance imaging technology.

In other words, the method enables synchronizing medical image data sets acquired with functionally different imaging modalities.

According to an aspect, the candidate medical image studies and/or series are stored in a remote storage device, and the method comprises: retrieving medical image data of the candidate medical image studies and/or series selected as reference medical image studies and/or series from the remote storage device without retrieving medical image data of candidate medical image studies and/or series not selected as reference medical image studies and/or series.

In other words, this may mean that no transfer of image data happens until a candidate medical image study or series is selected as reference medical image study or series.

According to an aspect, the step of selecting the reference medical image study from the plurality of candidate medical image studies is based on non-image data associated with the candidate medical image studies. In particular, the step of determining the body regions of the candidate medical image studies may be based on non-image data associated with the candidate medical image studies. Accordingly, the step of selecting the reference medical image study may comprise retrieving non-image data of the candidate medical image studies from the remote storage device without retrieving medical image data of candidate medical image studies.

Similarly, according to an aspect, the step of selecting the reference medical image series from the plurality of candidate medical image series is based on non-image data associated with the candidate medical image series. In particular, the step of determining the degrees of comparability of the candidate medical image series may be based on non-image data associated with the candidate medical image series. Accordingly, the step of selecting the reference medical image series may comprise retrieving non-image data of the candidate medical image series from the remote storage device without retrieving medical image data of candidate medical image series.

Determining the body region/the degrees of comparability based on the (computationally relatively small) non-image data allows that the (computationally relatively large) medical image data need not be transmitted over the network in order to determine the body region/the degrees of comparability represented thereby, hence making efficient use of network resources.

According to an aspect, the method further comprises providing an abnormality detection function configured to detect one or more anatomical abnormalities in medical image data, detecting an anatomical abnormality in the target medical image series by applying the abnormality detection function to the target medical image series, obtaining an abnormality location of the anatomical abnormality, wherein the step of obtaining the region of interest is based on the abnormality location.

In particular, an abnormality (another word is "abnormal structure") within a patient is an anatomical structure that differentiates said patients from other patients. In particular, an abnormality can be connected with a certain pathology of a patient.

The abnormality can be located within different organs of the patient (e.g., within the lung of a patient, or within the liver of a patient), the abnormality can also be located in between the organs of the patient. In particular, the abnormality could be a foreign body.

In particular, an abnormality can be a neoplasm (also denoted as "tumor"), in particular, a benign neoplasm, an in-situ neoplasm, a malignant and/or neoplasm a neoplasm of uncertain/unknown behavior. In particular, an abnormality can be a nodule, in particular, a lung nodule. In particular, an abnormality can be a lesion, in particular, a lung lesion.

An abnormality detection function may, in particular embodied as computer-aided detection (CADe) and computer-aided diagnosis (CADx) systems. Such systems are technologies to help radiologists interpret medical images. A common use of CAD systems is to automatically identify suspicious regions in a medical image. Such suspicious regions may contain image patterns indicative of abnormalities which may comprise cancerous growths, masses, abscesses, lacerations, calcifications, lesions and/or other irregularities within biological tissue and which can cause serious medical problems if left undetected. In principle, a plethora of functionalities and methods is known for the computer aided detection of abnormalities-all of which may be implemented in the abnormality detection function. For instance, reference is made to US 2009/0 092 300 A1, US 2009/0 067 693 A1, and US 2016/0 321 427 A1. In particular, the abnormality detection function may be based on one of Support Vector Machine, naive Bayes, neural network, decision tree, and/or ResNet.

By obtaining the region of interest by way of an automated abnormality detection workflow, the attention of the user may automatically be focused on the most relevant parts of the target medical image series and appropriate reference medical image series may specifically be fetched based on that. This may further assist a user in providing a medical diagnosis.

According to an aspect, a system for supporting evaluation of a target medical image series of a patient acquired at a first point in time is provided. The system comprises an interface unit and a computing unit. The interface unit is configured to provide a rendering of the target medical image series to a user, and to receive a user input from the user directed to the designation of a region of interest in the target medical image series based on the rendering of the target medical image series. The computing unit is configured to obtain the region of interest based on the user input, determine a target body region represented by the target image data series, to select a reference medical image study from a plurality of candidate medical image studies based on a comparison of the target body region with a plurality of candidate body regions, wherein each of the plurality of candidate body regions corresponds to one of the plurality of candidate medical image studies and each candidate medical image study comprises a plurality of candidate medical image series of the patient at a second point in time, to select, from the plurality of candidate medical image series of the reference medical image study, a reference medical image series based on a degree of comparability with the target medical image series, to perform a registration of the target medical image series and reference medical image series, and to generate display data to cause the interface unit to display a rendering of the reference medical image series based on the registration.

The computing unit may comprise a study selection module or unit configured to select a reference medical image study as herein described. The computing unit may comprise a series selection module or unit configured to select a reference medical image series as herein described. The computing unit may comprise an image registration unit configured to generate at least one image registration as herein described. The computing unit may comprise a visualization module or unit configured to generate display data at least based on the reference medical image series as herein described.

Optionally, the computing unit may comprise a annotating module or unit. It may be configured to annotate the target medical image series based on annotations comprised in the reference medical image series RMIS (if any) and/or to match annotations assigned to the target medical image series to existing sections of medical reports of the patient as herein described. Further, the computing unit may optionally comprise a comparator unit for comparing medical image data and for determining a change on that basis as herein described.

The computing unit may be realized as a data processing system or as a part of a data processing system. Such a data processing system can, for example, comprise a cloud-computing system, a computer network, a computer, a tablet computer, a smartphone and/or the like. The computing unit can comprise hardware and/or software. The hardware can comprise, for example, one or more processor, one or more memories and combinations thereof. The one or more memories may store instructions for carrying out the method steps according to the invention. The hardware can be configurable by the software and/or be operable by the software. Generally, all units, sub-units or modules may at least temporarily be in data exchange with each other, e.g., via a network connection or respective interfaces. Consequently, individual units may be located apart from each other.

The interface unit may comprise an interface for data exchange with a local server or a central web server via internet connection for receiving the reference image data or follow-up image data. The interface unit may be further adapted to interface with one or more users of the system, e.g., by displaying the result of the processing by the computing unit to the user (e.g., in a graphical user interface) or by allowing the user to adjust parameters for image processing or visualization and/or to medical image studies and series.

According to other aspects, the systems are adapted to implement the inventive method in their various aspects for determining a change of an abnormality in an anatomical region of a patient. The advantages described in connection with the method aspects may also be realized by the correspondingly configured systems' components.

According to an aspect, the interface unit is further configured to visualize an evaluation tool, wherein the evaluation tool is adapted to be arranged in the rendering of the target medical image series, and to receive user input from the user relating to arranging the evaluation tool in the rendering of the target medical image series to define the region of interest. Further, the computing unit may be configured to arrange the evaluation tool in the rendering of the target medical image series to the region of interest.

According to an aspect, the interface unit is further configured to display the evaluation tool as a circular or rectangular evaluation tool of user-configurable size positioned as an overlay to the rendering of the target medical image series.

According to an aspect, the interface unit is further configured to provide an evaluation function configured to quantify a change between the image data of the region of interest and corresponding image data of the reference medical image series and to receive a user input from the user relating to selecting the evaluation function. Further, the computing unit is configured to execute the evaluation function based on the user input and to generate change display data to cause the interface to display a visualization of the change.

In other words, an easy-to-use image evaluation/analysis tool for a user is provided, which may be arbitrarily positioned in or on or over a displayed image data set. The evaluation/analysis tool thus allows the user to easily select a position or region of interest in the displayed image volume by directly moving the tool to this position. The evaluation tool, when positioned at the region of interest, is adapted to provide a plurality of different evaluation/analysis functions for the user to select, wherein each of the evaluation functions is adapted to provide evaluation/analysis results referring to image data within the selected position. Furthermore, a graphical user interface is provided for which is adapted to parallelly visualize medical image data, a palette of evaluation functions and evaluation results.

According to other aspects, an image analysis system is provided which comprises the above system and a medical information system configured to acquire, store and/or forward at least target and reference medical image studies and/or series. Thereby, the interface unit is configured to receive target and reference medical image studies and/or series from the medical information system.

According to some examples, the medical information system comprises one or more archive stations for storing target, candidate and reference medical image studies and/or series. The archive stations may be realized as remote storage, e.g., in the form of a cloud storage or as a local or spread storage, e.g., as a PACS (Picture Archiving and Communication System). Further, the medical information system may comprise one or more medical imaging modalities, such as a computed tomography system, a magnetic resonance system, an angiography (or C-arm X-ray) system, a positron-emission tomography system, a mammography system, or the like.

According to another aspect, the present invention is directed to a computer program product comprising program elements which induce a computing unit of a system to perform the steps according to one or more of the above method aspects, when the program elements are loaded into a memory of the computing unit.

According to another aspect, the present invention is directed to a computer-readable medium on which program elements are stored that are readable and executable by a computing unit of a system to perform the steps according to one or more method aspects, when the program elements are executed by the computing unit.

The realization of the invention by a computer program product and/or a computer-readable medium has the advantage that already existing providing systems can be easily adapted by software updates in order to work as proposed by the invention.

The computer program product can be, for example, a computer program or comprise another element next to the computer program as such. This other element can be hardware, e.g., a memory device, on which the computer program is stored, a hardware key for using the computer program and the like, and/or software, e.g., a documentation or a software key for using the computer program. The computer program product may further comprise development material, a runtime system and/or databases or libraries. The computer program product may be distributed among several computer instances.

FIG. 1 depicts a system 1 for identifying a reference medical image study RS with respect to a target medical image series TMIS, for identifying a reference medical image series RMIS with respect to a target medical image series TMIS, for annotating a target medical image series TMIS, and/or for generating display data on that basis. In this regard, system 1 is adapted to perform the methods according to one or more embodiments, e.g., as further described with reference to FIGS. 2 to 34. A user of system 1, according to some examples, may generally relate to a healthcare professional such as a physician, clinician, technician, radiologist, pathologist and so forth.

System 1 comprises a user interface 10 (as part of the interface unit) and a processing system 20 (as part of the computing unit 30). Further, system 1 may comprise or be connected to a medical information system 40. The medical information system 40 may generally be configured for acquiring and/or storing and/or forwarding reference medical image studies RS, target medical image studies TS, reference medical image series RMIS, and/or target medical image series TMIS. In particular, the medical information system 40 may be configured to handle image data files IF in which the reference medical image studies RS, target medical image studies TS, reference medical image series RMIS, and/or target medical image series TMIS are stored. For instance, medical information system 40 may comprise one or more archive/review station (not shown) for storing image data files IF of corresponding medical image studies and series. The archive/review stations may be embodied by one or more databases. In particular, the archive/review stations may be realized in the form of one or more cloud storage modules. Alternatively, the archive/review stations may be realized as a local or spread storage, e.g., as a PACS (Picture Archiving and Communication System). Further, the archive/review stations may further store additional clinical information related to image data files IF, wherein the clinical information may comprise, e.g., related medical findings, key images prepared during a prior inspection of the patient case, one or more prior (structured) medical reports, personal information related to the patient under consideration, patient records or the like. According to some examples, medical information system 40 may also comprise one or more medical imaging modalities (not shown), such as a computed tomography system, a magnetic resonance system, an angiography (or C-arm X-ray) system, a positron-emission tomography system, a mammography system, system for acquiring digital pathology images or the like.

User interface 10 comprises a display unit 11 and an input unit 12. User interface 10 may be embodied by a mobile device such as a smartphone or tablet computer. Further, user interface 10 may be embodied as a workstation in the form of a desktop PC or laptop. Input unit 12 may be integrated in display unit 11, e.g., in the form of a touch screen. As an alternative or in addition to that, input unit 12 may comprise a keyboard, a mouse or a digital pen and any combination thereof. Display unit 11 may be configured for displaying representations of the target medical image series TMIS and/or the reference medical image series RMIS. In particular, display unit 11 may be configured to display individual slices of the target medical image series TMIS and/or the reference medical image series RMIS.

User interface 10 further comprises an interface computing unit 13 configured to execute at least one software component for serving display unit 11 and input unit 12 in order to provide a graphical user interface (e.g., FIGS. 36 to 38) for allowing the user to select a target medical image study TS to be reviewed, for receiving a user selection of a target medical image series TMIS from the target medical image study TS, and/or for defining a region of interest ROI in the target medical image series TMIS. In addition, interface computing unit 13 may be configured to communicate with medical information system 40 or processing system 20 for receiving one or more reference medical image series RMIS for comparison with the target medical image series TMIS or display data relating to the reference medical image series RMIS. The user may activate the software component via user interface 10 and may acquire the software component, e.g., by downloading it from an internet application store. According to an example, the software component may also be a client-server computer program in the form of a web application running in a web browser. The interface computing unit 13 may be a general processor, central processing unit, control processor, graphics processing unit, digital signal processor, three-dimensional rendering processor, image processor, application specific integrated circuit, field programmable gate array, digital circuit, analog circuit, combinations thereof, or other now known device for processing image data.

Processing system 20 may be a processor. The processor may be a general processor, central processing unit, control processor, graphics processing unit, digital signal processor, three-dimensional rendering processor, image processor, application specific integrated circuit, field programmable gate array, digital circuit, analog circuit, combinations thereof, or other now known device for processing image data. The processor may be single device or multiple devices operating in serial, parallel, or separately. The processor may be a main processor of a computer, such as a laptop or desktop computer, or may be a processor for handling some tasks in a larger system, such as in the medical information system or the server. The processor is configured by instructions, design, hardware, and/or software to perform the steps discussed herein. Alternatively, processing system 20 may comprise a real or virtual group of computers like a so called 'cluster' or 'cloud'. Such server system may be a central server, e.g., a cloud server, or a local server, e.g., located on a hospital or radiology site. Further, processing system 20 may comprise a memory such as a RAM for temporally loading the medical image data sets MIDS-1, MIDS-2. Alternatively, such memory may as well be comprised in user interface 10.

Medical image series as described herein (such as in the form of a target medical image series TMIS, a reference medical image series RMIS, a candidate medical image series CMIS) may be three-dimensional image data sets acquired, for instance, using a computed tomography system or a magnetic resonance imaging system or other systems. The image information may be encoded in a three-dimensional array of m times n times p voxels. Each medical image medical image series RMIS, TMIS, CMIS may include a plurality of image slices S-1, S-2 (also denoted just as "slices") which are stacked in a stacking direction to span the image volume covered by the respective medical image series RMIS, TMIS, CMIS.

Further, medical image series RMIS, TMIS, CMIS may comprise one or more individual two-dimensional medical images with the image information being encoded in an array of m times n pixels. According to some examples, these two-dimensional medical images have been extracted from three-dimensional medical image series. According to other examples, the two-dimensional medical images have been separately acquired using an appropriate imaging modality such as an X-ray imaging modality.

An ensemble of voxels or pixels may be designated as image data of the respective data set in the following. In general, any kind of imaging modalities and scanners may be used for acquiring such image data, such as ultrasound, x-ray, angiography, fluoroscopy, positron emission tomography, single photon emission computed tomography, or others. Generally, medical image series RMIS, TMIS, CMIS show a body part of a patient which may comprise various anatomies and organs. Considering the chest area as a body part, medical image series RMIS, TMIS, CMIS might, for instance, depict the lung lobes, the rib cage, the heart, lymph nodes, and so forth. For example, when processed by suitable image viewing software, the medical imaging data ID results in a rendering or representation of the medical image (or medical images) that it represents.

Figure 2:
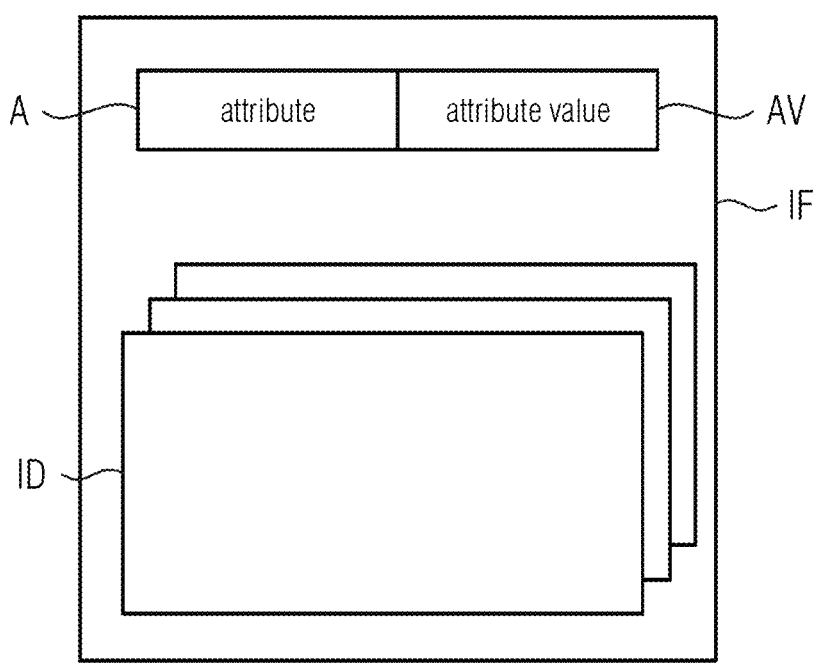
FIG. 2 schematically depicts an image file according to an embodiment.

Medical image series RMIS, TMIS, CMIS may be stored in the form of one or image files IF. An example image file IF is illustrated in FIG. 2. image files IF may store the actual medical imaging data ID and may further store one or more attributes A each having an attribute value AV comprising a text string indicating content of the medical imaging data ID.

The one or more attribute values AV are separate to and distinct from the medical imaging data ID, and instead comprise a text string indicating content of the medical imaging data ID. Such attribute values AV may, in some examples, be referred to as metadata of the image files IF. In some examples, the part of the image files IF that stores the attributes A and attribute values AV may be referred to as a header of the image files IF, and the attributes A and attribute values AV may be referred to as header data of the image files IF.

Figure 3:
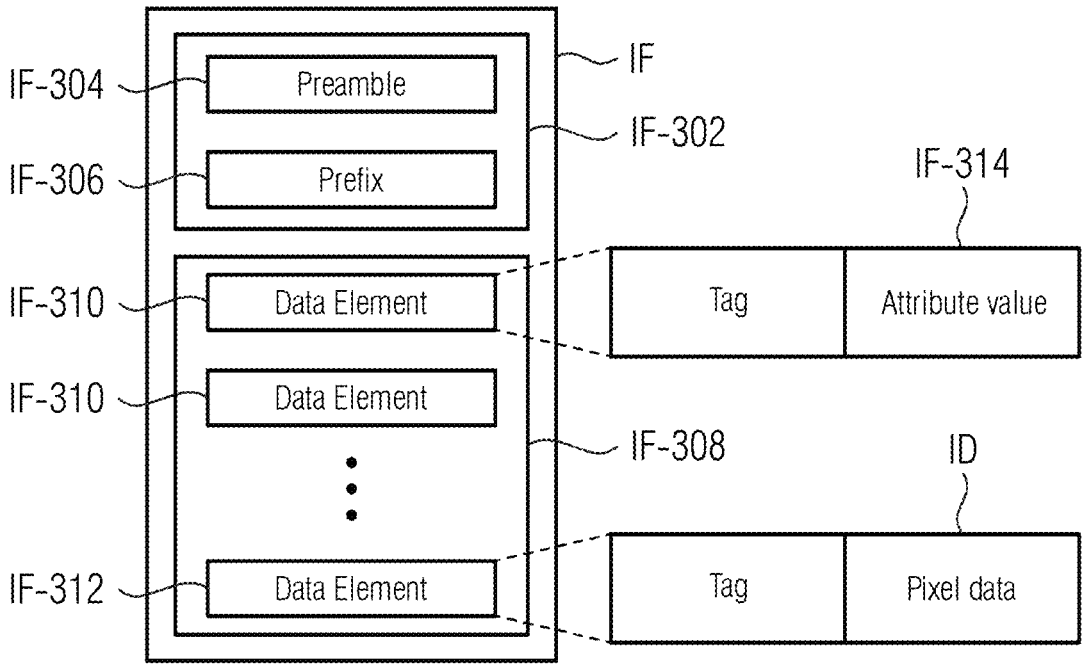
FIG. 3 schematically depicts an image file according to an embodiment.

A specific example of an image data file IF is a Digital Imaging and Communications in Medicine (DICOM) file. An example DICOM file is illustrated in FIG. 3, as is described in more detail below. In overview, the DICOM file stores medical imaging data ID as pixel data in a designated data element IF-312, and further stores, as one or more other data elements IF-310, one or more attributes A each having an attribute value AV comprising a text string indicating content of the medical imaging data ID. An example such DICOM attribute IF-310 is 'Study Description' whose attribute value IF-314 is a text string that describes the study of which the medical imaging data is part (e.g., 'NERUO^-HEAD' where the medical imaging data is of the head region of the patient) and thereby indicates the content of the medical imaging data 316. There are other examples such DICOM attributes, such as 'Series description', 'Body Part Examined' as well as others.

In some examples, at a given time and for a given patient, a radiologist may perform a medical imaging study on the patient. Different studies may be performed at different times. A particular study may be for a particular body part of the patient and using a particular imaging modality (e.g., MR). In some cases, different studies may be of different body parts of the patient and/or have different imaging modalities (i.e., captured by different equipment). A study result may be stored in one or more medical image data files IF. A given study CS, RS, TS may comprise one or more series TMIS, CMIS, RMIS of medical images. For example, within a given series TMIS, CMIS, RMIS within a study TS, CS, RS the medical images may have been captured using the same imaging parameters (e.g., patient orientation, MR specific imaging parameters such as Echo Time and the like). Each series TMIS, CMIS, RMIS within a study TS, CS, RS may have different imaging parameters. In some examples, an image file IF stores medical imaging data ID representing an image within a particular series and within a particular study. Image files IF that store medical imaging data ID representing medical images that are part of the same study TS, CS, RS may, for example, have the same unique study identifier, and image files IF that store medical imaging data ID representing medical images that are part of the same series TMIS, CMIS, RMIS may for example, have the same unique series identifier. In any case, a given study may have at least one series of at least one such image files.

Methods and systems herein described aim at automatically selecting, with respect to a target medical image study TS of a patient the user is currently reviewing, an appropriate reference medical image study RS from a plurality of candidate medical image studies CS of the patient which are available in the medical information system 40. Further, methods and systems herein described aim at automatically selecting an appropriate reference medical image series RMIS from a plurality of candidate medical image series CMIS comprised in the selected reference medical image study RS. Further, methods and systems herein described aim at automatically registering the target medical image series TMIS with the reference medical image series RMIS and to generate display data on that basis. To this end, processing system 20 may comprise a plurality of sub-units 21-27 configured to process the involved studies TS, CS, TS and series TMIS, CMIS, RMIS accordingly.

Sub-unit 21 is a data retrieval module or unit. It is configured to access and/or search the medical information system 40 for medical image studies TS, CS, RS and/or corresponding medical image series TMIS, CMIS, RMIS and/or corresponding image files IF. For instance, sub-unit 21 may be configured to query the medical information system 40 for all potentially relevant prior studies (i.e., the candidate medical image studies CS) of a patient with respect to a target medical image series TMIS of a target medical image study TS currently under review. Specifically, sub-unit 21 may be configured to formulate search queries and parse them to medical information system 40. In particular, sub-unit 21 may be configured to extract data identifiers from the information available and use these for querying medical information system 40.

Sub-unit 22 can be conceived as a study selection module or unit. It is configured to select, from a plurality of candidate medical image studies CS, at least one target medical image study TS which is of particular relevance for the reference medical image study RS and, in particular, the region of interest ROI. To this end, sub-unit 22 may be configured to determine for each medical image study TS, CS to be compared a body region that the respective image study TS, CS represents. Further sub-unit 22 may be configured to compare the thus derived body regions with one another to determine a reference medical image study RS. Comparing the body regions may thereby involve determining a degree of conformity of each candidate medical image studies CS with the target medical image study TS. Specifically, sub-unit 22 may be configured to perform steps S30 and S40 as herein described. Further, sub-unit 22 may be configured to perform the method steps as described in connection with FIGS. 5 to 9 and/or to host the image processing functions described in this context.

Sub-unit 23 can be conceived as a series selection module or unit. It is configured to select, from a plurality of candidate medical image series CMIS comprised in the reference medical image study RS, at least one reference medical image series RMIS that can be readily compared with the target medical image series TMIS. Specifically, sub-unit 23 may be configured to determine a degree of comparability for each candidate medical image series CMIS with the target medical image series TMIS. The candidate medical image series CMIS having the highest degrees of comparability may then be selected as reference medical image series RMIS. Specifically, sub-unit 23 may be configured to perform steps S50 as herein described. Further, sub-unit 23 may be configured to perform the method steps as described in connection with FIGS. 10 and 11 and/or to host the image processing functions described in this context.

Sub-unit 24 may be conceived as a registration module or unit. Sub-unit 24 may configured to perform a registration of the target medical image series TMIS and the reference medical image series RMIS and, thus, to perform step 60 as herein described. In particular, sub-unit 24 may be configured to calculate a coordinate transformation which essentially converts the image data of one image series into the coordinate system of the other image series. The calculation result provided by sub-unit 24 may be in the form of a two or three-dimensional transformation matrix or deformation field. Sub-unit 24 may be configured to apply one or more image registration techniques comprising rigid image registrations, affine image registrations, non-rigid image registrations and any combination thereof. To improve the result of the registration, sub-unit 24 may optionally be configured to mathematically fit the calculation result to one or more motion models for soft tissue deformation. As an alternative or in addition to the above registration techniques, sub-unit 24 may be configured to correlate or synchronize slices of the target medical image series TMIS and the reference medical image series RMIS with one another based on an image similarity between individual slices and thereby provide a registration between the reference medical image series RMIS and the target medical image series TMIS. In this regard, sub-unit 24 may be configured to perform the method steps as described in connection with FIGS. 12 to 17 and/or to host the image processing functions described in this context. Moreover, sub-unit 24 may be configured to provide a registration by directly identifying similar patterns in the reference medical image series RMIS and target medical image series TMIS and correlating the respective locations of these patterns in the reference medical image series RMIS and the target medical image series TMIS. In this regard, sub-unit 24 may be configured to perform the method steps as described in connection with FIGS. 19 to 26 and/or to host the image processing functions described in this context.

Sub-unit 25 may be conceived as a annotating module or unit. It may be configured to annotate the target medical image series TMIS based on annotations comprised in the reference medical image series RMIS (if any) and/or to match annotations assigned to the target medical image series TMIS to existing sections F1-F3 of medical reports RM-504 of the patient. Sub-unit 25 may be configured to perform the method steps as described in connection with FIGS. 27 to 34 and/or to host the image processing functions described in this context.

Sub-unit 26 may be configured as a comparator module or unit. Sub-unit 26 may, for instance, be configured to compare image data ID comprised in the reference medical image series RMIS and the target medical image series TMIS with one another to determine a change between the reference medical image series RMIS and the target medical image series TMIS. Further, sub-unit 26 may be configured to correlate different representations of an abnormality A in the reference medical image series RMIS and the target medical image series TMIS. Further, sub-unit 26 may be configured to quantify a change of an abnormality on the basis of the correlation. To this end, sub-unit 26 may be configured to determine a size and/or volume and/or intensity and/or texture and/or other parameter change of an abnormality from the reference medical image series RMIS to the target medical image series TMIS.

Sub-unit 27 may be conceived as a visualization module configured to generate display data at least based on the reference medical image series RMIS. Specifically, sub-unit 27 may be configured to render a representation of the reference medical image series RMIS which corresponds to the region of interest ROI based on the registration. Further, sub-unit 27 may be configured to provide a rendering of the region of interest ROI and/or the reference medical image series RMIS with changes highlighted and annotations added. Such a representation can be in the form of an assistance image in which any change and/or annotations are visually encoded. This may mean that any change and/or annotations are enhanced in the representation. Specifically, sub-unit 27 may be configured to run or execute an algorithm for rendering a semi-transparent overlay image from the change and/or the annotations to be superimposed over the correspondingly rendered region of interest ROI and/or a corresponding region of the reference medical image series RMIS.

The designation of the distinct sub-units 21-27 is to be construed by way of example and not as limitation. Accordingly, sub-units 21-27 may be integrated to form one single unit (e.g., in the form of "the computing unit 30") or can be embodied by computer code segments configured to execute the corresponding method steps running on a processor or the like of processing system 20. The same holds true with respect to interface computing unit 13. Each sub-unit 21-27 and interface computing unit 13 may be individually connected to other sub-units and or other components of the system 1 where data exchange is needed to perform the method steps. For example, sub-units 21 and 27 may be connected via an interface 29 to medical information system 40 for retrieving medical IF. Likewise, interface 29 may connect the sub-units 21 to 27 to interface computing unit 13 for forwarding the results of the computation to the user and collect user inputs.

Processing system 20 and interface computing unit 13 together may constitute the computing unit 30. Of note, the layout of computing unit 30, i.e., the physical distribution of interface computing unit 13 and sub-units 21-27 is, in principle, arbitrary. For instance, sub-unit 27 (or individual elements of it or specific algorithm sequences) may likewise be localized in user interface 10. The same holds true for the other sub-units 21-26. Specifically, processing system 20 may also be integrated in user interface 10. As already mentioned, processing system 20 may alternatively be embodied as a server system, e.g., a cloud server, or a local server, e.g., located on a hospital or radiology site. According to such implementation, user interface 10 could be designated as "frontend" or "client" facing the user, while processing system 20 could then be conceived as "backend" or server. Communication between user interface 10 and processing system 20 may be carried out using the https-protocol, for instance. The computational power of the system may be distributed between the server and the client (i.e., user interface 10). In a "thin client" system, the majority of the computational capabilities exists at the server. In a "thick client" system, more of the computational capabilities, and possibly data, exist on the client.

Individual components of system 1 may be at least temporarily connected to each other for data transfer and/or exchange. User interface 10 communicates with processing system 20 via interface 29 to exchange, e.g., patient data TPD, data descriptors or the result of the computation. For example, processing system 20 may be activated on a request-base, wherein the request is sent by user interface 10. Further, processing system 20 may communicate with medical information system 50 in order to retrieve a target patient's case. As an alternative or in addition to that, user interface 10 may communicate with medical information system 40 directly. Medical information system 40 may likewise be activated on a request-base, wherein the request is sent by processing system 20 and/or user interface 10. Interface 29 for data exchange may be realized as hardware- or software-interface, e.g., a PCI-bus, USB, or fire-wire. Data transfer may be realized using a network connection. The network may be realized as local area network (LAN), e.g., an intranet or a wide area network (WAN). Network connection is preferably wireless, e.g., as wireless LAN (WLAN or Wi-Fi). Further, the network may comprise a combination of different network examples. Interface 29 for data exchange together with the components for interfacing with the user 11, 12 may be regarded as constituting an interface unit of system 1.

Figure 4:
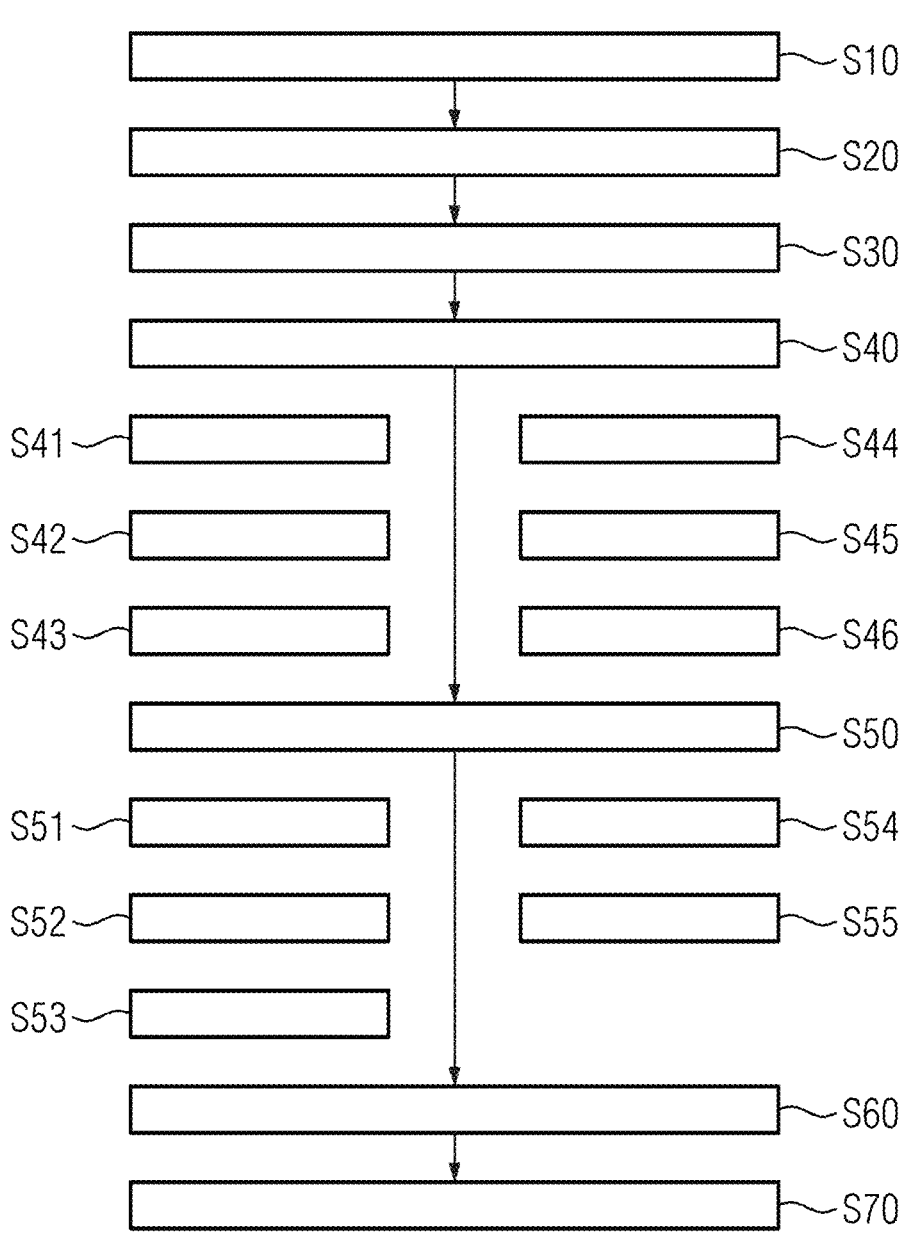
FIG. 4 schematically depicts a method for generating display data of a medical image series according to an embodiment.

FIG. 4 depicts a method for obtaining a reference medical image series RMIS for a target medical image series TMIS and/or generating display data on that basis. The method comprises several steps. The order of the steps does not necessarily correspond to the numbering of the steps but may also vary between different embodiments of the present invention. Further, individual steps or a sequence of steps may be repeated.

In a first step S10, the target medical image series TMIS is received. The target medical image series TMIS can be seen as the target image data on the basis of which a user wants to perform a follow-up analysis. This may involve selecting the target medical image series TMIS from a plurality of series in a corresponding target medical image study TS, e.g., stored in the medical information system 40. The selection may be performed manually by a user, e.g., by selecting an appropriate target medical image series TMIS in a graphical user interface running in the user interface 10. Alternatively, the target medical image series TMIS may be provided to the computing unit 30 by a user by way of uploading the target medical image series TMIS to the computing unit 30. Step S10 may be performed at least partially either on user interface 10 or on processing system 20. Corresponding data exchange is included in this step where necessary.

At step S20, a region of interest ROI with respect to the target medical image series TMIS is obtained. Obtaining the region of interest ROI may obtaining a user input involving a manual definition of a region carried out manually by a user via user interface 10. Alternatively, obtaining the region of interest ROI may be conducted automatically or semi-automatically. According to some examples, the region of interest may be obtained as described in connection with FIGS. 35 to 39, i.e., with the evaluation tool ML-40. Manual and semi-automatic definition of the region of interest ROI may comprise displaying a representation of the target medical image series via a graphical user interface-preferably of user interface 10. The user may, e.g., position a region of interest tool ML-40 visualized for the user as overlay to the displayed representation image RI. Optionally, further adaptation of size and/or shape of the tool may follow. As an alternative or in addition to that, the definition of the region of interest ROI may include a free hand selection of the region of interest ROI, e.g., by retracing the contour of the region of interest ROI using any suitable input unit 12. Further, the definition of the region of interest ROI may be based on identifying a feature in the target medical image series TMIS. This may be an anatomical feature indicative of a pathological condition of the patient. Here, in other words, position, size, and shape of the region of interest ROI preferably depend on an abnormal or atypical feature present in the target medical image series TMIS. The abnormal feature may correspond to any deviation of an anatomical structure, organ or tissue like lung, heart, vessels, brain, e.g., increased or lowered local tissue density, cysts, calcifications, or the like. The atypical anatomical features thus represent a pathological condition of the patient. Moreover, the feature may relate to a feature in a pathology image or pathological feature. The feature may either be visually inspected or identified by the radiologist/pathologist or may be result of a feature extraction and/or object detection step optionally comprised in this step S20. Step S20 may be performed at least partially either on user interface 10 or on processing system 20. Corresponding data exchange is included in this step where necessary.

At step S30, a body region 408 represented by the target medical image series TMIS is determined. The determination of the body region 408 may be based on the target medical image series TMIS as such or on the target medical image study TS the target medical image series TMIS corresponds to. In order to determine the body region 408, the image data of the target medical image series TMIS and/or the target medical image study TS may be evaluated. For instance, image recognition algorithms configured to recognize anatomies in medical image data may be applied to the medical image data ID of the target medical image study TS to determine one or more anatomies represented by the target medical image study TS. Based on the anatomies, the body region 408 may then be determined. As an alternative or in addition to that, attribute values AV indicating content of the medical imaging data ID comprised in the target medical image study TS may be evaluated to derive the body region 408. Further details as to the determination of body regions of medical image studies and/or medical image series will be described in connection with FIGS. 5 to 7. Step S30 may be performed predominately on processing system 20. Corresponding data exchange is included in this step where necessary.

At step S40, at least one reference medical image study RS is selected from a plurality of candidate medical image studies CS. As mentioned, the reference studies RS are supposed to be relevant for comparison with the target medical image study TS the user has currently opened. In particular, the selection may be based on the body region 408 determined at step S30. In this regard, step S40 may comprise an optional sub-step S41 directed to determine, for each of the candidate medical image studies CS, a candidate body region 408. Thereby, the determination of the candidate body regions 408 may be carried out essentially as described in connection with step S30. In optional sub-step S42, the body region 408 determined for the target medical image study TS is individually compared to each of the candidate body region 408 in order to determine if the target medical image study TS and the respective candidate medical image studies CS are comparable. Specifically, a degree of conformity may be calculated for each candidate medical image studies CS which measures how well the respective candidate medical image studies CS matches the target medical image study TS in terms of the anatomy shown. On the basis of the comparison of the body (the degrees of conformity), one or more reference medical image study RS may be selected from the candidate image studies CS. Further details as to the determination of the body regions 408, the ensuing comparison of the body regions and the identification of reference studies RS on that basis will be provided in connection with FIGS. 8 and 9.

Further, step S40 may comprise identifying, at optional sub-step S43, a plurality of potentially relevant image studies based on the comparison of the body regions 408 from the plurality of candidate medical image studies. Such potentially relevant image studies may be those candidate image studies CS which show a comparable high degree of conformity over other candidate image studies CS. In a next optional sub-step S44, an indication of the plurality of potentially relevant image studies may be provided to the user via user interface 10. In return, a user selection may be received via user interface 10 in optional sub-step S45, wherein the user selection is directed to at least a dedicated one of the relevant image data files. That followed, the dedicated ones as indicated in the user selection may be selected as the reference image study RS at step S46.

As mentioned, any selected reference medical image study RS will in most cases comprise a plurality of medical image series, which are referred to as candidate medical image series CMIS. To automatically provide the user with at least one relevant medical image series of a selected reference medical image study RS, step S50 is directed to identify, from the candidate medical image series CMIS at least one reference medical image series RMIS which provides a reasonably good basis for follow-up reading by the user. To this end, a degree of comparability may be determined at optional sub-step S51 for each candidate medical image series CMIS which measures how well the respective candidate medical image series CMIS can be compared with the target medical image series TMIS. Thereby, characteristics of the image data ID comprised in the respective medical image series TMIS, CMIS can be evaluated as well as further meta-data of the TMIS, CMIS such as imaging parameters used for capturing the respective medical image series. In particular, this may involve evaluating attribute values AV associated with the respective medical image series TMIS, CMIS. Further details as to the series matching process of step S50 will be provided in connection with FIGS. 10 and 11.

Further, the selection of step S50 may comprise a user interaction for selecting at least one reference medical image series RMIS. Specifically, step S50 may comprise identifying, at optional sub-step S52, a plurality of potentially relevant image series from the candidate medical image series CMIS. This may be based on the determined degrees of comparability of step S51. The potentially relevant image series may be those candidate medical image series CMIS which show a comparable high degree of comparability over other candidate medical image series CMIS. In a next optional sub-step S53, an indication of the plurality of potentially relevant image series may be provided to the user via user interface 10. In return, a user selection may be received via user interface 10 in optional sub-step S54, wherein the user selection is directed to at least a dedicated one of the relevant image series. That followed, the dedicated ones as indicated in the user selection may be selected as the reference medical image series RMIS at step S55.

Step S60 is a registration step in which a registration between the reference medical image series RMIS and the target medical image series TMIS is provided. There are various ways to realize such a registration. Available options in this regard include rigid registrations, affine registrations, non-rigid registrations, non-affine registrations, and any combination thereof. Specifically, a registration may be obtained which links the coordinate systems of the target medical image series TMIS and the reference medical image series RMIS. In other words, a transformation may be calculated which is capable of transforming the respective image data of one medical image series TMIS, RMIS into the coordinate system of the respective other RMIS, TIMS. To this end, at least part of the target medical image series TMIS is registered with at least part of the reference medical image series RMIS. Essentially, this may comprise identifying corresponding data points in the two image series. Having identified such corresponding data points, it is possible to calculate the local offset between these corresponding points which provides an indication of the local shift in coordinate systems between the two image series. Doing this for a plurality of corresponding data points sufficiently distributed in the underlying image series already provides a good indication of the displacements and deformations between the respective image series. Apart from such a formal registration by way of a coordinate transformation, a registration may be effected based on identifying corresponding slices or image patterns in the medical image series TMIS, RMIS. With that, a slice in the target medical image series TMIS, in particular the slice of the region of interest ROI, can be assigned a corresponding image slice in the reference medical image series RMIS (which may also be designated as reference slice REF-SLC in the following) without having to calculate a full coordinate transformation. Further options as to possible implementation of step S60 will be given in connection with FIGS. 12 to 26.

Step S70 is directed to generate display data to cause the user interface 10 to display device to display a rendering of the reference medical image series RMIS. In particular, the rendering may be based on the registration determined in step S60 to the effect that the image data ID extracted from the reference medical image series RMIS corresponds to the image data ID of the target medical image series TMIS currently reviewed by the user. Specifically, the rendering may be based on the reference image slice REF-SLC.

Referring to FIG. 5, there is illustrated a computer implemented method of determining a body region represented by medical imaging data stored in a first image file as may be performed at steps S30 and S41.

In broad overview, the method of FIG. 5 comprises:

in step BR-1, obtaining one or more of the text strings AF, IF-314 of the respective image study TS, CS, e.g., by evaluating corresponding image files IF; and in step BR-2, inputting the obtained one or more text strings AF, IF-314 into a trained machine learning model (see, e.g., the trained neural network 406 of FIG. 6), the machine learning model 406 having been trained to output a body region based on an input of one or more such text strings, and obtaining the output from the trained machine learning model 406 thereby to determine the body region 408 represented by the medical imaging data ID.

Determining the body region 408 represented by the medical imaging data ID by inputting the one or more text strings AV, IF-314 associated with the target medical image study TS into a machine learning model 406 (e.g., a neural network) trained to determine a body region based on input such text strings, may provide for efficient and/or flexible determination of the body region 408 represented by the medical imaging data comprised in target and/or candidate image studies TS, CS.

For example, determining the body region based on the text strings of the files IF (which are relatively small in terms of bits) may be less resource intensive and hence more efficient than, for example, determining the body region by extracting and analyzing the medical imaging data itself (which is relatively large in terms of bits). In cases where the image file is stored remotely from a processing device over a network, determining the body region based on the (relatively small) text strings allows that the (relatively large) medical imaging data need not be transmitted over the network in order to determine the body region represented thereby, efficient use of network resources.

As another example, determining the body region by inputting the text strings into a trained machine learning model (e.g., trained neural network) may provide for efficient, flexible and/or robust determination of the body region, for example as compared to determining the body region by applying hard coded rules to the text strings. For example, hard coded rules require an exact match of the text string to a rule in order to provide a body region (and hence are inflexible with respect to text strings for which a match can be determined and/or are inefficient in the exhaustive nature of the set of rules needed to be coded for all possible text strings that could be used). On the other hand, a trained machine learning model (e.g., a trained neural network) generalizes from a training data set on which it is trained, and hence is both relatively efficient to obtain and is able to determine an appropriate body region even for text strings different from those in the training data set, and hence is relatively flexible/robust.

Accordingly, efficient and/or flexible automated determination of the body region represented by medical imaging data may be provided for.

According to some implementations, the trained machine learned model may also complement (or may be complemented by) a rule-based system to allow generalization of the rule-based system where it is insufficient. The rule-based system may implement one or more selection rules for selecting reference medical image studies RS. The selection rules may, for instance, arise from regulatory requirements and/or medical guidelines.

In some examples, the determination of the body region 408 represented by imaging data ID of the target medical image study TS may in turn facilitate the automated selection of reference image data of a candidate medical image studies CS as relevant (e.g., appropriate for comparison with) to the image data ID comprised in the target medical image study TS. For example, determining the body region 408 represented by the medical imaging data of a file of a current study may be used to select medical imaging data of a previous study of the same body region of the patient. This is described in more detail below with reference to FIGS. 6 and 7.

As mentioned above, in some examples the medical image data files IF may be DICOM files IF (i.e., an image file IF in a DICOM file format, e.g., according to the DICOM standard "NEMA PS3/ISO 12052, Digital Imaging and Communications in Medicine (DICOM) Standard, National Electrical Manufacturers Association, Rosslyn, VA, USA"). Referring again to FIG. 3, in more detail, the DICOM file IF comprises a header IF-302 and a dataset IF-308. The header IF-302 comprises a 128-byte preamble IF-304 (which if not being used has all bytes set to zero) and a 4-byte prefix 306 containing the character string "DICM". The dataset IF-308 contains data elements IF-310, IF-312. Each data element IF-310, IF-312 comprises, and is identified by, a Tag. Each Tag is in the format (XXXX, XXXX) where each 'X' is a Hexadecimal number. The DICOM file 300 may store the unique identifier of the study of which the file is part in the 'Study ID' data element (not shown) (i.e., identified by the DICOM Tag (0020, 0010)), and may store the unique identifier of the series of which the file is part in the Series ID' data element (not shown) (i.e., identified by the DICOM Tag (0020,000E).

The DICOM file IF stores medical image data ID (in this case pixel data) in the 'pixel data' data element IF-312 (i.e., identified by the DICOM Tag (7FE0, 0010)) of the DICOM file IF. The DICOM file IF further stores one or more attributes IF-310 (provided by one or more other data elements 310) each having an attribute value IF-314 comprising a text string indicating content of the medical imaging data ID. For example, one such attribute may be 'Study Description' (i.e., identified by DICOM Tag (0008, 1030)) whose attribute value IF-314 is a text string that describes the study of which the medical imaging data is part (e.g., 'NERUO^HEAD' where the medical imaging data is of the head region of the patient or 'PELVIS^PROSTATE' where the medical imaging data is of the pelvis region of the patient) and thereby indicates the content of the medical imaging data ID. In some examples, although the attributes IF-310 and attribute values IF-314 may not be included in the header IF-302 as such but rather in the dataset IF-308, the attributes IF-310 and attribute values IF-314 (not including the data element IF-312 storing the medical imaging data ID itself) may sometimes be referred to as header data of the DICOM file IF, as these are data relating to the medical imaging data ID rather than being the medical imaging data ID itself.

Other example DICOM attributes which have attribute values comprising text strings indicating content of the medical imaging data may be used. For example, another such example DICOM attribute is 'Series description' (i.e., identified by DICOM Tag (0008, 103E)) which describes the series of which the medical: data is part (e.g., 'ax t1 whole pelvis' indicating that the medical imaging data is of the whole pelvis, was captured with an axial orientation and using T1 type MRI). For example, another such example DICOM attribute is 'Body Part Examined' (i.e., identified DICOM Tag (0018, 0015)), which indicates the body part examined (e.g., 'PELVIS' indicating that the medical imaging data is of the pelvis). It will be appreciated that other such suitable DICOM attributes exist and may be used. In some examples, the DICOM attribute 'Reason for the Requested Procedure' (i.e., identified by DICOM Tag (0040, 1002)) may also be used.

Further, it will be appreciated that in some examples such image files other than DICOM files may be used. For example, in some examples the image file may be a Portable Network Graphics (PNG) file storing in one of its chunks medical imaging data and in another of its chunks metadata comprising one or more attributes each having an attribute value comprising a text string indicating content of the medical imaging data.

In some examples, one such text string may be input into the trained machine learning model (e.g., trained neural network). However, in other examples, multiple such text strings from multiple attribute values of multiple attributes of medical image data files IF associated with the target medical image study and/or the target medical image series TMIS may be input together into the trained machine learning model (e.g., trained neural network) in order to determine the body part represented by the medical imaging data of the first file. For example, this may provide for more accurate and/or robust determination of the body region. For example, the accuracy with which the trained machine learning model (e.g., trained neural network) determines the body region may be improved by increased input data (number of such text strings from the first file) on which the determination is based. As another example, if one of the text strings happens to be unreliable and/or missing (e.g., as it has been found can be the case for e.g., 'Body Part Examined' because it is not routinely or reliably filled out by radiologists), then the input of multiple text strings may mitigate this and still allow for a reliable determination of the body region to be determined.

Figure 8:
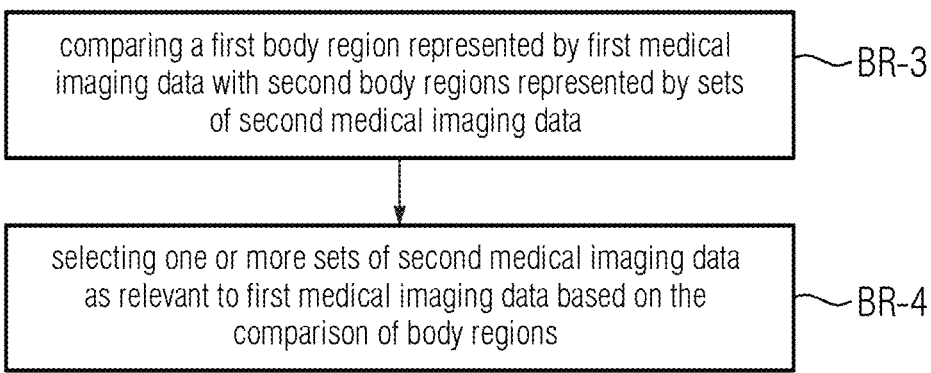
FIG. 8 schematically depicts a method for selecting a reference medical image study according to an embodiment.

FIG. 6 illustrates a flow between components of the method described above with reference to FIGS. 1 to 5, according to an example. Referring to FIG. 8, as mentioned, one or more of the text strings 404 corresponding to the target medical image study TS are input into a trained machine learning model 406, and the trained machine learning model 406 outputs a body region 408.

In some examples, as illustrated, the one or more text strings 404 may be extracted from image files IF corresponding to the target medical image study TS. Specifically, the one or more text strings 404 may be extracted from image files IF associated with the target medical image study TS without extracting the medical imaging data thereof. For example, taking the DICOM file IF as an example, the image file may be parsed to locate one or more predefined Tags identifying the attributes having attribute values to be extracted (e.g., DICOM Tag (0008, 1030) for the 'Study Description' attribute and DICOM Tag (0008, 103E) for the 'Series Description'). Once the Tags are located, the attribute values (i.e., the text strings 404) of the one or more attributes identified by the one or more Tags may be extracted from image files IF associated with the target medical image study TS. The extracted text strings 404 may be stored, for example in association with an identifier for the target medical image study TS or for the medical imaging data thereof. In some examples, the text strings 404 of image files IF associated with the target medical image study TS may have been extracted from the image files IF associated with the target medical image study TS or otherwise obtained in advance of the method being performed, and, e.g., stored in association with an identifier for image files IF associated with the target medical image study TS or for the medical imaging data ID thereof. In either case, the one or more text strings 404 are obtained and input into the trained machine learning model 406.

In some examples, only one text string may be used. However, in some examples, a plurality of the text strings 404 of an image file IF associated with the target medical image study TS or candidate medical image studies CS may be obtained and input into the trained machine learning model 406. For example, the text strings of the attribute values of all of the attributes 'Study Description', 'Series Description', and 'Body Part Examined' of a DICOM file IF may be obtained and input into the trained machine learning model 406 so that the trained machine learning model 406 outputs the body region represented by the medical imaging data of that file based on all of these input text strings. For example, the text strings may be concatenated and input into the trained machine learning model 406 together. In any case, the output 408 from the trained machine learning model 406 is obtained, thereby to determine the body region 408 represented by the medical imaging data.

As mentioned, the machine learning model 406 has been trained to output a body region based on an input of one or more such text strings. That is, the machine learning model is trained to output a body region represented by medical imaging data of an image study TS, CS based on an input of one or more text strings, indicating content of the medical imaging data, of one or more attribute values of one or more attributes of the image file IF.

In some examples, the trained machine learning model 406 may be a trained neural network 406. Indeed, in the examples described hereinafter, a trained neural network 406 will be referred to. However, it will be appreciated that in other examples, other types of machine learning models trained to output a body region based on an input of one or more text strings may be used. For example, in other examples the trained machine learning model may take the form of a trained random forest algorithm or the like. For example, the random forest algorithm may comprise an ensemble of decision trees trained on training data including training text strings labelled with their associated body region (e.g., as determined by an expert), i.e., to configure the ensemble of decision trees so as to minimize the error in the prediction of the body region as compared to the labelled body region for the training text strings. However, as mentioned, hereinafter the example of a trained neural network 406 is referred to. The use of a trained neural network 406 may have certain advantages, as discussed in more detail below.

In some examples, the neural network 406 may be a deep neural network (i.e., with one or more hidden layers). In some examples, the neural network may be trained using supervised learning. For example, the neural network 406 may be trained using a training data set comprising a plurality of training text strings (in practice there may be 100s or 1000s of training text strings), each training text string being from an attribute value of an attribute of an image file and indicating content of medical imaging data further stored in the image file. For example, the training text strings may be text strings extracted from attribute values of appropriate attributes of a DICOM image file (e.g., 'Study Description', 'Series Description', 'Body Part Examined' etc.). In some examples, similarly to as described above, each training text string may represent a concatenation of a plurality individual such text strings of different appropriate attributes of an image file. In any case, each training text string may be labelled with a body region to which the training text string corresponds. For example, in some examples, the training text string may be labelled with the actual body region represented by the medical imaging data of the file from which the training text strings originates, the actual body region being determined by an expert practitioner, for example. In some examples (as described in more detail below with reference to FIG. 7), the training text string may be labelled with the body region determined to correspond to or be represented by the text string itself, as determined by an expert, for example. In either case, the body region label of each text string may be used as a supervisory signal in the training of the neural network.

In some examples, the trained neural network 406 may be configured to output the body region 408 in the form of a body region classification that a classifier portion of the trained neural network 406 has selected among a plurality of body region classifications for the input one or more text strings. For example, each classification may be a standardized word representing a body region, such as "ABDO-MEN", "PELVIS", "CHEST" and the like. In such examples, each training text string may be labelled with the classification to which it belongs, and this may be used as a supervisory signal for training the neural network. For example, the training may comprise deep learning. For example, the training may comprise updating the weights of the connections between layers of neurons in the neural network so as to minimize the error between the classification predicted by the classifier for each of the training text strings and the actual classification of each of the training text strings as defined by their respective labels.

In some examples, the trained neural network 406 may be configured to output the body region 408 in the form of one or more numerical values, representing a region of a human body, that a regressor portion of the trained neural network 406 has calculated for the input one or more text strings 404. For example, the one or more numerical values may those of a 'body ruler', i.e., a ruler or scale defined for a human body where a value of 0.0 represents the tip of a human toe and a value of 1.0 represents the topmost portion of a human head (for example), with values in between 0 and 1 representing respective regions of the human body between the toe tip and the top of the head. In some examples, a two such numerical values may be used to represent a body region of the human body. For example, the two values may indicate the locations between which the body region is defined. For example, a bladder may be assigned the body ruler value [0.5, 0.55]. In such examples, each training text string may be labelled with the one (or more, e.g., two) numerical values representing the body region to which it corresponds, and this may be used as a supervisory signal for training the neural network 406. For example, the training may comprise deep learning. For example, the training may comprise updating the weights of the connections between layers of neurons in the neural network so as to minimize the error between the one (or more) numerical values predicted by the regressor for each of the training text strings and the actual one (or more) numerical values of each of the training text strings as defined by their respective labels.

Outputting the body region as one or more numerical values may allow for a precise and/or flexible determination of the body region represented by the medical imaging data of the study CS, TS. For example, the numerical values are continuous and hence may be able to define a body region more precisely and with more flexibility for example as compared to use of a limited set of predefined classes. This may, in turn, allow for flexible and/or precise comparison of body regions, for example when selecting a medical image study RS as relevant to the first medical imaging data, as described in more detail below with reference to FIG. 8.

In some examples, the trained neural network 406 may be a trained character-based neural network 406 configured to take as input individual characters of the obtained one or more text strings 404. In these examples, inputting the obtained one or more text strings 404 into the trained neural network 406 may comprise inputting individual characters of the obtained one or more text strings into the trained neural network 406. For example, the neural network 406 may comprise an encoder configured to encode each character of the input text string into a vector. For example, this may be done using a character embedding such as a 1-hot encoding for a vocabulary of characters including the alphabet, numerals 1 to 9, and special characters. These vectors may be used by the neural network 406 as a basis for determining the body region. Different architectures may be used.

For example, in some examples, the neural network 406 may comprise a character based Recurrent Neural Network (RNN), such as a Long Short-Term Memory (LSTM) RNN, such as a bidirectional LTSM. The vector for each character of the text string may be input sequentially into the RNN, after which the RNN will have a certain internal state (e.g., a vector representing the values of neurons thereof at the time when the vector for the last character of the text string is input). This internal state may then be passed to the regressor or classifier of the neural network 406, which may then map the internal state onto a body region 408.

As another example, the neural network 406 may comprise a character based convolutional neural network (CNN). In these examples, the vectors for the successive characters of the text string may be assembled side by side to create a matrix. Convolutions and pooling operations may then be applied to the matrix to determine a condensed feature vector representing features present in the text string. The feature vector may then be passed to the regressor or classifier of the neural network 406, which may then map the feature vector onto a body region. The features by which the body region may be accurately mapped may themselves be learned during training of the neural network 406.

In some examples, other neural networks, e.g., word-based neural networks may be used. However, the neural network 406 comprising a character-based neural network may provide for determination of a body region that is robust with respect to abbreviations or misspellings or other words which were not part of the training data. For example, 'ABDOMEN' may be abbreviated as 'ABD', but since the first few letters are the same then the character-based neural network may generate a vector for these two words that are in a similar position in vector space (and hence appropriate body region may be determined), whereas a word-based neural network may determine 'ABD' as out-of-vocabulary. This, in turn, may help provide an accurate determination, as out-of-vocabulary words can reduce accuracy.

As mentioned, each training text string may be labelled with a body region to which the training text string corresponds, and in some examples the training text string may be labelled with the body region determined to correspond to or be represented by the text string, as determined by an expert. As described with reference to FIG. 7, in such cases, the training data set (comprising the training text strings and their labels) may be generated using a Graphical User Interface (GUI) 502. The GUI 502 may be configured to present one or more of the training text strings 508 and a representation of a human body 510 divided into selectable body regions 511 to a user. The GUI may be configured to, for each of the one or more presented training text strings 508, receive a user input selecting a body region 511 from the representation 510, and label the training text string 508 with a label 509 indicating the selected body region 511. In such a way a training data set comprising training text strings labelled with body region labels can be generated.

For example, referring to the specific example in FIG. 7, the GUI 502 comprises a progress bar 504 which indicates to the user the particular pane of the GUI that is currently being displayed. The title of the particular pane is also shown 506, which in this case is "Annotate Key Words". In this example, the training text strings 508 are keywords extracted from attribute values of attributes of image files that store medical imaging data. In the illustrated example the keywords include 'aaa', 'ab', 'abdpel', 'abdroutine', 'aquired', 'aif', 'angiogram', and 'ascities'. The user is presented with a particular keyword (in this case 'aaa' which is in bold) and asked to select one of the displayed body regions 511 of the body representation 510 to which this corresponds. The user, e.g., being an expert and knowing that 'aaa' in the medical imaging context is an abbreviation for 'abdominal aortic aneurysm' selects the abdomen part of the displayed body representation 511, and accordingly the text string 'aaa' is labelled with the body region label 'ABDOMEN'. Similar selections may be made for the other presented keywords: 'ab'—'ABDOMEN', 'abdpel'—'AB-DOMEN', 'abdroutine'—'ABDOMEN', 'aif'—'HEAD', 'angiogram'—'CHEST', and 'ascities'—'ABDOMEN'. It is noted that the text string 'acquired' has not been labelled with a body region because it is not associated with any particular body region, and hence will not form part of the training data set. The GUI 502 also includes selectable buttons 512, namely 'Uterus', 'Prostate', 'Unknown' and 'None'. The 'Uterus' and 'Prostate' buttons are in order to provide a body region label of 'PROSTATE' and 'UTERUS' respectively. The 'Unknown' button is for if the user does not know the body region label but, e.g., suspects it is capable of being assigned a body region label, and the 'None' button is for if the user knows that no body region is assignable to the text string (e.g., as was the case with 'acquired' above).

The GUI 502 may allow for a training data set comprising a plurality (e.g., 100s) of training text strings with the body region labels to be generated, in a simple and efficient manner. The labels are obtained using a representation (e.g., a stylized picture) of a human body, which is visual and simple for a user (including a medical professional and not necessarily a programming expert) to interact with. This simple and efficient interaction of the user with the GUI may in turn allow for the training data set to be generated (i.e., the text strings to be labeled) efficiently.

In the examples described above, the neural network 406 is trained to output a body region 408 based on the input text strings. In some examples, the neural network 406 may be further trained to output a laterality of the output body region 408 based on the input of the one or more text strings. The laterality may refer which side of the body (i.e., 'left' or 'right') the body region represented by the medical imaging data is located. For example, the output laterality may be either 'left' or 'right' as appropriate. In these examples, step 104 of the method of FIG. 5 may further comprise determining the laterality of the body region represented by the medical imaging data based on the obtained output of the trained neural network 406. As one example, this may be by providing a dedicated laterality portion of the neural network 406 trained to output a laterality based on an input of the one or more text strings. For example, this may be trained using a training data set comprising training text strings each labelled with the laterality of the body region to which the text string corresponds. As another example, this may be by expanding a set of body region classifications onto which the neural network 406 maps the input text strings, to include 'left' and 'right' versions of each body region classification. For example, this may be trained using a training data set comprising training text strings each labelled with a body region and laterality classification to which the training text string corresponds. Determining the laterality of the body region may allow for a more precise body region to be determined, which may in turn allow for more accurate selection of relevant second medical imaging data, as described in more detail below.

As mentioned, in some examples the determined body region 408 represented by the target study TS or the target medical image series TMIS may be used to select second medical imaging data relevant to (e.g., appropriate for comparison with) the target study TS or the target medical image series TMIS. For example, the body region 408 may be determined for the target medical image series TMIS based on the image files IF of a current study for a given patient, and this may be used to select one or more image data sets (e.g., stored in one or more image files IF) of one or more previous studies (the reference medical image studies RS) for the given patient that are appropriate for comparison with the target medical image series TMIS of present, i.e., target study TS (e.g., same or similar body region).

The degree of comparability or conformance of two medical image studies TS, CS may be calculated based on the respective body regions. To this end, an overlap between the respective body regions may be determined. For instance, if the body regions are provided by ways of a range of normalized or generalized coordinates for the anatomy of patients, an overlap between the two body regions may be calculated based on the respective ranges. Further, the degree of comparability or conformance may be determined by calculating a Dice score between the respective body regions in order to gauge to gauge the similarity of two output values.

Referring now to FIG. 8, there is illustrated a method of selecting at least one reference study RS as relevant for the TMIS/the target study TS.

The method comprises, in step BR-3, comparing a target body region 408 represented by first medical imaging data stored of the target study TS/a target medical image series TMIS with each of a plurality of candidate body regions represented by a respective plurality of candidate medical image studies CS. The method comprises, in step BR-4, selecting one or more of the candidate medical image studies CS as relevant to the target medical image series TMIS based on the comparison of the body regions 408.

Each the candidate medical image studies CS may comprise a plurality of (candidate) medical image series CMIS which may be of the same type as the target medical image series TMIS. Likewise, each candidate medical image study CS and the images series CMIS associated thereto may be stored in one or more image files IF. That is, each candidate medical image series CMIS and therewith each candidate medical image study CS further is associated with one or more attributes A each having an attribute value AV comprising a text string indicating content of the candidate medical image studies CS as stored in the corresponding image files IF. The target body region 408 may have been determined by applying steps BR-1 and BR-2 of the method described above with reference to FIG. 5 to the one or more text strings of the target medical image study TS. Alternatively or additionally, at least one (and in some cases all) of the candidate body regions 408 may be determined by applying steps BR-1 and BR-2 of the method described above with reference to FIG. 5 to the one or more text strings of a respective at least one (and in some cases all) of the candidate medical image studies CS.

Figure 9:
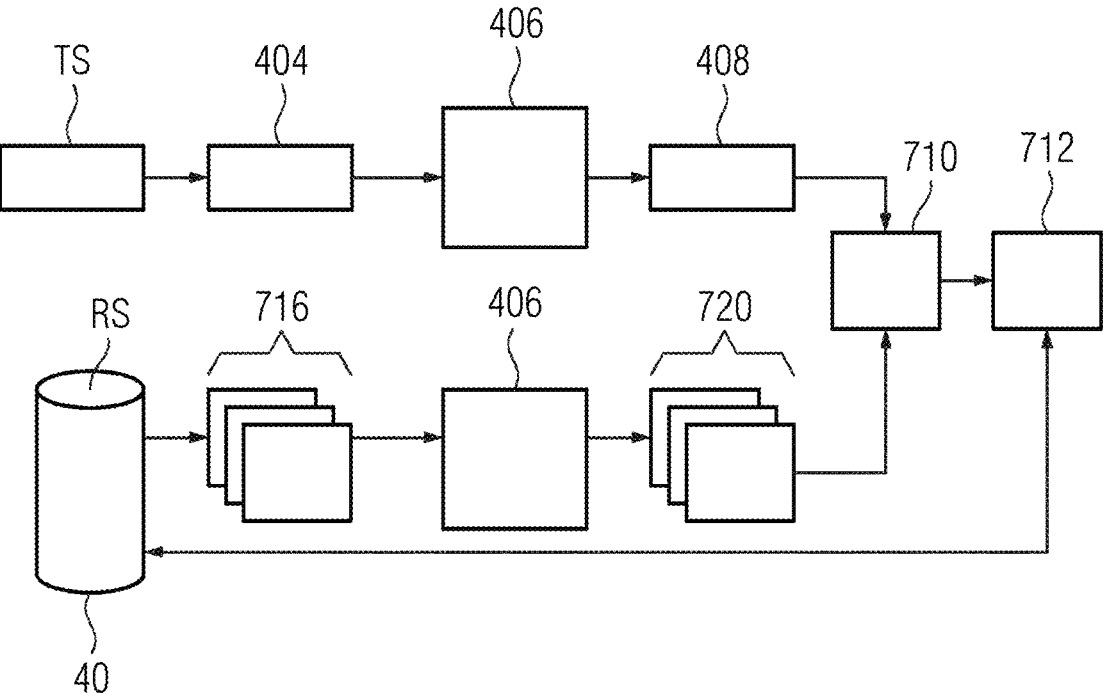
FIG. 9 schematically depicts data flows between components in a method for selecting a reference medical image study according to an embodiment.

FIG. 9 illustrates a flow between components of the method described above with reference to FIG. 8, according to an example. Referring to FIG. 9, in this example, similarly to as described above with reference to FIG. 6, one or more of the text strings 404 from image files IF of the target medical image series TMIS or the target medical image study TS are input into the trained neural network 406, and the trained neural network 406 outputs a target body region 408. The target body region 408 may be stored in association with an identifier in one or more of the image files IF or a separate file.

Further, in this example, a plurality of one of more text strings 716 are extracted from a respective plurality of image data files IF of candidate medical image studies CS retrieved from the medical: information system 40. For example, each of the plurality of candidate studies may relate to a different previous study of the patient. Each of the plurality of one or more text strings 716 are input into the trained neural network 720, in turn, to obtain a respective plurality of candidate body regions 720. Each of the candidate body regions 720 may be stored in association with an identifier in one or more of the image files IF or a separate file. The target body region 408 may then be compared, by a comparator 710, with each of the plurality of candidate body regions 720 to determine a degree of conformance for each pair of target and candidate body regions, and a selection 712 of one or more of the candidate studies may be made based on the comparison. Specifically, one or more reference studies RS may be selected from the candidate studies CS in that way.

In some examples, the selection may be based only on the comparison. In other examples the selection may be based on further criteria as described in more detail below. In some examples, the selection may be a selection of the identifiers of the candidate medical image data files in association with which the body regions are stored. The selected identifiers may be used to interrogate the medical information system 40 and retrieve (e.g., prefetch) associated candidate medical image data files from the medical information system 40 (e.g., an online or near line DICOM archive device).

In some examples, the medical imaging data or image files IF of those studies (e.g., only those studies) including one of the one or more selected sets of imaging data may be retrieved from the medical information system 40. These files may be determined for by matching the 'study identifier' attribute of the file containing the selected medical imaging data. In some examples, as described in more detail below, the medical imaging data or image files of those series (e.g., only those series) including one or more of the selected sets of second medical imaging data may be retrieved from the medical information system 40. These files may be determined for example, by matching the 'series identifier' attribute of the file containing the selected medical imaging data.

In any case, a rendering of one or more of the retrieved sets of second medical image data may be displayed on a display device 11.

In some examples, the target medical image series TMIS may represent a current medical image or series of medical images of a patient, and the plurality of candidate medical image series CMIS may represent previous medical images or series of medical images of the patient. For example, the target medical image series TMIS may correspond to a current study of the patient, and each of the candidate medical image series CMIS may correspond to a respective different previous study of the patient. A medical professional may wish to compare one or more images of the current study TS with those of a relevant one RS of the previous studies CS of the patient, e.g., to assess the progression of a disease between the two studies. An important criterion enabling effective comparison is that the current TS and previous studies CS (i.e., the current and previous medical images thereof) be of the same or similar body part (e.g., head, abdomen, foot). By automatically selecting the reference medical imaging data based on a comparison of the body regions determined for the target medical image data and the candidate medical imaging data, the method allows for the medical professional to compare, e.g., the medical image of the target study TS with only relevant previous medical images (e.g., those of previous studies CS of the same or similar body region), which is efficient as compared to the user having to compare with all previous medical images.

Moreover, in some examples, the plurality of sets of candidate medical image studies CS are stored in a remote storage device as part of the medical information system 40, which may be connected to the user's terminal 10. In these cases, the selected one or more sets of reference medical image studies RS (or individual image data ID of the reference study RS) may be retrieved from the remote storage device (e.g., prefetched from a DICOM archive device as part of the medical information system 40) without retrieving other ones of the plurality of sets of candidate medical imaging data. Since the body region may be determined based on text strings of attributes of the image files, the candidate medical imaging data of those files need only be retrieved from the remote storage once they have been selected as relevant, and candidate medical imaging data not selected as relevant or to be retrieved need not be retrieved at all. As such, network resources may be efficiently deployed.

In some examples, the comparison of body regions may comprise determining whether the body region classification (e.g., 'ABDOMEN', 'CHEST') for the target medical imaging data is the same as that of the candidate medical imaging data. In some examples, if there is a match (e.g., both have the same body region classification 'ABDOMEN') then the candidate medical imaging data may be selected as relevant to the target medical imaging data.

In some examples, the comparison of body regions 408, 720 may comprise comparing the numerical values defining the body region for the target and candidate medical imaging studies TS, CS. For example, this may comprise determining whether the body region numerical value for the target medical imaging data is the same as or similar to or overlaps with that of the candidate medical imaging data. For example, if the numerical value for the target medical image study TS is 0.5, then a set of candidate medical image study CS having the numerical value 0.45 may be selected as being similar (e.g., differs by less than a predefined amount). As another example, if the numerical value for the target medical image study TS is [0.5, 0.55], then a set of candidate medical image study CS having the numerical value [0.5, 0.55] may be selected as it is the same, and a set of candidate medical imaging data having the numerical value [0.4, 0.55] may be selected as it is overlapping.

As mentioned, selecting one or more reference medical image studies RS (e.g., previous studies of a given patient) as relevant to the target medical image series TMIS and, in particular, to the region of interest ROI may be based on comparing the body regions thereof. However, in some examples, the selection may be based on further factors or criteria, as described in more detail below.

Beyond the current TS and previous studies RS showing the same body part, another important criterion enabling effective comparison of the images thereof is that the TMIS and the CMIS of the reference medical image study RS are of the same or similar or comparable modality (i.e., the mode or type of medical imaging used to capture the images thereof, e.g., CT, MRI, X-ray).

Accordingly, in some examples, the method may comprise determining, for each of the plurality of series of candidate medical imaging data (i.e., of a plurality of candidate medical image series CMIS), an imaging modality relevance score between a first imaging modality of the target medical image series TMIS and a second imaging modality of the candidate medical image series CMIS of the selected medical image study RS. The imaging modality relevance score may be comprised in or factored into the degree of similarity.

In these examples, selecting the one or more series CMIS of candidate medical imaging data as relevant to the target medical imaging data may be further based on the determined imaging modality relevance score. For example, one of the series CMIS of the reference medical image study RS having a higher imaging modality relevance score may be selected for comparison with the target medical imaging data ROI, TMIS in preference to another of the series CMIS of the reference medical image study RS having a lower imaging modality relevance score. In some examples, a candidate medical image series CMIS having the same body region as the target medical image series TMIS and having the highest imaging modality relevance score may be selected as reference medical image series RMIS. In some examples, candidate medical image series CMIS having the same or similar body region as the target medical image series TMIS may be pre-selected, for example as per the method described above with reference to FIG. 8, and then one or more candidate medical image series CMIS may be selected as reference medical image series RMIS, from among the preselected sets, based on the imaging modality relevance score.

In some examples, the imaging modality used to capture the medical imaging data of a file may be determined from the attribute value AV of an imaging modality attribute A of the image file IF in which the medical imaging data is stored. For example, the imaging modality may be obtained directly from the attribute value for the 'Modality' Attribute (e.g., identified by DICOM Tag 0008, 0060) of a DICOM file IF. The DICOM 'Modality' attribute value identifies the type of equipment that acquired the medical imaging data. In the DICOM standard, the values that can represent different imaging modalities are pre-defined. For example, it is defined that 'CT' represents 'Computed Tomography', and 'MR' represents 'Magnetic Resonance', and so on. Moreover, in some examples, the imaging modality attribute value may be set automatically to the appropriate value by the software being used with the equipment to generate the image file. Accordingly, the imaging modality may be reliably obtained directly from the 'modality' attribute of the file.

The imaging modality relevance score between two modalities may be a value representing the degree to which medical imaging data captured using one modality is relevant to (i.e., appropriate, or useful for comparison with) medical imaging data captured using another modality. In some examples, the imaging modality relevance score may be determined using an imaging modality transition matrix. For example, each element of the matrix may correspond to one imaging modality relevance score between one specific imaging modality and another specific imaging modality. That is, the element $s_{ij}$ of the matrix may be the imaging modality relevance score between the target (e.g., current) medical imaging data having imaging modality i and the candidate (e.g., prior) medical imaging data having the imaging modality j. For example, the imaging modality relevance score between i=MR and j=MR (i.e., $S_{MRMR}$) may be 0.6, whereas the imaging modality relevance score between i=MR and j=CT (i.e., $s_{MRCT}$) may be 0.22. In this case, for example, if the target medical image series TMIS was captured using MR, then if two of the candidate medical image series CMIS both had the same body region as the candidate medical image series CMIS, but one set was captured using MR, but another set was captured using CT, the set that was captured using MR may be selected in preference.

In some examples, the imaging modality relevance scores (i.e., each element $s_{ij}$ of the transition matrix) may represent a probability that, given target medical imaging data associated with a particular first imaging modality i, a user (e.g., a medical professional) will select for comparison with the target medical imaging data reference medical imaging data having a particular second imaging modality j. For example, this probability may be determined based on statistical analysis of logged user interaction (prior actions) with medical imaging data. For example, data logs may record the medical imaging files that have been retrieved for a given patient by a given medical professional in a given session. Statistical processing may be applied to these logs to determine the probabilities. For example, when reviewing a current medical imaging file whose modality is MR, if it is determined that medical professionals go on to review a previous medical imaging file of the patient whose imaging modality is MR 60% of the time, but goes on to review a previous medical imaging file of the patient whose imaging modality is CT 22% of the time, then sMRMR may be determined as 0.6 and sMRCT may be determined as 0.22. This may be done for all combinations of imaging modalities to populate the transition matrix. The imaging modality relevance scores (i.e., each element sij of the transition matrix) being based on statistical analysis of actual user interaction with the medical imaging data may help ensure that second medical imaging data of an appropriate modality is selected.

In examples described above, medical imaging data of a candidate medical image series CMIS for a given patient may be selected that is relevant to (e.g., appropriate for comparison with) medical imaging data of the target medical image series TMIS for the given patient, e.g., based on body region and/or imaging modality. As mentioned, within a given study, there may be multiple series of medical images. For example, different series with a given study (specifically within a given modality, e.g., MR) may comprise medical imaging data that have been captured using different imaging parameters (e.g., for MR: Echo Time, Flip Angle, Echo Train Length, Patient Orientation etc.). Another important criterion enabling effective comparison of current and previous medical images by a medical professional may be that the medical imaging parameters used when capturing the current and previous medical images are the same or similar. Accordingly, in some examples, the selection of the second medical imaging data may alternatively or additionally be based on a comparison of imaging parameters. For example, candidate medical imaging data of a candidate series CMIS within a previous study RS for a given patient may be selected as relevant to (e.g., appropriate for comparison with) target medical imaging data of a current series TMIS based on a comparison of the medical imaging parameters used to capture images of the previous CMIS and current series TMIS.

Referring to FIG. 10, there is illustrated a method of selecting relevant medical imaging data based on imaging parameters.

In these examples, each of the image files IF associated with the CMIS of a reference medical image study RS store one or more attributes A each having an attribute value AV indicative of an imaging parameter used to capture the medical imaging data of the image file.

For example, similarly to as described above, each image file IF may be a DICOM file IF, and the one or more first attributes A having attribute values AV indicative of an imaging parameter used to capture the medical imaging data thereof comprise one or more of the DICOM attributes 'Image Orientation Patient' (identified by DICOM Tag (0020, 0037) and whose value specifies the orientation cosines of the first row and first column of the medical imaging data with respect to the patient, an example value is '[1, 0, 0, 0, 1, 0]'); "Series Description" (identified by DICOM Tag (0020, 0037) and whose value includes a description of the series, an example value is 'ax t1 whole pelvis' indicating an axial orientation); 'Echo Time' (identified by DICOM Tag (0018, 0081) and whose value specifies the time in millisecond between the middle of the excitation pulse and the peak of the echo produced in MR imaging, an example value is '4.2'); 'Repetition Time' (identified by DICOM Tag (0018, 0080) and whose value specifies the time in milliseconds between the beginning of a pulse sequence and the beginning of the succeeding pulse sequence in MR imaging, and example value is '8'); "Flip Angle" (identified by DICOM Tag (0018, 1IF-314) and whose value specifies the steady state angle in degrees to which the magnetic vector is flipped from the magnetic vector of the primary field in MR imaging, an example value is '90'); 'Echo Train Length' (identified by DICOM attribute Tag (0018, 0091) and whose value specifies the number of lines in k-space (the array of numbers representing spatial frequencies in an MR image) acquired per excitation per image, an example value is '1'); 'Scanning Sequence' (identified by DICOM Tag (0018, 0020) and whose value indicates the type of MR data captured, an example value is 'SE' indicating spin echo type MR), 'Sequence Name' (identified by DICOM Tag (0018, 0024) and whose value species a user defined name for the combination of the scanning sequence and sequence variant in MR imaging, an example value is 'spcir_242'); and 'Protocol Name' (identified by DICOM Tag (0018, 1030) and whose value specifies the name of the CT protocol, an example value is 'T2 W_TSE SENSE'). It will be appreciated that, in some examples, other such attributes, and indeed other types of image file, may be used.

An exemplary method for selecting a reference medical image series RMIS according to step S50 is depicted in FIG. 10. Corresponding data streams are shown in FIG. 11.

In the example illustrated in FIG. 10, the method comprises, in step BR-5, obtaining a first vector FV for the target medical image series TMIS, the first vector FV having been generated based on one or more of the attribute values AV indicative of an imaging parameter used to capture the target medical image series TMIS of the target medical image study TS. The method comprises, in step BR-6, obtaining a plurality of second vectors SV for a respective plurality of the sets of candidate medical image series CMIS comprised in a reference medical image study RS, wherein, for each set of second medical imaging data, the second vector SV has been generated based on one or more of the attribute values AV indicative of imaging parameters used to capture the candidate medical image series CMIS of the reference medical image study RS.

The method comprises, in step BR-7, for each of the plurality of second vectors SV, determining a similarity metric indicative of the similarity between the first vector FV and the second vector SV so as to determine a degree of comparability between the target medical image series TMIS and the respective candidate medical image series CMIS; and in step BR-8, selecting one or more of the candidate medical image series CMIS as relevant to the target medical imaging data (and, therewith, as reference medical image series RMIS) based on the determined degree of comparability. For example, in some examples, the candidate medical image series CMIS having the highest similarity metric/degree of comparability among the plurality of candidate medical image series CMIS may be selected as reference medical image series RMIS. In some examples, the two or more sets of candidate medical image series CMIS having the highest two or more similarity metrics/ degrees of comparability among the plurality of candidate medical image series CMIS may be selected as reference medical image series RMIS.

In some examples, the selection of the reference medical image data may be further based on the determined similarity metrics/the degree of comparability, i.e., in addition to the comparison of the body region and/or the imaging modality relevance score described above. For example, in some examples, medical imaging data of a previous study (e.g., containing multiple candidate medical image series CMIS) may be pre-selected among previous studies for the patient as relevant to the current medical imaging data based on the comparison of body region and/or imaging modality as described above; and a reference medical image series RMIS, among the multiple series within the pre-selected study, may be selected as relevant to the target medical imaging data based on the determined similarity metrics/ degree of comparability. In this case, the reference image data which is shown to the user as display data may be selected as relevant to the region of interest based on a comparison of the body regions, the imaging modality relevance score, and the determined similarity metric.

The method described with reference to FIG. 10 may allow for one or more reference medical image series RMIS that were captured using the same or similar imaging parameters as the image data of the target medical image series TMIS or the region of interest to be automatically selected. This may provide for efficient selection of previous medical images appropriate for comparison with a target medical image, for example as compared to opening and assessing all of the previous medical images for the patient. Moreover, the selection being based on attribute values AV (which are relatively small in size) of the image files IF allows for selection without having to extract or analyze the medical imaging data itself (which is relatively large in size), and hence may allow for efficient selection. Moreover, the selection being based on vectors FV, SV generated based on the attribute values AV may allow for a flexible selection. For example, the comparison of vectors FV, SV in the feature space may be more robust and/or flexible with respect to non-exact matches between parameters, e.g., as compared to attempting to match the imaging parameters directly.

FIG. 11 illustrates a flow between components of the method described with reference to FIG. 10, according to an example. Image files IF of a target medical image series TMIS store the target medical imaging data, e.g., the region of interest ROI, and attributes A having attribute values AV indicative of imaging parameters used to capture the target medical image series TMIS. These first attribute values AV are extracted and provided to a vectorizer 906, and the vectorizer 906 outputs the first vector FV. The plurality of candidate medical image series CMIS are stored in a storage which may be part of the medical information system 40. In some examples, each of the plurality of candidate medical image series CMIS may be from a respective different series within a reference medical image study RS. A plurality of sets of one or more second attribute values AV (each indicating imaging parameters used to capture the candidate medical image series CMIS stored in respective medical image data files IF in which they are included) are extracted. These sets of attribute values AV are provided in turn to the vectorizer 906, which outputs a respective plurality of the second vectors SV (one of each of the input sets of one or more attribute values AV). The first vector FV and/or the second vector SV may be stored in association with the files of the target medical image series TMIS or candidate medical image series CMIS (or an identifier thereof) for which it was generated. The first vector FV and each of the plurality of second vectors SV are input to a comparator 910 which determines the similarity metric between the first vector FV and each of the second vectors SV to determine a degree of comparability between the target medical image series TMIS and the candidate medical image series CMIS. The comparator 910 may output a selection 912 of one or more of the target medical image series TMIS or candidate medical image series CMIS (or identifiers thereof) based on the determined degree of comparability (e.g., the one or more with the highest degree of comparability may be selected). The selected one or more sets of candidate medical image series CMIS may then be retrieved from the storage.

In some examples, as already mentioned, the plurality of sets of candidate medical image series CMIS may be stored in a remote storage. In these examples, the method may comprise retrieving the selected one or more sets of candidate medical image series CMIS (or sets of medical imaging data of series including the selected sets of second medical imaging data) from the remote storage without retrieving other ones of the plurality of sets of candidate medical image series CMIS. This may provide for efficient use of network resources.

In some examples, the method may comprise generating display data to cause a display device (see, e.g., 11) to display a rendering of the region of interest ROI and a rendering based on image data of the selected one or more candidate medical image series CMIS. This may provide for a medical professional to visually assess the differences between the region of interest ROI (e.g., target or current) and reference (e.g., previous) medical imaging data for a patient. Since the candidate medical image series CMIS has been selected to be appropriate for comparison with the target medical imaging data/the region of interest ROI, the user can better focus on differences due to a progression of disease represented thereby, rather than differences due to non-disease related factors such as modality and imaging parameters.

In some examples, the method may comprise generating the first vector FV and/or one or more (for example all) of the second vectors SV.

In examples where one or more of the first attribute values AV or second attribute values AV comprises a text string, generating the first vector FV or the second vector SV, respectively, may comprise encoding the text string into a vector representation. For example, the text string may include words which may be encoded into a vector representation using word embeddings. For example, word embeddings map words of a dictionary onto vector space, where the words in the dictionary and the vectors for each word may be generated by applying a word embedding model to a corpus of training text. An example of a known word embedding model is "Word2vec" which uses a neural network to learn word embeddings from a corpus of training text. In some examples, pre-trained word embeddings, which for example have been pre-trained on a vast corpus of generic text, may be used. In some examples, the training text may comprise medical text such as radiology reports, medical literature and/or the text strings of attribute values of training image files. This may allow for the semantic meaning (within the context of the training text) of words and abbreviations specific to the medical field to be learned. Where the text string comprises multiple words, the vector from the word embedding for each word may be combined to generate the first vector (or part of the first vector), e.g., by concatenating, or taking an average of, the vector of the word embedding for each word of the text string. Other methods may be used.

In examples where one or more of the first attribute values AV or second attribute values AV comprises numerical values, generating the first vector FV or the second vector SV, respectively, may comprise formatting the numerical values into a vector representation. For example, one or more of the attribute values AV may be a numerical value. For example, as described above, an example value of the example DICOM attribute 'Echo Time' is '4.2'. In such examples, the attribute value may be used as an element of the first FV or second vector SV as appropriate. In some examples, the attribute value may be normalized before including it as an element of the first or second vector as appropriate. For example, the echo time attribute value may be divided by 10000 before being included as an element of the vector FV, SV. As another example, one or more of the attribute values may include a plurality of numerical values, e.g., a series of values. In such examples, the series of numerical values may be formatted into a column vector with one numerical value per element. For example, as described above, an example attribute value of the example DICOM attribute 'Image Orientation Patient' is '[1, 0, 0, 0, 1, 0]'. This may be formatted into a column vector and used as the first FV or second vector SV (or a part thereof) as appropriate.

In some examples, generating the first vector FV or the second vector SV comprises, for each of a plurality of the first or second attribute values AV, respectively, generating a third vector based on the first or second attribute value AV, respectively, and combining the third vectors to generate the first vector FV or the second vector SV, respectively. For example, the plurality of attribute values may be 'Series Description', 'Echo Time' and 'Image Orientation Patient'. In this case, a third vector may be generated for each of these three attribute values as described above, e.g., vSD vET vIOP, respectively. Then, each of these three third vectors may be concatenated to generate the first vector FV or second vector SV as appropriate, e.g., [vSD, vET, vIOP].

In some examples, determining the similarity metric/the degree of comparability may comprise, for each second vector SV, determining the Cosine similarity between the first vector FV and the second vector SV. As is known, the Cosine similarity is the dot product between two vectors and represents the similarity between the two vectors. For example, a Cosine similarity of 1 indicates the same or highly similar vectors (and hence which correspond to the same or highly similar imaging parameters) and a Cosine similarity of 0 indicates orthogonal vectors (and hence which correspond to diametrically opposed or highly dissimilar imaging parameters). In some examples, a candidate medical image series CMIS having a second vector SV with a high cosine similarity with a first vector FV of the target medical image series TMIS/the region of interest ROI is selected in preference to a candidate medical image series CMIS having a second vector SV with a low cosine similarity. In some examples, other similarity metrics may be used, such as Euclidean distance between the first vector FV and the second vector SV. In these examples, the comparator 910 may comprise a calculation unit (not shown) that calculates the Cosine similarity (or other such similarity measure) between the first and second vectors.

In some examples, the comparator 910 may comprise a neural network (not shown) trained to output a value indicative of the similarity between two vectors FV, SV based on an input of the two vectors FV, SV, e.g., in the form of a degree of comparability. In some examples, determining the similarity metric may comprise, for each of the second vectors SV, inputting the first vector FV and the second vector SV into the trained neural network; and obtaining the output from the trained neural network thereby to determine the degree of comparability as a value indicative of the similarity between the first vector FV and the second vector SV. For example, the neural network may be a deep neural network comprising one or more hidden layers of neurons between initial and final layers. The initial layer may be configured to take as input the first vector FV and the second vector SV of a fixed size. The neural network may comprise a regressor (not shown) configured to map a vector representation from a final layer of the neural network to a value (e.g., between 0 and 1) indicating the similarity between two input vectors.

In some examples, the neural network may be trained based on a training data set, the training data set comprising a plurality of pairs of such vectors (e.g., a plurality of pairs of vectors where each vector of the pair has the same format as the first vector FV and the second vector SV, respectively), each pair being labelled with a training similarity value (training degree of comparability), the training similarity value providing a supervisory signal training of the neural network. In practice, the training data set may comprise 100s or 1000s of such labelled training pairs. For example, the training may comprise deep learning. For example, the training may comprise updating the weights of the connections between layers of neurons in the neural network so as to minimize the error between the similarity value predicted by the regressor for each of the training pairs of vectors and the actual similarity value of each of the training pairs as defined by their respective labels.

In some examples, the training similarity value label may, for each of the training pairs of vectors, represent a probability that, given first medical imaging data having particular first attribute values represented in one vector of the training pair, a user will select for comparison with the first medical imaging data second medical imaging data having particular second attribute values represented in the other vector of the pair. For example, this probability may be determined based on statistical analysis of logged user interaction with medical imaging data. For example, data logs may record the medical imaging files that have been retrieved for a given patient by a given medical professional in a given session. Statistical processing may be applied to these logs to determine the probabilities. For example, for a target medical image series TMIS whose imaging parameters are X, it may be determined what percentage of the time medical professionals go on to review previous reference medical image series RMIS whose imaging parameters are Y (e.g., 60%) and what percentage of the time medical professionals go on to review previous reference medical image series RMIS whose imaging parameters are Z (e.g., 20%). In this case, two training pairs may be generated, one having the vectors representing X and Y and having the training similarity value label of 0.6, and another having the vectors representing X and Z and having the training similarity value label of 0.2. This may be done for a large number of combinations of imaging parameters to generate the training data set. The training data set being based on statistical analysis of actual user interaction with the medical imaging data may help ensure that second medical imaging data that was captured using appropriate imaging parameters is selected.

Figure 12:
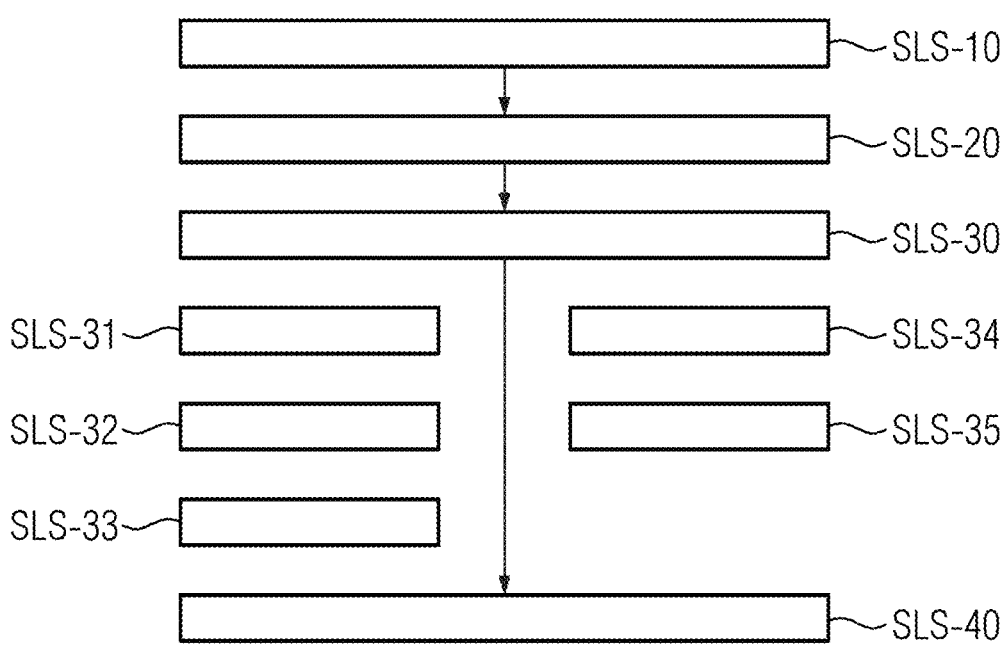
FIG. 12 depicts a flowchart illustrating a method for registering two medical image series by identifying corresponding slices according to an embodiment.
Figure 13:
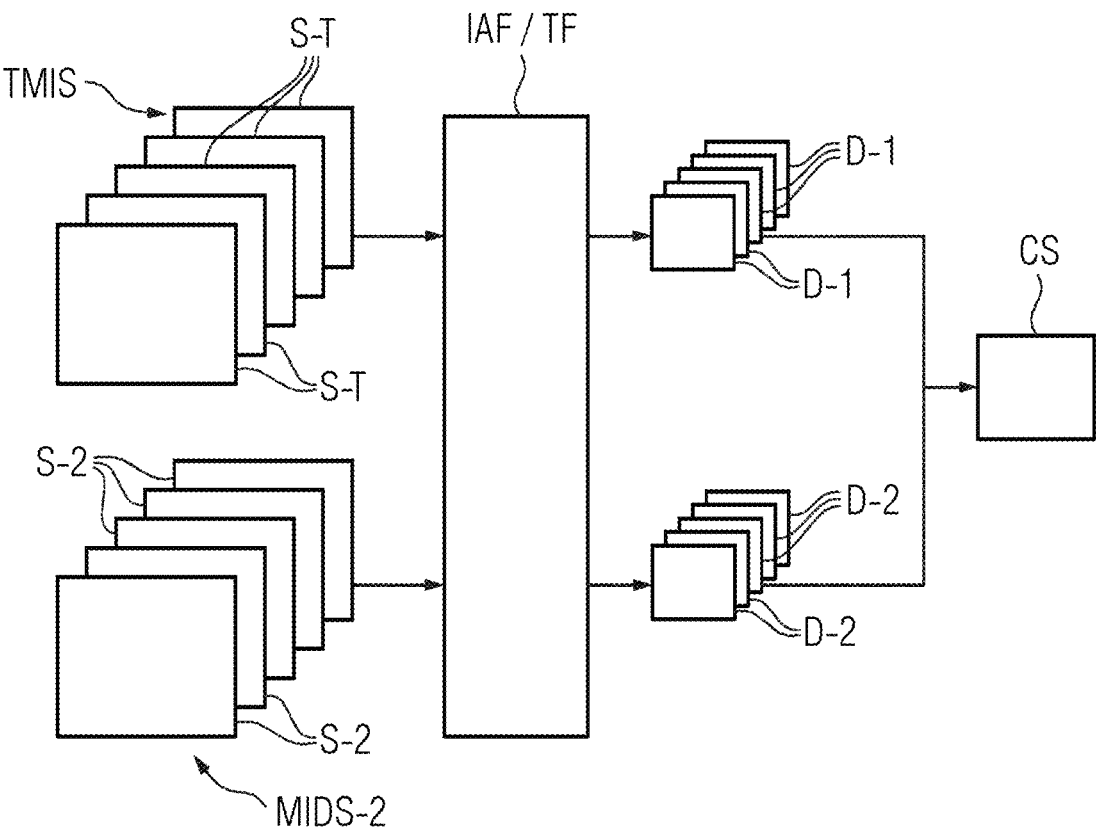
FIG. 13 schematically shows data streams associated with a method for registering two medical image series by identifying corresponding slices according to an embodiment.

FIG. 12 depicts a method for identifying corresponding slices of medical image series TMIS and RMIS as a way to perform the registration according to step S60 in an embodiment. Corresponding data streams are illustrated in FIG. 13. The method comprises several steps. The order of the steps does not necessarily correspond to the numbering of the steps but may also vary between different embodiments of the present invention. Further, individual steps or a sequence of steps may be repeated.

The target medical image series TMIS and the reference medical image series RMIS relate to three-dimensional image data depicting a body part of the patient. Specifically, the target medical image series TMIS comprises a plurality of image slices S-1 (in the following denoted as "first slices S-1)" respectively depicting a certain section of the target image volume and the reference medical image series RMIS may likewise comprise a plurality of image slices S-2 (in the following denoted as "second slices S-2)" respectively depicting a certain section of the reference image volume.

According to some examples, the target medical image series TMIS and the reference medical image series RMIS relate to the same anatomy of the same patient but have been acquired at different points in time. According to some examples, the target medical image series TMIS relates to a current image study the user is supposed to analyze and the reference medical image series RMIS relates to a prior study showing the same body part but at an earlier point in time. By analyzing target medical image series TMIS in conjunction with the reference medical image series RMIS, the user may thus infer how a disease progressed or if a particular treatment was successful. To assist the user in this respect, the method of FIG. 12 synchronizes or registers the target medical image series TMIS and the reference medical image series RMIS in that corresponding slices CS in the target medical image series TMIS and the reference medical image series RMIS are identified.

At step SLS-10, the target medical image series TMIS is received. Step SLS-10 may involve manually selecting the target medical image study TS by the user with the user interface 10 and/or retrieving the target medical image series TMIS from the medical information system 50. Further, step SLS-10 may involve automatically selecting the target medical image series TMIS based on the case and the task at hand. To this end, a data identifier, such as a patient or study identifier, may be used to query the medical information system 40 for appropriate series. Step SLS-10 may be performed at least partially either on user interface 10 or on processing system 20. Corresponding data exchange is included in this step where necessary.

At step SLS-20, the reference medical image series RMIS is obtained. Thereby, the processing may follow the steps outlined in connection with FIGS. 8 to 9 and involve the selection of an appropriate reference medical image study RS from a plurality of candidate medical image studies CS and the selection of the reference medical image series RMIS from a plurality of candidate medical image series CMIS associated with the reference medical image study RS.

In step SLS-30 a slice correspondence CS between the target medical image series TMIS and the reference medical image series RMIS is established which links distinct slices S-1 of the target medical image series TMIS to corresponding slices S-2 of the reference medical image series RMIS where possible. In other words, step SLS-30 seeks to identify, for each slice S-1 of the target medical image series TMIS, exactly one corresponding slice CS of the reference medical image series RMIS. Thereby, it may happen that it is not possible to find a corresponding slice CS in the reference medical image series RMIS for a given slice S-1 in the target medical image series TMIS and vice versa. This may be the case, if an anatomical position of a slice S-1, S-2 comprised in one medical image series. RMIS is not covered by the respective other medical image series RMIS, TMIS. In this case, according to some examples, no association of a corresponding slices is being made. The image processing of step SLS-30 (and all optional steps) may predominantly be performed on processing system 20.

In the following, optional sub-steps SLS-31 to SLS-35 set out some exemplary embodiments, how the identification of corresponding slices CS of step SLS-30 may be put into practice. They provide several examples in this regard but are not to be considered as limiting the scope of step SLS-30 as they do not exclude further possibilities how a similarity between image slices S-1, S-2 can be determined. For instance, as an alternative to an explicit extraction of image descriptors D-1, D-2 and their ensuing comparison, a Fourier-based analysis scheme may be implemented. Here, individual images or image regions would be transformed into the Fourier space and a similarity would be calculated by applying mathematical convolution functions.

An optional step SLS-31 is directed to resampling the reference medical image series RMIS based on the target medical image series TMIS for bringing it into a better shape for the ensuing slice-by-slice registration of the two medical image series. This may involve defining a plurality of slices S-2 of appropriate slice thickness and stacking direction in the reference medical image series RMIS. This may further involve resampling already existing slices S-2 in the reference medical image series RMIS such that they have an appropriate slice thickness and orientation. In particular, the reference medical image series RMIS may be resampled such that the slices S-2 of the reference medical image series RMIS are comparable to the slices S-1 of the target medical image series TMIS in terms of thickness, spacing, slice direction, and so forth. Self-speaking, this may also be implemented the other way round with the target medical image series TMIS being adapted to reference medical image series RMIS. Moreover, step SLS-31 may comprise other image processing steps for improving the comparability of the reference medical image series RMIS with the target medical image series TMIS. This may comprise reading the image processing steps done to the image data comprised in the target medical image series TMIS (which may be encoded in a meta-data file of the target medical image series TMIS, for instance) and applying the same image processing steps to the reference medical image series RMIS.

A further optional step SLS-32 is directed to providing a trained function TF which is configured to determine and, in particular, quantify an image similarity between two-dimensional medical images. In particular, the trained function may be configured to carry out the subsequent steps SLS-33 to SLS-35. It is to be understood, however, that the subsequent steps SLS-33 to SLS-35 may also be carried out without the use of trained functions, i.e., by image analysis functions IAF with hard-coded functionalities which implement one or more deterministic rules, e.g., for selecting features from image data and determining degrees of similarity on that basis.

At step SLS-33, image descriptors D-1 are extracted from each slice S-1 of the target medical image series TMIS. The image descriptor D-1 may comprise the representative or characterizing features of the slices S-1 in the form of an image feature vector. Since the target medical image series TMIS may generally comprise image data as well as it is associated to non-image data, the image descriptor D-1 may likewise be based on image feature signatures and non-image features. Image feature signatures may be generated by image analysis methods comprising the identification, analysis and/or measurement of objects, local and or global structures and/or textures present in any image data comprised in the target medical image series TMIS. The generated image feature signatures may comprise an anatomical feature and/or structure, like e.g., the presence of a landmark or the size of an organ or a structure, texture and/or density of an identified tissue or organ and so forth. The image feature signatures may likewise comprise a parameter characterizing a color and/or grey scale scheme or contrast characteristics or local gray scale gradients present in the analyzed image. The image feature signatures preferably comprise not only one but numerous features which as a sum characterize the analyzed image. The non-image features extracted from the non-image data comprised in the target medical image series TMIS may comprise meta-data associated to the image data. Further, they may relate to data independent from the image data providing further context information with regard to the target patient, such as features extracted from the electronic health record, laboratory data, and the like.

At step SLS-34 corresponding image descriptors D-2 are extracted from the reference medical image series RMIS. The image descriptors D-2 of the reference medical image series RMIS may be generated in the same way as the image descriptors D-1 for target medical image series TMIS. According to some examples, the image descriptors D-2 of the reference medical image series RMIS already have been generated before and are stored together with the reference medical image series RMIS in medical information system 40.

In step SLS-35, the extracted image descriptors D-1 and D-2 are compared to identify corresponding slices CS in the target medical image series TMIS and the reference medical image series RMIS. The comparison may be carried once again by applying the similarity or distance metrics as introduced in connection with FIGS. 10 and 11. The comparison may be pairwise, i.e., each slice S-1 of the target medical image series TMIS is compared with each slice S-2 of the reference medical image series RMIS. As an alternative, the comparison may occur in triplets where each slice is compared with two slices of the respective other medical image data set MIDS-1, MIDS-2 with the more similar slice of the two being retained for the next comparison. For each slice S-1, S-2 of a medical image series exactly one or no corresponding slice CS of the respective other medical image data set MIDS-1, MIDS-2 is identified to provide an unambiguous association of slices S-1, S-2 between the two medical image series. No corresponding slice may be found, if a slice of one medical image series is outside of the imaging region of the respective other medical image series or if the slice-resolution of a medical image series is, e.g., too coarse to provide a match for each and every slice S-1, S-2 of the medical image series it is compared with (if this is not corrected in optional step SLS-31). To make sure that the identified assignment between the slices S-1, S-2 of the reference medical image series RMIS and the target medical image series TMIS conserves the respective slice orders and to resolve ambiguities, additional constraints or auxiliary conditions may be provided that the final result has to fulfill. Such constraints may be provided for by the order of the slices in the reference medical image series RMIS and the target medical image series TMIS and/or an overall degree of similarity (which should be maximized).

The result of step SLS-30 may be conceived as an assignment which unambiguously assigns slices S-1, S-2 of the reference medical image series RMIS and the target medical image series TMIS to one another. This result may also be designated as "slice correspondence" CS. Thus, the slice correspondence CS may be conceived as a form of a registration between the target medical image series TMIS and the reference medical image series RMIS.

At step SLS-40, this result may be provided to the user or subsequent processing steps. Step SLS-40 may be performed at least partially either on user interface 10 or on processing system 20. Corresponding data exchange is included in this step where necessary.

Figure 14:
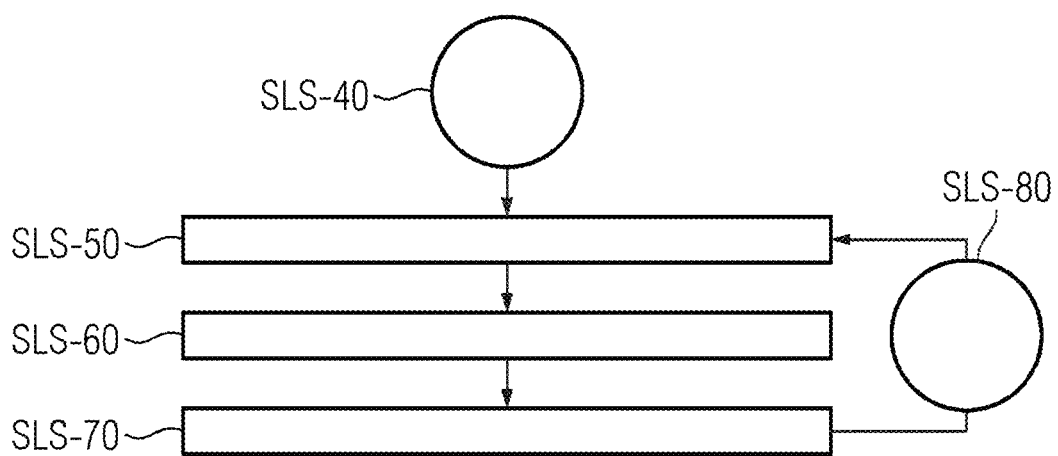
FIG. 14 depicts a flowchart illustrating further method steps based on an identification of corresponding slices of medical image series according to an embodiment.

FIG. 14 depicts optional methods steps that may be executed based on methods for identifying corresponding slices of medical image series according to some embodiments. In particular, the optional method steps shown in FIG. 6 may follow step SLS-40. The order of the steps does not necessarily correspond to the numbering of the steps but may also vary between different embodiments of the present invention. Methods steps indicated with like reference numerals as in FIG. 12 correspond to the method steps introduced and explained in connection with the embodiments of FIG. 12.

In particular, FIG. 14 illustrates how the slice correspondence CS determined in step SIS-30 may be used to synchronize the views of two medical image series. A use case for the embodiment of FIG. 14 may occur if the user has opened the target medical image series TMIS and is looking at a particular slice S-1 or region of interest ROI and the reference medical image series RMIS has been retrieved as a reference for comparison. Here, the similar slice search introduced in connection with FIGS. 12 and 13 enables to automatically match any slice S-1 of the target medical image series TMIS with the corresponding slice S-2 of the reference medical image series RMIS to the effect that if a user selects one slice, e.g., for viewing, he may be automatically provided with the respectively corresponding slice CS. The slice S-2 of the reference medical image series RMIS corresponding to the region of interest ROI may also be designated as "reference slice" REF-SLC.

Specifically, at step SLS-50, an input from the user is received which is indicative of a selection of a slice S-1, S-2 in either the target medical image series TMIS or the reference medical image series RMIS. The user input may, for instance, be input into the system 1 via the user interface 10. The user input may be in the form of a scrolling action while scrolling through one of the target medical image series TMIS or the reference medical image series RMIS to arrive at a desired slice S-1, S-2. For instance, such scrolling may be input using scroll wheels or jog dials or wheels, action buttons or sliders in an appropriate graphical user interface, gestures, voice commands or the like. Further, such user input may directly indicate the desired slice the user wants to see, e.g., by clicking on a z-axis bar indicating the z-position of the slice S-1, S-2 in the respective stack or by directly inputting the slice number. In particular, a slice S-1 of the target medical image series TMIS may be selected implicitly by defining a region of interest in the target medical image series TMIS. Step SLS-50 may be performed at least partially either on user interface 10 or on processing system 20. Corresponding data exchange is included in this step where necessary.

At step SLS-60, the respectively corresponding slice CS with respect to the slice S-1, S-2 currently selected by the user is identified. To this end, the method reverts to the slice correspondence CS determined in step SLS-30. Based on the slice correspondence CS, the system 1 may then calculate which slice of the respective other medical image series corresponds to the slice currently selected (viewed) by the user. In the case of the reference medical image series RMIS this may lead to the identification of the reference slice REF-SLC which corresponds to the region of interest ROI. Step SLS-60 may predominantly be performed on processing system 20.

At step SLS-70, the identified corresponding slice CS and/or the reference slice REF-SLC is provided. "Provided" in this case may mean displaying the identified corresponding slice CS and/or the reference slice REF-SLC (by generating corresponding display data on the basis of the identified corresponding slice) to the user in an appropriate graphical user interface. According to some examples, the identified corresponding slices CS/the reference slice REF-SLC of the synchronized medical image series may be displayed together with the currently selected one/the region of interest ROI. For instance, the two slices REF-SLC, S-1 could be displayed side by side in an appropriate graphical user interface. Step SLS-70 may be performed at least partially either on user interface 10 or on processing system 20. Corresponding data exchange is included in this step where necessary.

Step SLS-80 is a repeat step indicating that steps SLS-50 to SLS-70, i.e., the receipt of a user input (SLS-50), the identification of a thereto corresponding slice CS (SLS-60), and the output of the corresponding slice CS (SLS-70) may be repeated multiple times. Accordingly, the corresponding slice CS may be dynamically adapted to the slice S-1 currently selected by the user. In other words, the corresponding slice CS is updated whenever the user selects a new slice in one medical image series. With that, the user can simultaneously scroll through two image series. Step SLS-80 may be performed at least partially either on user interface 10 or on processing system 20. Corresponding data exchange is included in this step where necessary.

Figure 15:
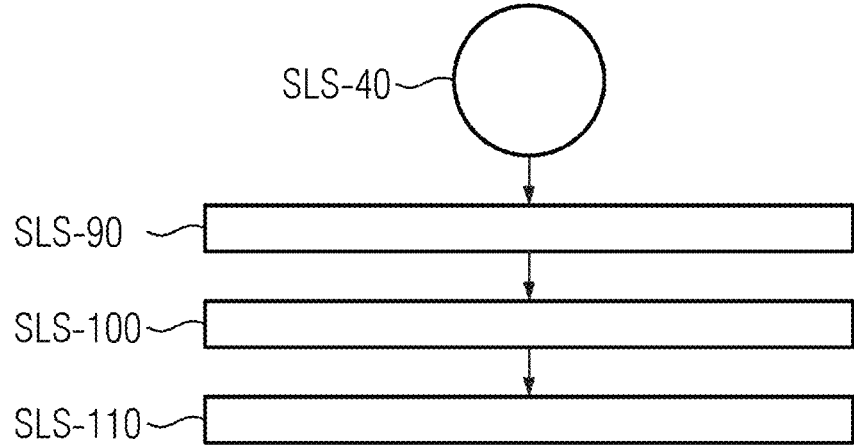
FIG. 15 depicts a flowchart illustrating further method steps based on an identification of corresponding slices of medical image series according to an embodiment.

FIG. 15 depicts optional methods steps that may be executed based on methods for identifying corresponding slices CS of medical image series according to embodiments of the present invention. In particular, the optional method steps shown in FIG. 15 may follow step SLS-40 and may be used as additional measure to determine a reference medical image series RMIS at step S50. The order of the steps does not necessarily correspond to the numbering of the steps but may also vary between different embodiments of the present invention. Methods steps indicated with like reference numerals as in FIG. 12 correspond to the method steps introduced and explained in connection with the embodiment of FIG. 12. Further, individual steps or a sequence of steps may be repeated.

In particular, FIG. 15 illustrates how the similar slice search explained in connection with FIG. 4 can additionally be used to infer whether or not two medical image series are comparable and therefore suited for comparative reading by a user. Specifically, the slice correspondence CS is used to determine an overlap of the imaging volumes of the target medical image series TMIS and a candidate medical image series CMIS. The higher this overlap the better can the two medical image series allegedly be compared.

Accordingly, step SLS-90 is directed to determine, based on the slice correspondence CS provided in step SLS-40, an anatomic overlap of the corresponding medical image series TMIS and CMIS. The anatomic overlap may be determined from the number of slices respectively corresponding to one another in the two medical image series TMIS and RMIS. According to further examples, the anatomic overlap may be determined from those corresponding image pairs marking the end of the overlapping area of the two medical image series TMIS and CMIS. The anatomic overlap may be measured in arbitrary units along the stacking direction of the slices S-1, S-2 in the two medical image data series TMIS and CMIS. Step SLS-90 may predominantly be performed on processing system 20.

At step SLS-100, a degree of comparability for the two medical image series TMIS and CMIS is calculated based on the anatomic overlap. According to some examples, the degree of comparability may be the anatomic overlap as such. According to further examples, additional information may be factored in. Such additional information may, for instance, be the time span between the two medical image series TMIS and CMIS have been acquired (the more time has elapsed the less comparable two image series may be), the type of the respective image modality used for acquiring the two medical image series TMIS and CMIS (data acquired with like modalities may be more comparable), meta-data comprised in the two medical image series TMIS and CMIS and so forth. Step SLS-100 may predominantly be performed on processing system 20.

At step SLS-110, the degree of comparability is provided. "Provided" may mean that the determined degree of comparability is brought to the attention of the user. If two image series are difficult to compare, the user may thus receive a warning message and may be select another one for comparative reading. Further, "provided" may mean that the degree of comparability is put on record for the two medical image series TMIS and CMIS, i.e., stored in the medical information system 40 for later use. Further, provided may mean that the degree of comparability is used in step S50 to automatically select a candidate medical image series CMIS as reference medical image series RMIS. Step SLS-110 may be performed at least partially either on user interface 10 or on processing system 20. Corresponding data exchange is included in this step where necessary.

Figure 16:
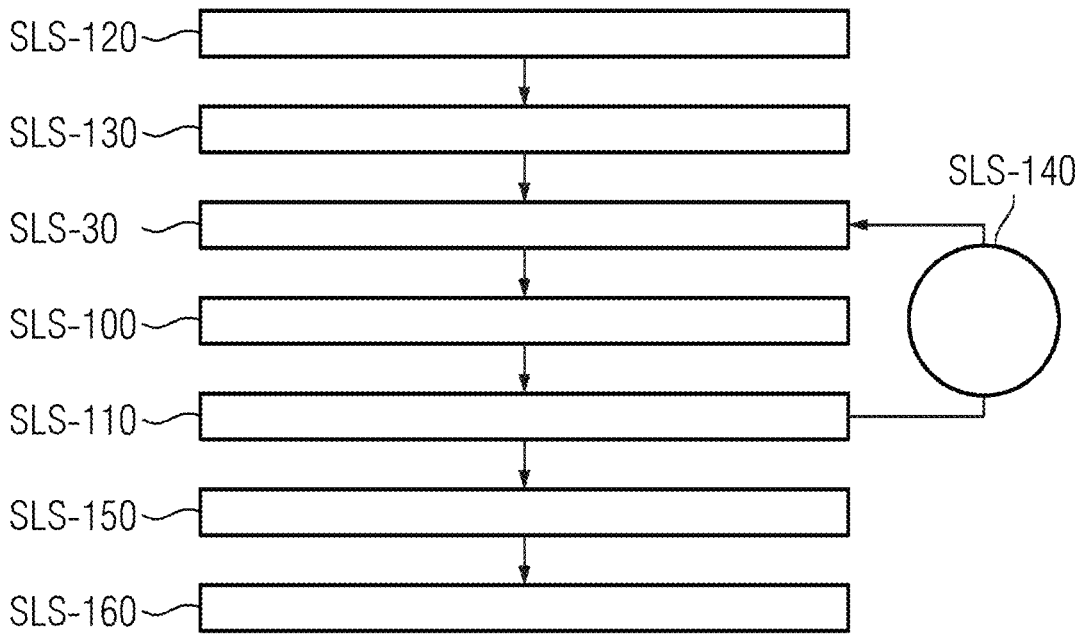
FIG. 16 depicts a flowchart illustrating a method for selecting one or more medical image series according to an embodiment.

FIG. 16 depicts a method for determining a degree of comparability of medical image data series the reference medical image series RMIS and one candidate medical image series CMIS. The method comprises several steps. The order of the steps does not necessarily correspond to the numbering of the steps but may also vary between different embodiments of the present invention. Methods steps indicated with like reference numerals as in FIGS. 12 and/or 15 correspond to the method steps introduced and explained in connection with the respective embodiments. Further, individual steps or a sequence of steps may be repeated.

The embodiment shown in FIG. 16 builds on the above embodiments to provide a method capable of automatically evaluating and/or selecting a reference medical image series RMIS for comparative reading from a plurality of candidate medical image series CMIS into question.

A first step SLS-120 is directed to receive a target medical image series TMIS. The target medical image series TMIS may be conceived as the current study of a patient which the user is about to read. Apart from that, step SLS-120 corresponds to step SLS-10.

Step is directed to retrieve a plurality of candidate medical image series CMIS which come into question for comparative reading in conjunction with the target medical image series TMIS. This may involve identifying a reference medical image study RS as described in connection with step S40. Alternatively, the candidate medical image series CMIS may also be obtained differently, e.g., by querying medical information system 40 directly for appropriate candidate medical image series CMIS which may relate to different studies candidate medical image studies CS. For instance, an appropriate case or patient identifier such as the patient name or ID may be extracted from the target medical image series TMIS and used as a search term. Step SLS-130 may be performed at least partially either on user interface 10 or on processing system 20 or on medical information system 40. Corresponding data exchange is included in this step where necessary.

That followed, for each of the retrieved candidate medical image series CMIS, the steps SLS-30, SLS-100, and SLS-110 are repeated via repeat step SLS-140. These steps may predominantly be performed on processing system 20. As before, step SLS-30 identifies the slice correspondence CS between the target medical image series TMIS and the respective reference medical image series RMIS. Thereby, step SLS-30 may, in particular, comprise sub-steps SLS-31, SLS-34 and/or SLS-35 which would be repeated for each candidate medical image series CMIS. Other optional sub-steps of step S130' which are not related to the candidate medical image series CMIS, such as steps SLS-32 and/or SLS-33 are preferably not repeated for every candidate medical image series CMIS but carried out only once in the method of FIG. 16. Steps SLS-100 and SLS-110 are identical to the steps shown in connection with FIG. 15 and yield a degree of comparability for each candidate medical image series CMIS indication a comparability of the respective candidate medical image series CMIS with the target medical image series TMIS.

In step SLS-150, the degrees of comparability are provided to the user or for further processing. For instance, the degrees of comparability may be displayed to the user in conjunction with the respective candidate medical image series CMIS. With that, the user may be provided with a quick overview which of the available candidate medical image series CMIS is suited for follow-up reading. Accordingly, the user is brought into a position where he may purposefully select appropriate candidate medical image series CMIS as reference medical image series RMIS. Step SLS-150 may be performed at least partially either on user interface 10 or on processing system 20. Corresponding data exchange is included in this step where necessary.

Further, the degree of comparability may be used to automatically select or pre-select appropriate candidate medical image series CMIS as reference medical image series RMIS in step SLS-160. For instance, the system 1 may select all candidate medical image series CMIS the degree of comparability (the anatomical overlap) of which is greater than a predetermined threshold. The thus selected candidate medical image series CMIS may then be provided in step S50. Thereby, "provided" may mean presenting them to the user via user interface 10 for review and further selection and/or loading them in a temporary memory of the system 1. Step SLS-160 may be performed at least partially either on user interface 10 or on processing system 20 or on medical information system 50. Corresponding data exchange is included in this step where necessary.

Figure 17:
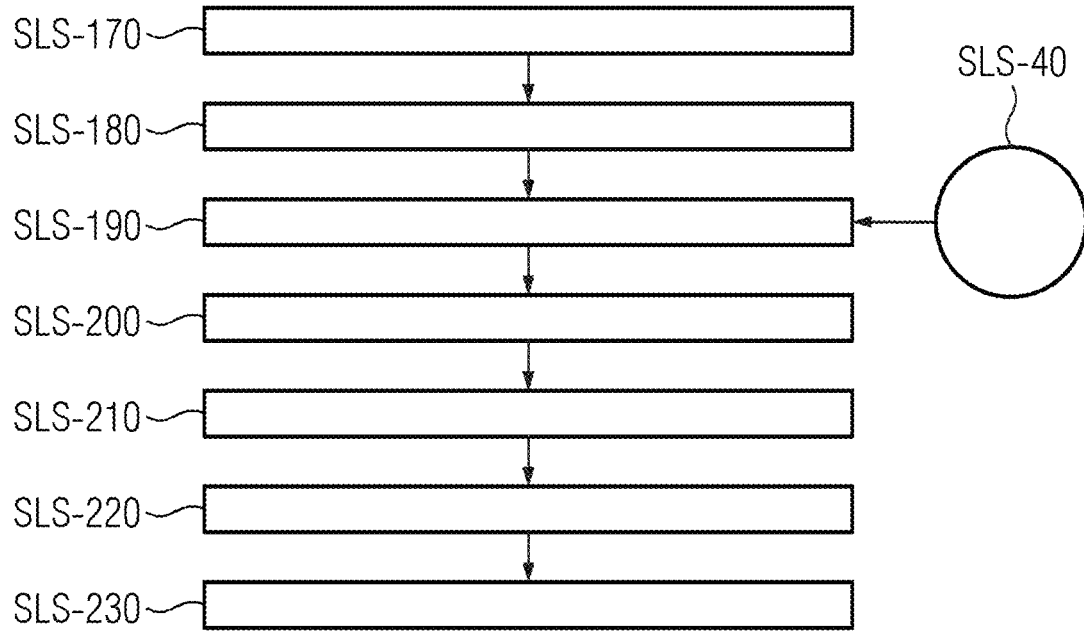
FIG. 17 depicts a flowchart illustrating a method based on an identification of corresponding slices of medical image series according to an embodiment.

FIG. 17 depicts optional method steps for determining a temporal evolution of one or more lesions using the similar slice search according to one or more of the above embodiments. The method comprises several steps. The order of the steps does not necessarily correspond to the numbering of the steps but may also vary between different embodiments of the present invention. Methods steps indicated with like reference numerals as in FIG. 12 correspond to the method steps introduced and explained in connection with the respective embodiments. Further, individual steps or a sequence of steps may be repeated.

Step SLS-170 is directed to identify, in the target medical image series TMIS, one or more relevance slices. Relevance slices are characterized in that they depict one or more lesions of a body part of a patient such as lesions in the lung or liver tissue of a patient. In addition to that or as an alternative, relevance slices may be characterized in that they comprise one or more previous annotations of a user which may, for instance, point at the presence of one or more lesions in that slice. Relevance slices may, for instance, be identified by applying an appropriate computer aided detection algorithm configured to detect lesions in medical image data. Further, relevant slices may relate to one or more regions of interest ROI as indicated by the user. Step SLS-170 may predominantly be performed on processing system 20.

Step SLS-180 is directed to detect one or more lesions in the one or more relevance slices, e.g., by using said computer-aided detection algorithms. Step SLS-180 may be comprised in step S510 if the relevance slices have been identified by detecting slices having lesions in the first place. Step SLS-180 may predominantly be performed on processing system 20.

At step SLS-190 corresponding slices are identified in the reference medical image series RMIS, which corresponding slices correspond to the relevance slices. The identification of the corresponding slices in the reference medical image series RMIS is effected on the basis of the slice correspondence CS calculated in step SLS-30 and provided in step SLS-40 of FIG. 12. Step SLS-190 may predominantly be performed on processing system 20.

At step SLS-200, one or more corresponding lesions are detected in the corresponding slices identified in step SLS-190. This again can be done by applying a computer-aided detection algorithm to the image data of the corresponding slices. Step SLS-200 may predominantly be performed on processing system 20.

At step SLS-210, the lesions detected in the target medical image series TMIS are matched with the corresponding lesions. In other words, the lesions of the target medical image series TMIS are unambiguously assigned to corresponding lesions in the reference medical image series RMIS so that pairs of a lesion and a corresponding lesion result. Lesions that cannot be assigned in that way remain unpaired and designate new or vanished lesions, as the case may be. Such new or vanished lesions may optionally be brought to the attention to the user, e.g., by outputting an appropriate marking in the image data displayed at step S70. Lesions may be matched by evaluating their position in the respective slices, their relative position to one another or with respect to other anatomical structures, their shape, their properties (such as degree of calcification, structure at the boundary, etc.), size, optical properties and so forth. For matching the lesions in step SLS-210, designated computer aided lesion matching algorithms may be applied. Step SLS-210 may predominantly be performed on processing system 20.

Step SLS-220 is directed to determine a temporal evolution of one or more of the lesions detected in the reference medical image series RMIS and the target medical image series TMIS based on the matching of step SLS-210. To this end, one or more measurement values may be extracted for each lesion and compared to the matching lesion. For instance, such measurement values may relate to geometric values such as the size, diameter, volume of the lesions and so forth. A temporal evolution results which shows the how a particular lesion progressed. Further, average values/temporal evolutions for a variety of lesion pairs may be calculated. Step SLS-220 may predominantly be performed on processing system 20.

At step SLS-220, the temporal evolution(s) thus determined is/are provided. Specifically, the temporal evolutions may be provided to a user, e.g., in the form of a trending graph or as a pop-up window which opens when the user hovers over a lesion (e.g., with a mouse cursor). Further, the temporal evolutions may be provided by associating them to the individual lesions. In addition to that or as an alternative, the temporal evolutions may be provided, i.e., included, to a structured medical report to be archived in the medical information system 50. Step SLS-220 may be performed at least partially either on user interface 10 or on processing system 20. Corresponding data exchange is included in this step where necessary.

Self-speaking, the above is not only applicable to two medical image series with the temporal evolution(s) then indicating a progression of individual lesions over more than two points in time. Further, the automated extraction of a temporal evolution for one or more lesions is compatible with the automated selection of the right reference medical image series RMIS for follow-up reading according to the foregoing embodiments. Specifically, it can be conceived that, firstly, one or more reference medical image series RMIS are determined which have a sufficient anatomical overlap with the target medical image series TMIS and then, secondly, a temporal evolution of the lesions comprised the target medical image series TMIS and the thus identified reference medical image series RMIS is inferred.

As already detailed above in connection with the other embodiments, the processing steps for identifying corresponding slices in medical image series TMIS, CMIS, RMIS may be carried out by a trained function TF configured to determine a similarity between two-dimensional medical images.

Generally, such trained functions TF may relate to intelligent agents or classifiers suited for classifying image data according to a learned task. They may relate to any type of method or apparatus capable of predicting to what extent the image data of a pair of two-dimensional medical images is similar. This definition comprises, but is not limited to, data mining tools and techniques such as Support Vector Machines, decision trees, naive Bayes or (convolutional) neural networks. Specifically, according to an implementation, the trained function TF may comprise a convolutional neural network. In an embodiment, the arrangement of the trained function TF is a fully convolutional neural network. Alternative network arrangements may be used, for example, a 3D Very Deep Convolutional Network (3D-VGGNet), wherein a VGGNet stacks many layer blocks containing narrow convolutional layers followed by max pooling layers. According to further implementations, residual neural networks (ResNet) may be used that utilize skip connections, or shortcuts to jump over some layers.

A convolutional neural network is defined in the form of a plurality of sequential layers. The term sequential is used to indicate the general flow of output feature values from one layer to input to a next layer. The information from the next layer is fed to a next layer, and so on until the final output layer. Layers may only feed forward or may be bi-directional, including some feedback to a previous layer. The layers may be weighted. Further, each layer generally comprises a number of nodes that are also weighted. Essentially, each node can be seen as executing a mathematical operation mapping one or more input values to an output value.

The nodes of each layer may connect with all or only a sub-set of nodes of a previous and/or subsequent layer. Two nodes are "connected" if their inputs and/or outputs are connected. Input values for the nodes of the input layer are image element values, preferably pixel values, of the respective region of interest ROI or slices S-1, S-2. The last layer is the output layer outputting a degree of similarity between the input image data. The output may be in the form of a continuously varying value indicative of the degree of similarity. According to other examples, the output (the degree of similarity) may take a binary form indicating whether or not two images are similar. In between input and output layer, there is a number of hidden layers. A first group of neural network layers may be applied to extract features from images. In this case, medical images, i.e., the gray scale and/or color values for each individual image element of the image, serve as input values for the neural network. The thus extracted features like, contrast, gradients, texture, density, or the like may be fed as input values to a second group of network layers, also known as classifiers, which serve to further assign objects and/or characteristics to at least one of the extracted features present in the image. Various types of layers may be used, such as convolutional, pooling (e.g., max-pooling or average-pooling), up-sampling, deconvolutional, fully connected, or other types of layers. Convolutional layers convolve the input and pass its result to the next layer by moving an image filter kernel over the input. Pooling layers reduce the dimensions of the data by combining the outputs of node clusters at one layer into a single node in the next layer, thereby streamlining the underlying computation. Up-sampling and deconvolution layers reverse the actions of convolution and pooling layer in terms of the abstraction level. A fully connected layer connects every node in one layer to every node in another layer, so that essentially every feature gets a "vote". According to an implementation, skip connections may be used, so that layers may also output to other layers than the sequentially next layer introducing one or more residual blocks or layers. Such configuration is also referred to as ResNet. Using residual blocks results in the ability to train much deeper networks as this alleviates the vanishing gradient problem known from very deep neural networks.

According to some examples, the trained function TF may be configured to carry out the task of extracting image descriptors from two-dimensional images (also referred to as encoding) and the task of evaluating the similarity between two images (i.e., determining a degree of similarity) by comparing image descriptors of these images (also referred to as decoding). Accordingly, the trained function may comprise at least an encoder branch and a decoder branch.

According to some examples, the trained function may include multiple encoder branches and a decoder branch. Each encoder branch may process a two-dimensional image to extract an image descriptor D-1, D-2 therefrom. The decoder branch processes a merged latent image descriptor data structure that is obtained from aggregating image descriptors D-1, D-2 that are obtained from the encoder branches. The multiple encoder branches processing the two-dimensional images are copies of each other that share the same parameters. The encoder branches can include convolutional layers. As a general rule, any CNN backbone like ResNet or a custom design can be used. The weights of the encoder branches may be shared between the encoder branches, enabling efficient learning and processing of each layer of the network. This means that the multiple encoder branches processing the individual two-dimensional images can share the same parameters, i.e., the same weights can be used for all encoder branches. This can be enforced during the training, by changing the weights in a shared manner. Sometimes, a concept of sharing parameters between multiple encoder branches is referred to as Siamese copies. Specifically, a network comprising two encoder branches may be referred to as Siamese network, while a network comprising three encoder branches may be referred to as triplet network. The encoder branches may be configured such that the image descriptors D-1, D-2 of dissimilar image pairs are pushed further apart in the features space of the image descriptors than the image descriptors D-1, D-2 of similar image pairs.

Processing the image descriptors D-1, D-2 in the decoding branch may mean that a learned or preset distance or similarity metric is applied to evaluate the similarity between two image descriptors D-1, D-2. The similarity metric may be configured such that a distance of two image descriptors D-1, D-2 is appropriately quantified in the feature space of the image descriptors D-1, D-2. The distance or similarity metric may take the form of mathematical functions by, e.g., outputting the cosine-similarity or the L1-norm for the respective image descriptors D-1, D-2. Further, the similarity metric may be embodied by one or more network layers with appropriately adapted weights or parameters.

Generally, the trained function TF of this embodiment learns by adapting weights or weighting parameters of individual layers and nodes based on training data. Rather than pre-programming potential signs of similar medical images, the architecture of the trained function TF is defined to learn these patterns at different levels of abstraction based on input data. Trained function TF may preferably be trained using a method according to supervised learning. Well established is the backpropagation method, which may be applied for embodiments of the present invention. During training, trained function TF is applied to training input values to produce corresponding output values the target values of which are known. The difference between produced and target output values (e.g., in the form of the mean squared error (MSE) of the difference between produced and target values) may be used to introduce a cost or loss function as a measure of how good or bad trained function TF performs. The goal of the training is to find a (local) minimum of the loss function by iteratively adjusting the weights of trained function TF so that trained function is finally enabled to generate acceptable results across a (sufficiently) large cohort of training data. This optimization problem can be carried out using stochastic gradient descent or other approaches known in the art.

In principle, a trained function TF comprising one or more encoder branches and a decoder branch can be trained by adapting either the encoding (i.e., the extraction of image descriptors) or the decoding (i.e., the quantification of the image similarities) or both. For instance, the one or more encoder branches can be adapted such that particularly meaningful image descriptors D-1, D-2 are extracted. Further, the decoder branch may be trained such that an appropriate similarity metric is learned and/or applied.

According to some examples, the loss function may comprise a triplet loss function. Triplet loss is a loss function where a baseline (anchor) input is compared to a positive (similar) input and a negative (dissimilar) input. The distance from the baseline (anchor) input to the positive input is minimized, and the distance from the baseline input to the negative input is maximized.

According to an embodiment, a general training scheme may take the following form. Firstly, a trained function TF is received. The trained function may already be pre-trained or not having been trained at all. Next, a training data set may be provided, which comprises a plurality of images and predetermined degrees of similarity indicating a similarity between the images comprised in the training image data set. In particular, the images comprised in the training image data set may have been extracted from medical image series of one or more patients. The images comprised in the training image data set may then be inputted into the trained function TF in order to determine, by the trained function TF, degrees of similarity respectively indicative of a similarity between image pairs of the training image data set. The thus determined degrees of similarity may then be compared with the predetermined degrees of similarity. Finally, based on this comparison, the trained function TF may be adjusted and the thus adjusted trained function TF may be provided for further training or deployment.

Figure 18:
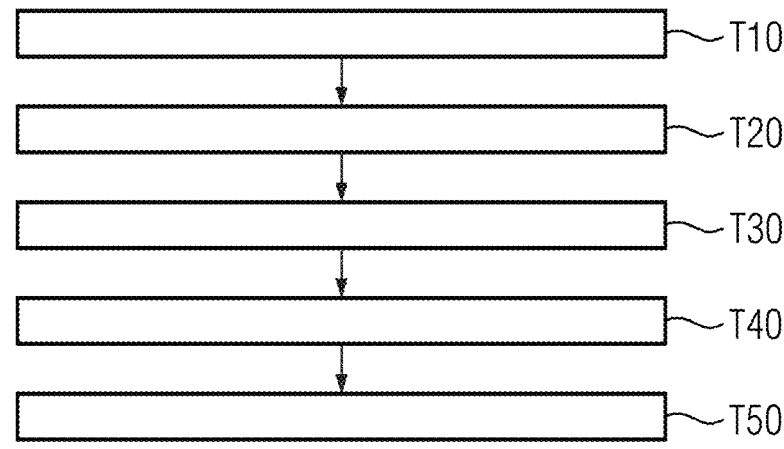
FIG. 18 depicts a flowchart illustrating a method for training trained functions to identify corresponding slices of medical image series according to an embodiment.

In addition to that or as an alternative, FIG. 18 depicts specific method steps for training a trained function TF to determine a similarity between two-dimensional medical images. The order of the steps does not necessarily correspond to the numbering of the steps but may also vary between different embodiments of the present invention.

A first step T10 is directed to receive a trained function TF, which may be pre-trained or not having been trained before. The trained function TF may be received from a memory (e.g., in the form of a library of KI models) and stored in a temporary memory.

A subsequent step T20 is directed to provide a training image data set at least comprising three two-dimensional medical images. The two-dimensional medical images have been extracted from one or more medical image series RMIS, CMIS, TMIS respectively depicting image volumes of body parts of patients. The medical images are preferably of the same type as the slices S-1, S-2 to be processed by the deployed and readily learned trained function TF. Accordingly, the medical images each likewise show a section of body part of a patient, may depict a plurality of anatomic structures and organs, and have been acquired using one of the abovementioned medical imaging modalities. According to some examples, the two-dimensional medical images have been extracted from the same medical image series. The two-dimensional images are characterized in that (are chosen such that) the second medical image has a greater similarity to the first medical image than the third medical image has to the first medical image. In other words, the first medical image can be conceived as an anchor while the second medical image is the positive image, and the third medical image is the negative image.

In subsequent step T30, the first, second and third medical images are input into the trained function TF, which, at step T40 determines a first degree of similarity between the first medical image and the second medical image and a second degree of similarity between the first medical image and the third medical image. Specifically, the trained function TF may extract image descriptors D-1, D-2 from first, second and third medical images, respectively. In other words, the trained function TF may encode first, second, and third medical images, respectively. That followed, the trained function may infer first and second degrees of similarities by comparing the respectively extracted image descriptors. In this regard, the trained function TF may apply a similarity metric capable of outputting a distance of the respective image descriptors in the encoding space.

Next, at subsequent step T50, the trained function TF is adjusted such that the first degree of similarity is greater than the second degree of similarity. This adjustment may amount to adapt the encoding, i.e., the process of image descriptor extraction, and/or the decoding, i.e., the process of applying an appropriate similarity metric. According to some examples however, the similarity metric may also be held fixed as, e.g., the Euclidian distance or the cosine similarity. In that case, any adaptation of the trained function would focus on the encoding branch or branches.

Figure 19:
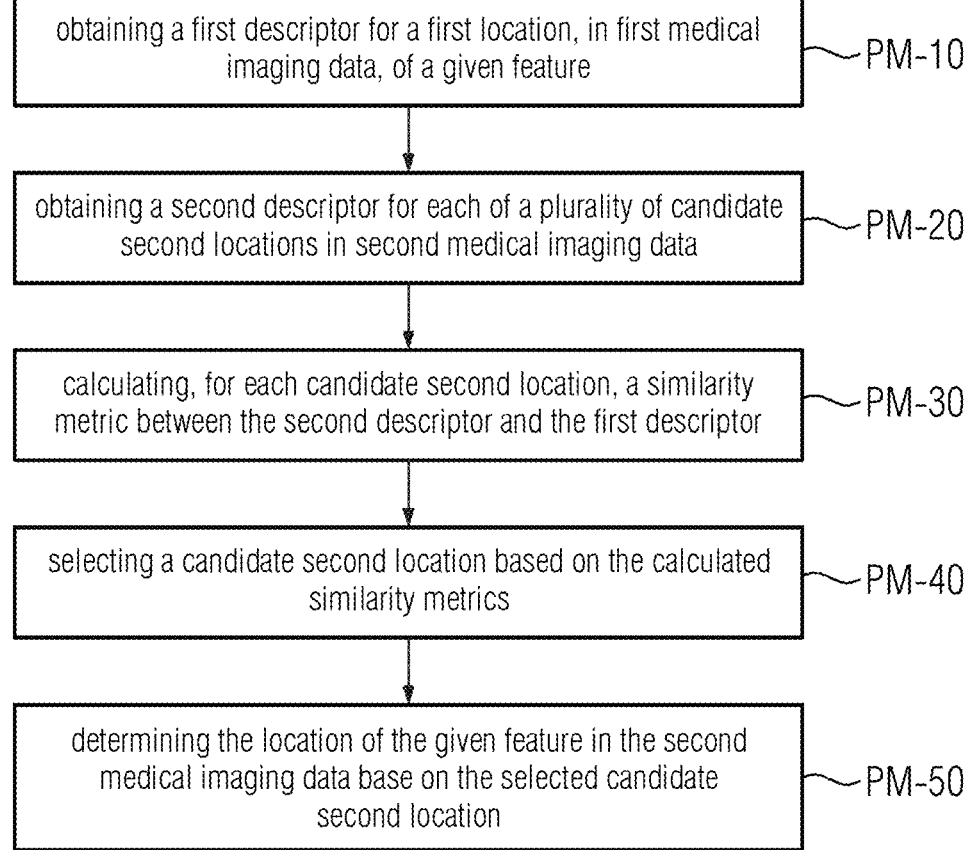
FIG. 19 depicts a flowchart illustrating a method for registering two medical image series by identifying corresponding image patterns according to an embodiment.

FIG. 19 depicts a method of determining a location at which a given feature is represented in medical imaging data as a way to perform the registration according to step S60 in an embodiment. Representations of example medical imaging data with which the method may be used are illustrated in FIGS. 20 to 23.

Figure 20:
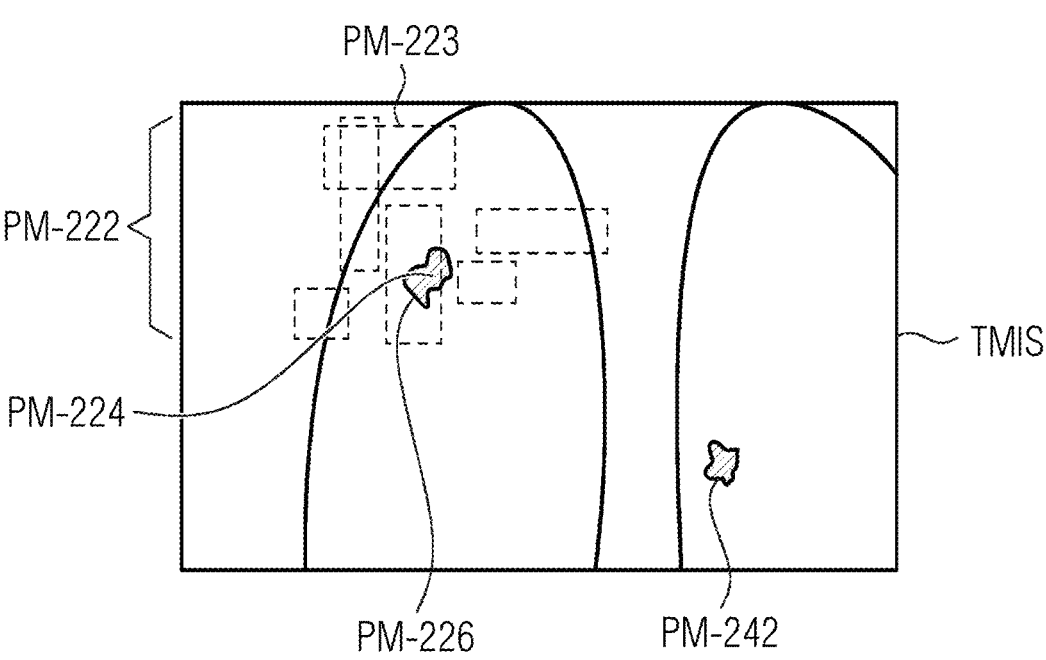
FIG. 20 is a diagram schematically illustrating a target medical image series according to an embodiment.
Figure 21:
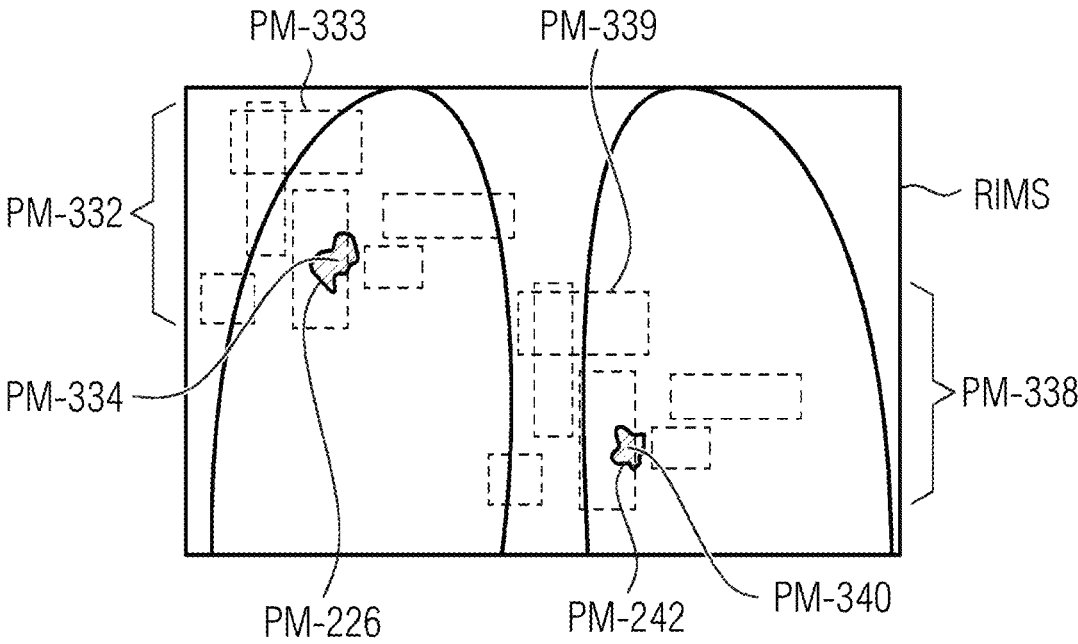
FIG. 21 is a diagram schematically illustrating a reference medical image series according to an embodiment.
Figure 22:
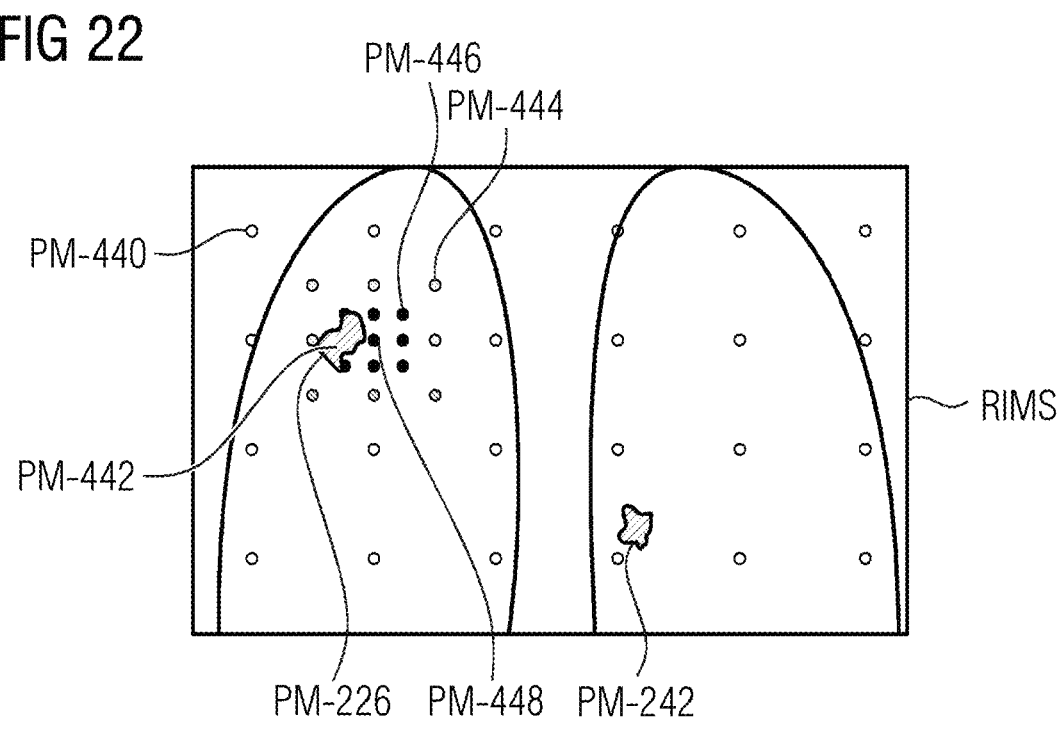
FIG. 22 is a diagram schematically illustrating a reference medical image series according to an embodiment.
Figure 23:
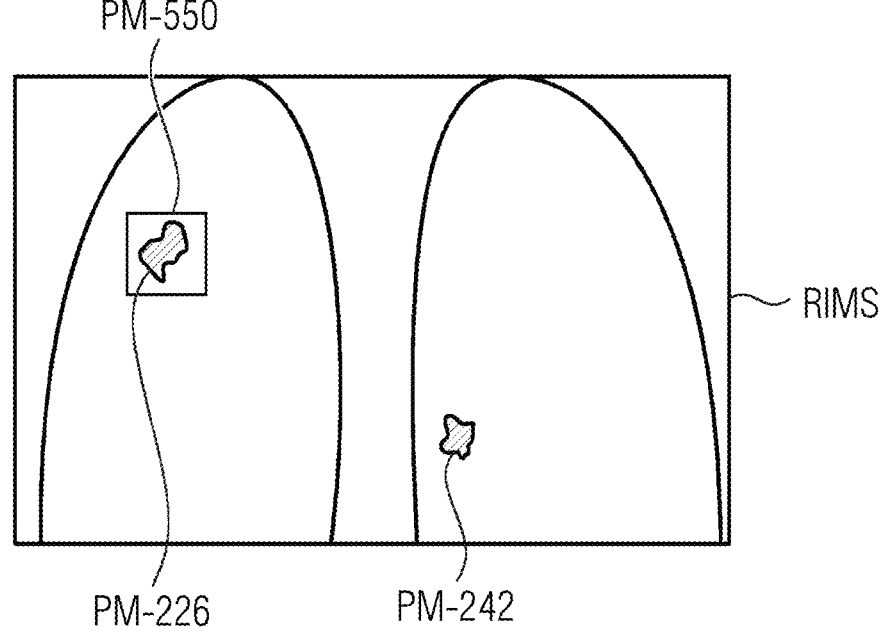
FIG. 23 is a diagram schematically illustrating a reference medical image series according to an embodiment.
Figure 24:
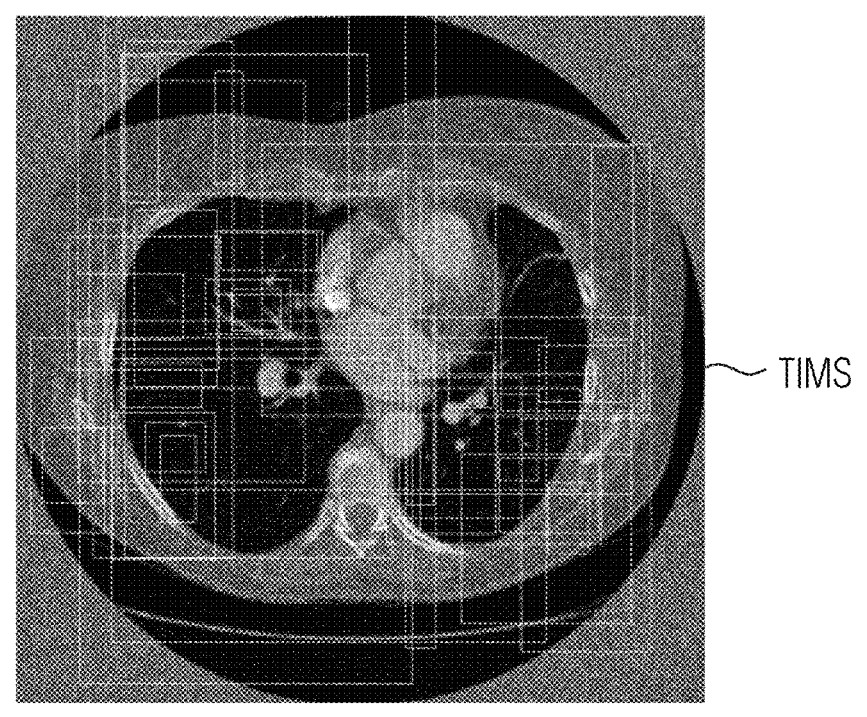
FIG. 24 is a diagram schematically illustrating a reference medical image series according to an embodiment.

FIG. 20 illustrates a representation of the target medical image series TMIS. FIGS. 21 to 23 each illustrate a representation of the reference medical image series RMIS. As can be seen from FIGS. 21 to 23, the target medical image series TMIS and the reference medical image series RMIS may differ. Specifically, in this example, the series differ in the positioning of the region in which the imaging data was captured relative to the patient—the region is offset to the right in the sense of the Figures in the reference medical image series RMIS of FIGS. 21 to 23 as compared to the target medical image series TMIS in FIG. 20. Moreover, the target medical image series TMIS and the reference medical image series RMIS may differ in that they are offset in a vertical direction with respect to the image plane of FIGS. 20 to 23 in the sense that the slices of the target medical image series TMIS and the reference medical image series RMIS do not align or that slightly different body regions are covered. Nonetheless, certain patterns of features PM-226, PM-242 are represented in both the target medical image series TMIS and the reference medical image series RMIS. In this example, a given feature PM-226 represented in the medical imaging data is a lesion PM-226 in the right lung of the patient. It will be appreciated however that in examples the given feature may be any feature, e.g., any particular part of the imaging subject (e.g., including internal cavities and the like), represented in the medical imaging data.

In an example use case (referred to hereinafter for illustrative purposes), a physician may be reviewing the rendering of the target medical image series TMIS (as per that illustrated in FIG. 20). Specifically, the physician may be reviewing a region of interest ROI. The physician may be interested in assessing the progression of a given feature, e.g., the lesion PM-226, as compared to reference medical image series RMIS. The location PM-224 at which the given pattern PM-226 is represented in the target medical image series TMIS is known. However, the location at which the given pattern PM-226 is represented in the reference medical image series RMIS is not known and may be difficult or burdensome for the physician to ascertain by visual inspection alone. The method illustrated in FIG. 20 determines the location at which the given feature PM-226 is represented in the reference medical image series RMIS.

Referring again to FIG. 20, in broad overview, the method comprises:

in step PM-10, obtaining a first local image descriptor for a first location PM-224 in the target medical image series TMIS, the first location PM-224 being the location within the target medical image series TMIS at which a given pattern or feature PM-226 is represented, the first local image descriptor being representative of values of elements PM-222 (i.e., pixels or voxels) of the target medical image series TMIS located relative to the first location 224 according to a first predefined sampling pattern;

in step PM-20, obtaining a second local image descriptor for each of a plurality of candidate second locations PM-334, PM-340, PM-440, PM-448 in the reference medical image series RMIS, each second local image descriptor being representative of values of elements PM-332, PM-338 (i.e., pixels or voxels) of the reference medical image series RMIS located relative to the respective candidate second location PM-334, PM-340, PM-440, PM-448 according to the first predefined sampling pattern;

in PM-30, calculating, for each of the plurality of candidate second locations PM-334, PM-340, PM-440, PM-448 a local image similarity metric indicating a degree of local image similarity between the first descriptor and the second descriptor for the candidate second location PM-334, PM-340, PM-440, PM-448;

in step PM-40, selecting a candidate second location PM-334, PM-448 from among the plurality of candidate second locations PM-334, PM-340, PM-440, PM-448 based on the calculated local image similarity metrics; and in step PM-50, determining the location PM-334, PM-446 at which the given feature PM-226 is represented in the reference medical image series RMIS based on the selected candidate second location PM-334, PM-448.

Accordingly, a technique for determining the location PM-334, PM-446 at which a given pattern or feature PM-226 is represented in medical imaging data TMIS, RMIS is provided for. Specifically, a known location at which a given pattern or feature 226 is represented in a first medical image series TMIS is used to determine the location at which the given pattern or feature is represented in a second, e.g., previous, medical image series reference medical image series RMIS of a patient. This may, for example, reduce the burden for a physician in finding the location at which the given feature PM-226 is represented in the reference medical image series RMIS. The image data of the reference medical image series RMIS relative to the selected candidate location may be the basis for generating the display data in step S70.

Moreover, this determination is based on determining the similarity between local image descriptors for the known location at which the pattern or feature PM-226 is represented in the reference medical image series RMIS and for each of plurality of candidate locations in the target medical image series TMIS. This may provide for fast, efficient, and/or flexible feature location.

The given pattern or feature PM-226 may be obtained based on the region of interest ROI. In some examples, the given pattern or feature PM-226 may be obtained from the image data comprised in the region of interest ROI. In some examples, the given pattern or feature PM-226 may correspond to the region of interest ROI.

For example, determining a similarity between the local image descriptors for the known first location PM-224 and the candidate second locations PM-334, PM-340 may be significantly less computationally expensive as compared to Image Registration techniques where every pixel/voxel in one image is mapped to every pixel/voxel in another image by optimizing a cost function. Accordingly, for a given computational budget, the presently disclosed method may provide results significantly faster than Image Registration based methods. This may, in turn, allow for real-time or near real-time interaction with the image data.

Basing the descriptor on element (e.g., pixel of voxel) values located relative to the given location PM-224 in a predetermined distribution or sampling pattern allows for the surroundings and spatial context of the feature PM-226 to be encoded into the local image descriptor. This provides for the location at which the given pattern or feature PM-226 is represented in the reference medical image series RMIS to be determined in a reliable, efficient and/or flexible manner.

For example, such local image descriptors may encode the surroundings of the pattern or feature and candidate locations of interest, rather than attempting to map every pixel of one image to a pixel of another image as per Image Registration techniques. Accordingly, even where the target medical image series TMIS and the reference medical image series RMIS images are relatively different (e.g., in the overall region of the body they depict), the location at which the given pattern or feature is represented in the reference medical image series RMIS may nonetheless be reliably determined (e.g., as compared to classical Image Registration techniques which, due to the attempt to map every pixel between images, are typically limited to images that are relatively similar). The presently disclosed technique may therefore provide accurate results for a broader range of image series, and hence may be more flexibly applied.

As another example, determining local image similarity between the local image descriptors for the known first location PM-224 and the candidate second locations PM-334, PM-340 need not rely on the presence in the medical image series TMIS, RMIS of 'landmarks' that classifiers have been trained to detect in the images, as per Landmark Detection based methods. Accordingly, the presently disclosed method may be more flexible with respect to the types of medical image series to which it may be effectively applied. Moreover, by basing the location determination on a similarity local image descriptors, the presently disclosed technique can be applied for any given feature, rather than, e.g., a landmark on which a classifier has been trained as per landmark detection-based methods. The presently disclosed technique may therefore provide accurate results for a broader range of features, and hence may be more flexibly applied. Determining the similarity between the descriptors allows for the location at which a given feature is represented in medical imaging data to be determined without the use of trained classifiers as per landmark detection-based techniques, and hence the time and effort associated with preparing a training data set for the classifier, as well as the computational load of training the classifier, can be saved. Accordingly, the presently disclosed method may allow for determination of a location at which a given feature PM-226 is represented in medical imaging data in an efficient manner.

As mentioned, the method comprises, in step PM-20, obtaining the first local image descriptor for the first location PM-224 in the target medical image series TMIS. The first location PM-224 is the location within the target medical image series TMIS at which the given feature PM-226 is represented. The first local image descriptor is representative of values of elements PM-222 of the target medical image series TMIS located relative to the first location PM-224 according to a first predefined sampling pattern.

In some examples, the first local image descriptor may be output from a descriptor model applied to the target medical image series TMIS for the first location PM-224. The descriptor model may be configured to calculate a local image descriptor for a given location PM-224 based on the values of elements located relative to the given location PM-224 according to the first predefined sampling pattern.

In some examples, the first local image descriptor may be obtained from a database (not shown). For example, the local image descriptor for the first location PM-224 may have already been calculated (for example by applying the descriptor model), and stored in the database, for example in association with the first location PM-224. For example, the database may store a plurality of first local image descriptors each in association with the corresponding first location in the medical imaging data on the basis of which the first local image descriptor was determined. Accordingly, in some examples, the method may comprise selecting the first location PM-224 from among the plurality and extracting the first descriptor associated with the selected first location PM-224.

In either case, a local image descriptor for a given location PM-224 may be a vector comprising a plurality of entries, each entry being representative of values of a set of one or more elements, the sets of one or more elements being located relative to the given location PM-224 according to the first predefined sampling pattern. For example, each entry may be representative of the values of the elements located within a respective one or more of a plurality of predefined boxes PM-223 (i.e., rectangular regions) located relative to the given location PM-224 according to the first predefined pattern. It will be appreciated that, where the medical imaging data exits in three spatial dimensions, the term 'box' as used herein may refer to a cuboidal region or volume.

In some examples, each entry of the descriptor may be representative of the values of the elements located within a respective one of a plurality of predefined boxes PM-223. For example, each entry of the local image descriptor may be an average of the values of the elements located within a respective one of a plurality of predefined boxes PM-223. That is, each entry may be the sum of the values of the elements located within a particular box PM-223, divided by the number of elements included in the box PM-223. For example, as illustrated in FIG. 20, for the first location PM-224, there are a plurality of predefined boxes PM-223 (i.e., notional regions) distributed in a slice of the target medical image series TMIS in a particular sampling pattern. The first local image descriptor for the first location PM-224 may be a vector, each entry of which is the average value of the elements of the target medical image series TMIS located within a respective one of the boxes PM-223. Using the average value (e.g., as compared to the sum) helps provide that each vector entry is within the same range, independent of the size of the box for which it is calculated. As described in more detail below, this may, in turn, help provide for robust and/or reliable determination of similarity between descriptors.

In some examples, the predefined pattern and/or the predefined boxes (e.g., the size and/or aspect ratio of each box) may be randomly or pseudo-randomly generated. In some examples, a local image descriptor may be determined using many boxes PM-223, for example 1000 boxes, and accordingly the local image descriptor may be a vector having many entries (e.g., 1000 entries). For example, referring briefly to FIG. 23, there is presented, for illustrative purposes, a medical image series TIMS, RIMS to which a large number of predefined boxes (shown as white rectangular outlines) have been applied in order to determine a local image descriptor for a given location (not shown) in the medical image series TIMS, RIMS.

The local image descriptor may encode the spatial context of the given location PM-224 at which a given feature is represented, and hence in turn may provide a compact representation of the surroundings of a given feature. The calculation of such local image descriptors may be relatively computationally inexpensive and fast, for example as compared to comparatively dense feature representations, for example as may be used in a landmark detection technique. This may help allow, for example, for the method to be performed (and hence results returned) quickly.

In some examples, the descriptor model that calculates the local image descriptor may be applied to 'raw' medical image data. However, in other examples, the descriptor model may be applied to integral image data (also known as a summed area table) of the target medical image series TMIS. In integral image data, the value for a given element is the sum of values of all of the elements above and to the left of the given element in the image data. For example, integral image data for the target medical image series TMIS may be generated and the first local image descriptor may be calculated on the basis of the integral image data for the target medical image series TMIS. The use of integral image data allows for faster computation of the local image descriptors. In some examples, this may, in turn, help allow for the results of the method to be returned faster.

In examples where an integral image is used, the sum of values of elements of a box PM-223 with opposite corner locations (x1,y1,z1), (x2,y2,z2) is given, in terms of the corresponding Integral image by I, (I(x2,y2,z2)+I(x2,y2, z2)+I(x2,y2,z2)+I(x2,y2,z2)−(I(x2,y2,z2)+I(x2,y2,z2)+I (x2,y2,z2)+I(x2,y2,z2))). In this expression, I(xi, yj, zk) is the value of the element in the integral image I at the location x=i, y=j, and z=k, where i, j, and k are element indices. For a given box PM-223, this sum may be divided by the total number of elements contained within the box PM-223 to calculate the average element value for the box PM-223. The average element value for each box may be used as respective entry in a vector constituting the first descriptor.

It will be appreciated that, in some examples, local image descriptors other than the specific example described above may be used. For example, in some examples, Haar-like descriptors may be used, i.e., a descriptor where each entry represents a difference between the sums of element values within each of a plurality of boxes defined in the image data. In some examples, the local image descriptor may be a gradient descriptor, for example in which each entry represents one or more image gradients in a respective one of a plurality of regions of the medical image data. For example, an image gradient for a given region may be based on a change in the values (e.g., intensity values) between elements within the given region. In some examples, the local image descriptor may be such that each entry is the value of a respective one of a plurality of elements randomly distributed in the medical imaging data relative to the first location PM-224. In some examples, the descriptor for a given location may be such that each entry is the aggregate of the values of elements intersecting with a respective one of a plurality of randomly orientated rays, each ray originating from the given location. In each case, the descriptor for a given location is representative of values of elements of the medical imaging data located relative to the given location according to a first predefined pattern.

Nonetheless, is noted that the inventors have identified that the use of a local image descriptor for a given location in which each entry is representative (e.g., an average) of the values of the elements located within a respective one of a plurality of predefined boxes PM-223 located relative to the given location in a predefined (e.g., randomly generated) distribution pattern, provides for particularly fast yet accurate location determination.

In some examples, the first location PM-224 for which the local image descriptor is calculated or otherwise obtained may be specified by a user. For example, a representation of the target medical image series TMIS may be displayed to the user, and the user may specify the location PM-224 of a given feature PM-226 of interest, for example by clicking on the representation at the first location PM-224 at which the given feature PM-226 is represented. This user specified location may then be taken as the first location PM-224. The first local image descriptor may then be calculated or otherwise obtained based on this first location PM-224.

In some examples, the first location PM-224 may be output from a computer implemented method. For example, the target medical image series TMIS may have been pre-processed by a computer implemented method (not shown) to identify a given pattern or feature PM-226 in the target medical image series TMIS and output the first location PM-224 at which the given feature PM-226 is represented. This output may be provided directly, and/or stored in a database. The first local image descriptor may then be calculated or otherwise obtained based on this first location PM-224.

In some examples, the first location PM-224 may be obtained from a database (not shown). For example, the database may store one or more locations at which a respective one or more features are represented in one or more medical image data sets. The target medical image series TMIS may be extracted from the database along with the one or more locations. A particular one of the locations may be selected as the first location PM-224, for example based on a desire or instruction to determine the location at which the given feature PM-226 at that location is represented in the reference medical image series RMIS. The first local image descriptor may then be calculated or otherwise obtained based on this first location PM-224.

In any case, the first local image descriptor for the first location PM-224 in the target medical image series TMIS is obtained.

As mentioned, in step PM-40, the method comprises obtaining a second local image descriptor for each of a plurality of candidate second locations PM-334, PM-340 in the reference medical image series RMIS.

Each second local image descriptor is representative of values of elements PM-332, PM-338 of the reference medical image series RMIS located relative to the respective candidate second location PM-334, PM-340 according to the first predefined sampling pattern. The second local image descriptor may be the same as the first local image descriptor in the sense that, for a given location (e.g., the first location PM-224 or any one of the second candidate locations PM-334, PM-340), the local image descriptor is representative of values of given elements of the associated medical imaging data located relative to the given location according to the first predefined sampling pattern. For example, the same local image descriptor model that was applied to the target medical image series TMIS to generate the first local image descriptor for the first location PM-224 may be applied to the reference medical image series RMIS to generate the second local image descriptor for each of the plurality of candidate second locations PM-334, PM-340. For example, referring to FIGS. 20 and 21, the boxes PM-332, PM-338 and the location of each of those boxes relative to each candidate second location PM-334, PM-340 used to calculate the second descriptor for each of those candidate second locations PM-334, PM-340 are the same as the boxes and the location of each of those boxes relative to the first location PM-224 used to calculate the first descriptor for the first location PM224. Whichever type of descriptor is used, that descriptor for the first location PM-224 in the target medical image series TMIS and that descriptor each of the plurality of second candidate locations PM-334, PM-340 in the second medical imaging data 330 are obtained.

As described in more detail below, in some examples (e.g., described below with reference to FIG. 21), each candidate second location PM-334, PM-340 may be a location at which a respective previously detected feature PM-226, PM-242 is represented in the reference medical image series RMIS. In other examples, (e.g., as described below with reference to FIG. 22) the candidate second locations PM-440 may be locations distributed through the second medical imaging data in a second predefined pattern.

In any case, a second local image descriptor for each of a plurality of candidate second locations PM-334, PM-340, PM-440 in the reference medical image series RMIS is obtained.

As mentioned, the method comprises, in step PM-60 calculating, for each of the plurality of candidate second locations PM-334, PM-340, PM-440, a similarity metric indicating a degree of local image similarity between the first local image descriptor and the second local image descriptor for the candidate second location PM-334, PM-340, PM-440.

In some examples, the local image similarity metric may comprise the normalized mutual information similarity between the first local image descriptor and the second local image descriptor. For example, the normalized mutual information similarity between the first local image descriptor and the second local image descriptor may be determined as follows. A first histogram is formed in which the entries in the first descriptor are placed into equally sized bins x between the minimum entry value and the maximum entry value of the first local image descriptor. The counts in first histogram are normalized to get the probability distribution $PX(x)$ of the entries of the first descriptor across the bins x. A second histogram is formed in which the entries in the second local image descriptor are placed into equally sized bins y between the minimum entry value and the maximum entry value of the second local image descriptor. The counts in second histogram are normalized to get the probability distribution $PY(y)$ of the entries of the second local image descriptor across the bins y. A joint histogram of the entries of the first local image descriptor and the second local image descriptor ranging between the respective minimum and maximum values is determined. Each bin of the joint histogram is an equally sized 2-dimensional bin, the first dimension X corresponding to the entry from the first local image descriptor, and the second dimension Y corresponding to the associated entry from the second local image descriptor. For example, if the first entry of the first local image descriptor was q and the first entry of the second local image descriptor was p, then the 2D bin x, y of the joint histogram which covers a range of first local image descriptor values including p and covers a range of second local image descriptor values including q, would receive a count. The counts in the joint histogram are normalized to get the probability distribution $PXY(x,y)$ of the entries of the first and second local image descriptors across the bins x, y. The normalized mutual information similarity I between the first local image descriptor and the second local image descriptor may then be calculated as $$I = \sum_y \sum_x P_{XY}(x, y) \log\left(\frac{P_{X,Y}(x, y)}{P_X(x)P_Y(y)}\right) \quad (1)$$

The higher the mutual information similarity I, the higher the degree of local image similarity between the first local image descriptor and the second local image descriptor. Using normalized mutual information similarity may provide for robust, reliable and/or flexible determination of the local image similarity. For example, the mutual information similarity is independent of differences in relative scale of the entries of the first local image descriptor as compared to the second local image descriptor. For example, using mutual information, an accurate similarity metric may be determined even if the overall 'brightness' (e.g., the intensities that are the values of the elements of the medical imaging data) differs between the target medical image series TMIS and the reference medical image series RMIS. As another example, mutual information may provide an accurate similarity, even in cases where different protocols and/or modalities of medical imaging have been used (and, e.g., accordingly different value ranges used or achieved) or for example where the medical images have been transformed, e.g., inverted or scaled. Accordingly, the use of mutual information similarity in this way may provide for determination of similarity that is robust to, e.g., non-structural variations between the first and second medical imagine data, which may in turn allow for the method to be applied reliably to a wider range of images, which in turn may provide more flexibility in the type of images with which the method may be provided.

As mentioned, in some examples, the descriptor entries are representative of values of elements contained within associated boxes PM-223, PM-333, PM-339. As mentioned, in these examples, each entry of the respective local image descriptors being an average of the values of elements contained within respective boxes PM-223, PM-333, PM-339 may help ensure the entries within a local image descriptor are within a certain range independent of box size. This, in turn, may facilitate the use of mutual information similarity, as the bin into which a given entry is placed is accordingly dependent on the average value of the elements within the box, but not on the size of the box.

In some examples, other similarity metrics between the first local image descriptor and the second local image descriptor may be used. For example, cosine similarity, Euclidean distance, and/or cross correlation may alternatively or additionally be used. Nonetheless, the inventors have identified that the mutual information similarity metric may provide for particularly robust, reliable and/or flexible determination of the similarity metric, and accordingly for particularly robust, reliable and/or flexible determination of the location at which the given feature is represented in the reference medical image series RMIS.

In any case, for each second candidate location PM-334, PM-340 a similarity metric indicating a degree of local image similarity between the first local image descriptor and the second local image descriptor for the candidate second location PM-334, PM-340 is calculated.

As mentioned, the method comprises, in step PM-40, selecting a candidate second location PM-334 from among the plurality of candidate second locations PM-334, PM-340 based on the calculated similarity metrics; and in step PM-50 determining the location PM-334 at which the given feature PM-226 is represented in the reference medical image series RMIS based on the selected candidate second location PM-334.

In some examples, selecting the candidate second location PM-334 may comprise selecting the candidate second location PM-334 having the similarity metric indicating the highest degree of local image similarity among the similarity metrics of the plurality of candidate second locations PM-334, PM-340. For example, the candidate second location PM-334 with the highest mutual information similarity metric may be selected. In some examples, determining the location at which the given feature PM-226 is represented comprises determining, as the location at which the given feature PM-226 is represented in the reference medical image series RMIS, the selected candidate second location PM-334. In some examples, determining the location may be responsive to a determination that the similarity metric between the first local image descriptor for the first location and the second local image descriptor for the selected candidate second is above a threshold value. This may help ensure that the location at which the given feature is represented in the reference medical image series RMIS is only determined in cases where there is a certain degree of confidence in the determination. This may, in turn, help provide for reliable determination of the location at which the given feature is represented in the reference medical image series RMIS.

As mentioned, in some examples (e.g., as illustrated in FIG. 21), each candidate second location PM-334, PM-340 may be a location at which a respective previously detected feature PM-226, PM-242 is represented in the reference medical image series RMIS. In other examples, (e.g., as illustrated in FIG. 22) the candidate second locations PM-440 may be locations distributed through the second medical imaging data in a second predefined sampling pattern (also referred to as predefined sampling pattern). The way in which the location of the given feature may be determined in each of these examples scenarios is now described in more detail with reference to FIGS. 21 and 22.

Referring first to FIG. 21, in this example scenario, the reference medical image series RMIS represents a first feature PM-226 and a second feature PM-242. In this example, these features PM-226, PM-242 have been detected in the reference medical image series RMIS, for example previously by a physician, or by an automated method. The respective locations PM-334, PM-340 of these features PM-226, PM-242 in the reference medical image series RMIS have been recorded as part of this previous detection. Accordingly, the respective locations PM-334, PM-340 of these previously detected features PM-226, PM-340 are known. However, it is not known which of these two locations PM-334, PM-340 is the location at which the given feature PM-226 in the target medical image series TMIS is represented in the reference medical image series RMIS. In other words, it is not known which of these features PM-226, PM-224 corresponds to the given feature PM-226 represented in the target medical image series TMIS. In these examples, the candidate second locations may therefore be taken as the locations PM-334, PM-340 in the reference medical image series RMIS at which the previously detected features PM-226, PM-242 are represented. A similarity metric between the second local image descriptors for each of the candidate second locations PM-334, PM-340 and the first local image descriptor for the first location PM-224 may be calculated. In this example, the candidate second location PM-334 with the highest similarity metric may be selected, and the selected candidate second location PM-334 may be determined as the location PM-334 at which the given feature PM-226 is represented in the reference medical image series RMIS.

Referring to FIG. 23, the reference medical image series RMIS represents a first feature PM-226 and a second feature PM-242. However, in the example scenario of FIG. 23, the locations at which these features PM-226, PM-242 are represented in the reference medical image series RMIS is not known. In this example, the candidate second locations PM-440 are locations distributed through the reference medical image series RMIS in a second predefined sampling pattern. In some examples, as illustrated in FIG. 23, the second predefined sampling pattern may be a regular arrangement, with each second candidate location PM-440 (represented in FIG. 23 by the open circles PM-440) spaced apart from its neighbors in a grid. For example, this arrangement may span a region, for example the whole of, the reference medical image series RMIS. As such, the candidate second locations represent a spatially distributed sample of locations within the reference medical image series RMIS (and hence at which the given feature could be represented).

The candidate second locations being distributed in the second predefined sampling pattern may allow for the location at which the given feature PM-226 is represented in the reference medical image series RMIS to be estimated in a computationally efficient way, for example as compared to determining a descriptor for every voxel of the reference medical image series RMIS.

In the example of FIG. 23, the similarity metric between the second local image descriptor for each one of the candidate second locations PM-440 and the first local image descriptor may be calculated. As illustrated in FIG. 23, the second local image descriptor for the candidate second location PM-448 closest to the represented feature PM-226 has the highest degree of similarity with the first local image descriptor. Accordingly, the candidate second location PM-448 is selected. The location at which the given feature PM-226 is represented in the reference medical image series RMIS may then be determined based on this selected candidate second location PM-448.

For example, in some examples, the selected candidate second location PM-448 may be taken as an estimate of the location at which the given feature PM-226 is represented in the second medical imaging data. However, in other examples, this estimate may be refined by defining further candidate locations PM-442, PM-444 (based on the selected candidate second location PM-448) in successively more fine-grained patterns (see, e.g., the pattern of grey circles PM-442, and subsequently of black circles PM-444, in FIG. 23). Accordingly, an accurate yet efficient determination of the location at which a given feature PM-226 is represented in the reference medical image series RMIS may be provided for, even where no locations of any features in the reference medical image series RMIS are known.

Specifically, in these examples, determining the location PM-446 at which the given feature PM-226 is represented in the reference medical image series RMIS may comprise: determining, based on the selected candidate second location PM-448, a plurality of candidate third locations PM-442 in the reference medical image series RMIS (also denoted as candidate sub-resolution locations). For example, the candidate third locations PM-442 may be defined as locations in the region of (i.e., local to) the selected candidate second location PM-448. For example, the candidate third locations PM-442 may be locations distributed through the reference medical image series RMIS in a third predefined sampling pattern (also referred to as sub-resolution sampling pattern) in the region of the selected second location PM-448. For example, the third predefined sampling pattern may be the same as or similar to that of the second predefined sampling pattern. However, in some examples (as illustrated in FIG. 23), a distance between the candidate third locations PM-442 in the third predefined sampling pattern may be less than a distance between the candidate second locations PM-440 in the second predefined pattern.

The method may then comprise obtaining a third local image descriptor for each of the plurality of candidate third locations PM-442 in the reference medical image series RMIS, each third local image descriptor being representative of values of elements of the reference medical image series RMIS located relative to the respective candidate third location PM-442 according to the first predefined sampling pattern. For example, the third local image descriptor may be the same as, i.e., may have been calculated in the same way as, the first and second local image descriptors as described above.

In some examples, a scale of the third predefined sampling pattern associated with the third descriptors may be reduced as compared to a scale of the second predefined sampling pattern associated with the second local image descriptors. Taking a local image descriptor based on a plurality of boxes (not shown in FIG. 23) arranged in the first predefined sampling pattern as an example, while the shape and the spatial pattern of the boxes may be the same for the second local image descriptors and the first local image descriptors, the size of the boxes and/or the distances between each box and the respective location PM-442 for the third patter descriptor may be scaled down (i.e., reduced) as compared to the size of the boxes and/or the distances between each box and the respective location PM-440 for the second local image descriptor. This may provide that the third local image descriptors encode more fine-grained detail of the reference medical image series RMIS in the region of the selected candidate second location PM-448. This may help provide for accurate determination of the location at which the given feature PM-226 is represented in the reference medical image series RMIS.

In these examples, the method may then comprise calculating, for each of the plurality of candidate third locations PM-442, a similarity metric indicating a degree of local image similarity between the first local image descriptor and the third local image descriptor for the candidate third location PM-442. For example, the similarity metric may be the same as, i.e., may be calculated in the same way as, the similarity metric as used between the first local image descriptor and the second local image descriptor. The method may then comprise selecting a candidate third location PM-448 from among the plurality of candidate third locations PM-442 based on the calculated similarity metrics indicating the degree of local image similarity between the first local image descriptor and the respective third local image descriptors. For example, as illustrated in FIG. 23, the candidate third location PM-448 with the highest similarity metric may be selected. The method may then comprise determining the location at which the given feature PM-226 is represented in the reference medical image series RMIS based on the selected candidate third location PM-448.

In some examples, the selected candidate third location PM-448 may be taken as an estimate of the location at which the given feature PM-226 is represented in the reference medical image series RMIS. However, in other examples, this estimate may be further refined by defining further candidate locations PM-444 based on (e.g., in the region of) the selected third candidate location PM-448, and repeating the above-described method for these further candidate locations. For example, as illustrated in FIG. 23, a further set of candidate locations PM-444 are defined in the region of the selected candidate third location PM-448. In this example the further candidate location PM-446 will have a local image descriptor with the highest similarity metric with the first local image descriptor, and hence may be selected. The location at which the given feature PM-226 is represented in the reference medical image series RMIS may then be determined at the selected further candidate location PM-446. It will be appreciated that although three levels of hierarchical granularity are shown in FIG. 23, fewer or more levels of hierarchical granularity may be employed in order to determine the location at which the given feature PM-226 is represented in the reference medical image series RMIS. Nonetheless, using such a hierarchical method may allow for the location to be accurately determined in a quick and efficient manner, even where no locations of any features in the reference medical image series RMIS are known.

It is noted that the elements (e.g., boxes) according to which the respective second, third or further descriptors may be calculated for each of the respective candidate second, third or further locations are not shown in FIG. 23, for clarity.

In any case, the location at which the given feature PM-226 is represented in the reference medical image series RMIS is determined. In some examples, the method may further comprise generating output data indicating the determined location at which the given feature PM-226 is represented in the reference medical image series RMIS.

For example, the output data may comprise a coordinate or pixel/voxel index corresponding to the determined location PM-334, PM-446 within the reference medical image series RMIS. In some examples, the output data may further comprise a reference to the reference medical image series RMIS within which location has been determined. In some examples, the output data may comprise the second medical imaging data itself (or a portion thereof). In some examples, the output data may comprise an image (or data for an image) in which an indicator indicating the determined location is overlaid onto a rendering of the reference medical image series RMIS. For example, as illustrated in FIG. 23, a representation of the reference medical image series RMIS is shown and overlaid onto (or otherwise included in) the representation is an indicator PM-550 indicating the location at which the given feature PM-226 is represented in the reference medical image series RMIS. In this example, the indicator is a box centered on the determined location. However, in other examples other indicators may be used, such as a marker or dot or other symbol overlaid (or otherwise included) at the determined location; or for example an arrow or pointer or other label pointing at or connected or otherwise indicating the determined location. The output data may allow for an indication to be provided to a user, e.g., a physician, as to the determined location at which the given feature PM-226 is represented in the reference medical image series RMIS. The user may therefore, e.g., compare the representation of the given feature PM-226 in both the target medical image series TMIS and the reference medical image series RMIS. As a result, the user may, for example, make an assessment as to the differences between the given feature PM-226, e.g., make an assessment as to the progression of a disease of which the feature 226 may be an expression.

In some examples, the output data may further comprise the first location and a reference to the target medical image series TMIS or the target medical image series TMIS itself. This may allow for an association between the locations at which the given feature PM-226 is represented in both the target medical image series TMIS and the reference medical image series RMIS to be determined. In some examples, the output data may be stored in a storage device. For example, the output data may be stored in a database. This may allow for the output data to be referred to, for example by a user or by an automated downstream process (not shown).

In some examples, the method may comprise transmitting the output data to a display device to display a representation of the reference medical image series RMIS and an indicator PM-550 indicating, on the representation of the reference medical image series RMIS, the determined location at which the given feature is represented. For example, the display device (not shown) may be a computer monitor or other display screen of a computer. For example, the displayed representation may be similar to that shown in FIG. 24, where the indicator PM-550 is overlaid onto the representation of the reference medical image series RMIS. Any of the example indicators mentioned above may be used. This may allow for a user, e.g., a physician, to immediately and easily appreciate the location at which the given feature PM-226 is represented in the reference medical image series RMIS, which may, for example, allow for assessments based on the given feature to be made more quickly and with minimal burden.

In the above examples, only one given feature PM-226 is referred to. However, in some examples, there may a plurality of given features represented in the target medical image series TMIS. In these examples, it may be desirable to determine the location at which each of the plurality of given features is located in the reference medical image series RMIS. In some examples, the method according to any of the examples described with reference to FIGS. 19 to 24 may be employed sequentially to the plurality of given features, for example once for each of the plurality of given features. However, as described in more detail below, in some examples, the determination of each location may be performed concurrently.

Figure 25:
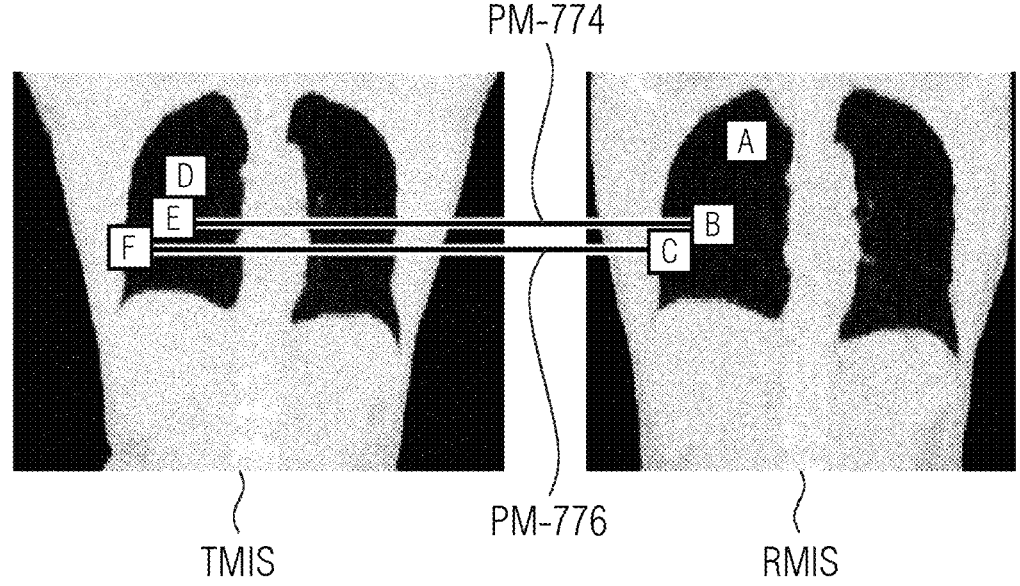
FIG. 25 is a diagram schematically illustrating output data according to an embodiment.
Figure 26:
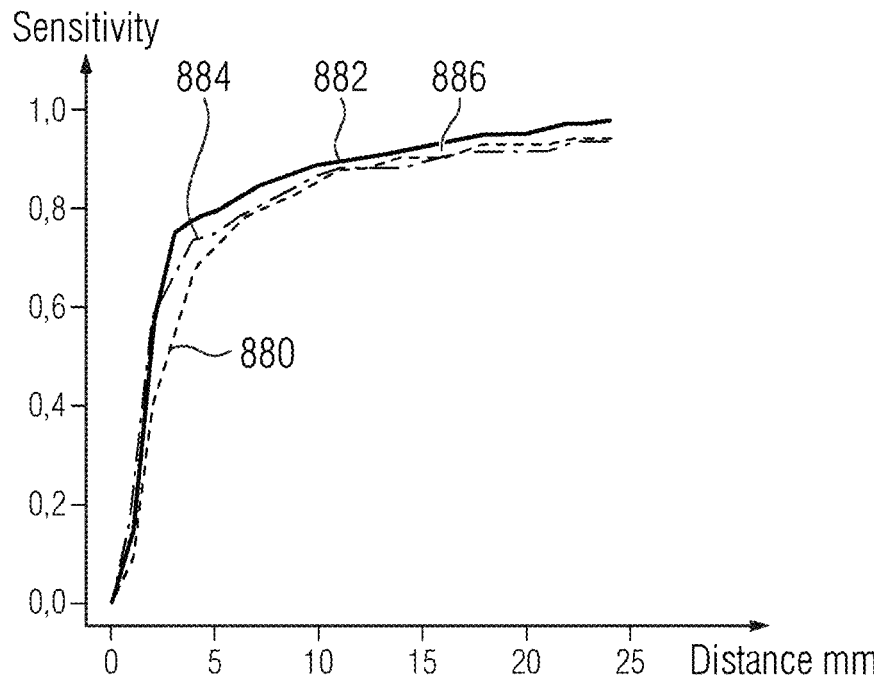
FIG. 26 is a diagram schematically illustrating output data according to an embodiment.

Referring to FIG. 25, there is a representation of the target medical image series TMIS, and a representation of the reference medical image series RMIS. The first representation shows three given features A, B, C (shown only schematically in FIG. 25), and the second representation shows three features D, E, F (shown only schematically in FIG. 25). In this example, all of the features A, B, C, D, E, F have been detected in the images, and the locations at which they are represented within the respective medical imaging data is known. However, it is not known which of the features D, E, F in the reference medical image series RMIS correspond to the given features A, B, C in the target medical image series TMIS. In this example, the locations at which the given features A, B, C are represented in the target medical image series TMIS are the first locations, and the locations at which the features D, E, F are represented in the reference medical image series RMIS are the respective candidate second locations.

In this example, a said first local image descriptor for a said first location (not shown) in the target medical image series TMIS is obtained for each of the plurality of said given features A, B, C. In this example, the method may comprise calculating said similarity metric between the first local image descriptor and the second local image descriptor for all pairs of the first locations A, B, C and candidate second locations D, E, F. For example, the similarity metric according to any one of the examples described above may be determined between the local image descriptor for the first location of the given feature A and the local image descriptor for the second locations of each of the features D, E, F; and the same may be performed for the other given features B, C. For example, in this example, there will be nine similarity metrics calculated, one for each of the pairings A-D, A-E, A-F, B-D, B-E, B-F, C-D, C-E, C-F.

The method may then comprise assigning each first location A, B, C a different one of the candidate second locations D, E, F based on the calculated similarity metrics between the pairs of first locations and candidate second locations. For example, the assignment may be by solving the maximal matching problem for a bipartite graph based on the similarity metrics of all of the pairs. For example, the assignments may be made using a Linear Sum Assignment algorithm, for example the "linear_sum_assignemt" routine in a Python-NumPy library. For example, the assignment may be made by minimizing the function $\Sigma_i \Sigma_j C_{ij} X_{ij}$ where C is a cost matrix where C[i, j] is the 'cost' of assigning first location i a candidate second location j (e.g., inversely proportional to the similarity metric thereof), X is a Boolean matrix where X[i, j]=1 if row i is assigned to column j, and wherein the minimization is subject to the constraint that there is at most one candidate second location j assigned per first location i. For example, as a result of this process, the following assignments may be determined: A-D, B-E, C-F.

In some examples, assigning a first location A, B, C a candidate second location D, E, F may be responsive to a determination that the similarity metric between the first descriptor for the first location A, B, C and the second descriptor for the candidate second location D, E, F is above a threshold value. For example, the threshold value could be set, for example, at 70% similarity. This may help ensure that there is a certain degree of confidence in the assignment. For example, while given feature A may have been assigned to feature D in the second medical imaging data 770 as part of the linear sum assignment, it may be determined that the similarity metric for this pair A-D is below the threshold value, and hence the assignment of D to A may not be made. However, the similarity metrics for the pairings B-E and C-F may be above the threshold, and hence these assignments may be made.

The method may then comprise determining, for each said first location B, C, as the location at which the respective said given feature B, C is represented in the reference medical image series RMIS, the second candidate location E, F assigned to the first location. For example, according to the assignments B-E and C-F made in this example, the method may comprise determining the locations of features E and F as the location at which features B and C, respectively, are represented in the reference medical image series RMIS.

The method described above with reference to FIG. 25 may help prevent inconsistencies that could otherwise occur if the method described above with reference to FIGS. 19 to 24 were applied sequentially and separately to each of a plurality of given features. Accordingly, this may allow for more reliable determination of the location at which a given feature is represented in the reference medical image series RMIS in the case where there is a plurality of given features.

In some examples, the output data may comprise associations or links PM-774, PM-776 between each first location B, C and the candidate second location E, F that has been assigned to the first location B, C. For example, the output data may be similar that represented in FIG. 25, where representations of the target medical image series TMIS and the reference medical image series RMIS are presented adjacent to one another, and where there is a first link PM-774 drawn between the first location B and the candidate second location E to which it has been assigned, and a second link PM-776 drawn between the first location C and the candidate second location F to which it has been assigned. These links PM-774, PM-776 may act as indicators of the locations E, F at which the given features B, C are represented in the reference medical image series RMIS. This output data may be stored and/or displayed, for example as described above. This may allow a user to immediately and easily identify the location at which each given feature B, C represented in the target medical image series TMIS is represented in the reference medical image series RMIS, and indeed vice versa.

To serve as an illustration of the performance of examples of the method disclosed herein, a study was performed. Specifically, a study was performed for examples described above with reference to FIG. 22 where a hierarchical search for the location at which the given feature PM-226 is represented in the second medical imaging data PM-330 is performed. In this study, the method was performed on a benchmark dataset of lung lesion pairs each across two images taken at different time points. In this study, the distance from the estimated location at which the given feature is represented in the second medical imaging data to the true location at which the given feature is represented in the second medical imaging data, was calculated, for each of the dataset pairs. The precision of the estimation under a series of distance thresholds was then calculated. This provides a measure of the sensitivity of the estimation as a function of the distance from the true location at which the given feature is represented in the second medical imaging data. FIG. 8 illustrates a plot of this sensitivity as a function of the distance (in mm) for the above referenced example of the presently disclosed method (solid line PM-882) as well as comparative methods (dashed line PM-884, dotted line 880, and black circles PM-886) as applied to the dataset. The comparative methods were each Image Registration based methods. As can be seen from the plot in FIG. 26, the presently disclosed method can surpass the performance of the studied Image Registration based methods. Specifically, in about 92% of the cases, the studied example method was able to determine the location at which the given feature was represented in the second medical imaging data 330 to within 15 mm of its true location. In the studied example method, the location was not only able to be determined accurately, but also quickly, specifically in under a few seconds. According, the presently disclosed method can provide for fast and accurate determination of the location at which the given feature is represented in the reference medical image series RMIS.

Figure 27:
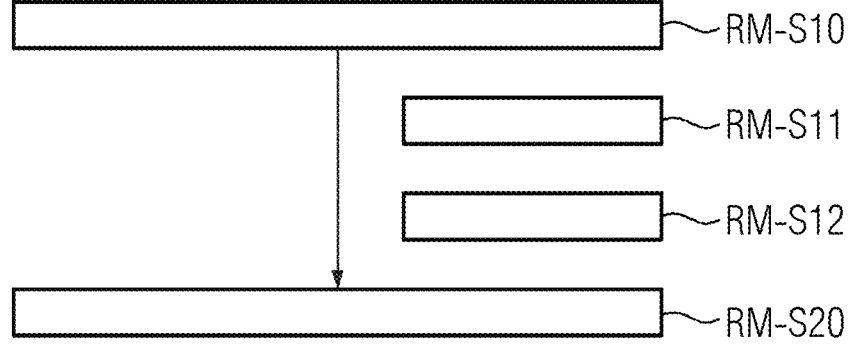
FIG. 27 depicts a flowchart illustrating a method for annotating a target medical image series according to an embodiment.

FIG. 27 depicts a method for annotating the target medical image series TMIS according to an embodiment. The method comprises several steps. The order of the steps does not necessarily correspond to the numbering of the steps but may also vary between different embodiments of the present invention. Further, individual steps or a sequence of steps may be repeated. The method of FIG. 27 may, for instance, be carried out following the selection of a reference medical image study RS at step S40, the identification of a reference medical image series RMIS at step S50, or the registration of the target medical image series TMIS and the reference medical image series RMIS at step S60.

According to this embodiment, the reference medical image study RS comprises one or more annotations RM-322 to RM-330. The annotations RM-322 to RM-330 may, in particular, correspond to the reference image series RMIS. Further, one or more of the annotations RM-322 to RM-330 may relate to the reference slice REF-SLC.

At a first step RM-S10, the method comprises obtaining, from the one or more annotations RM-322 to RM-330, at least a reference annotation relevant for the target medical image series TMIS and/or the region of interest ROI. 37. This may involve identifying, from the one or more annotations RM-322 to RM-330, annotations RM-322 to RM-330 relating to the reference slice REF-SLC.

In an alternative, this may involve respectively obtaining (RM-S11) reference positions of the one or more annotations RM-322 to RM-330. Thereby, a reference position may be, for instance, the position of a lesion in the reference medical image series RMIS the annotation is referring to or the location of an annotation RM-322 to RM-330 in the coordinate system of the reference medical image series RMIS. Further, this may involve determining RM-S12, for each reference position, if there is a match with a corresponding target position in the target medical image series TMIS and/or the region of interest ROI. Annotations RM-322 to RM-330 the reference positions of which match with corresponding target positions in the target medical image series TMIS and/or the region of interest ROI are identified as reference annotations which are relevant for the target medical image series TMIS. Thereby, the step of determining RM-S12 a match between target and reference positions may be based on evaluating image data of the target medical image series TMIS and reference medical image series RMIS around the respective position. In particular, as will be further explained in connection with FIGS. 28 to 30, image patches located relative to the target and reference position may evaluated if they have a certain degree of similarity between the reference medical image series RMIS and the target medical image series TMIS. According to other examples, the step of determining RM-S12 a match may be based on the registration of step S60.

At step RM-S20, the target medical image series TMIS and, in particular, the region of interest ROI are annotated with the reference annotations A, B, C, D determined at step RM-S10. In particular, this may comprise annotating the target medical image series TMIS and/or the region of interest ROI with the reference annotation A, B, C, D at the target positions RM-202 to RM-210.

Figure 28:
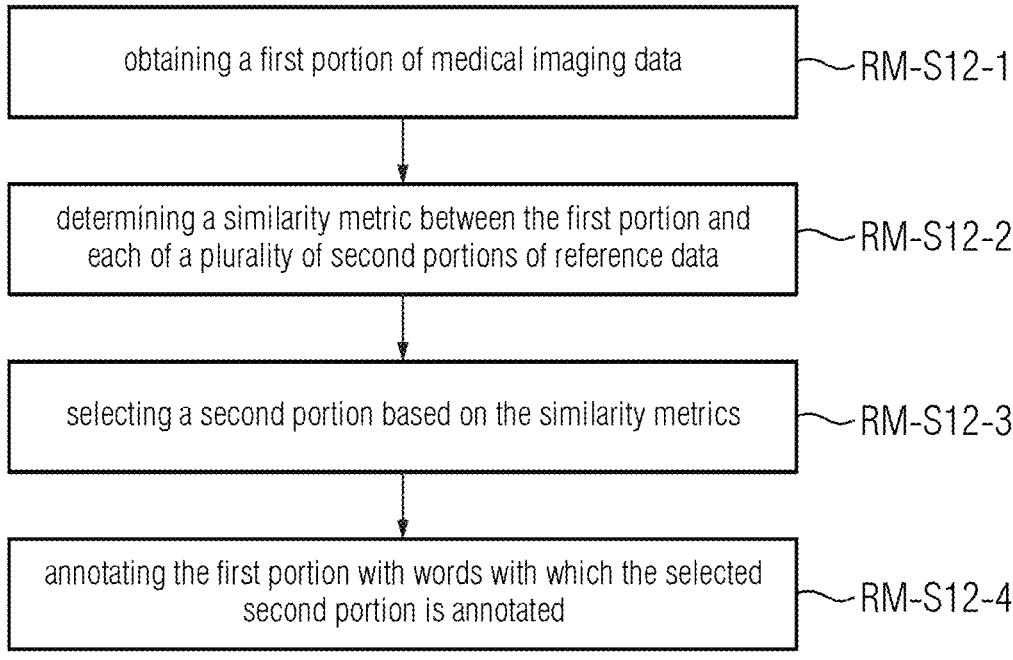
FIG. 28 depicts a flowchart illustrating a method for determining annotations for a target medical image series based on a reference medical image series according to an embodiment.

Referring to FIG. 28, there is illustrated a computer implemented method of annotating a portion of medical imaging data with one or more words corresponding to a respective one or more features represented in the portion of medical imaging data.

Figure 29:
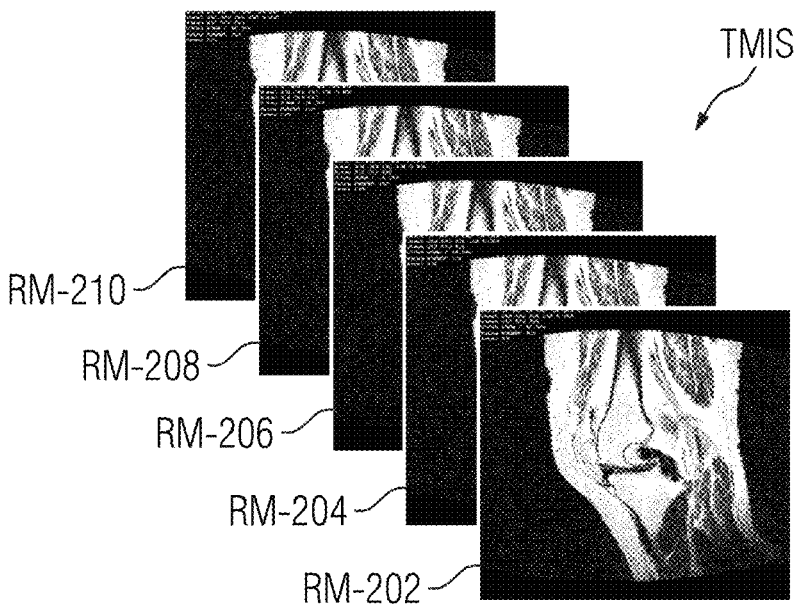
FIG. 29 is a schematic diagram illustrating image components in the form of image slices of a target medical image series according to an embodiment.
Figure 30:
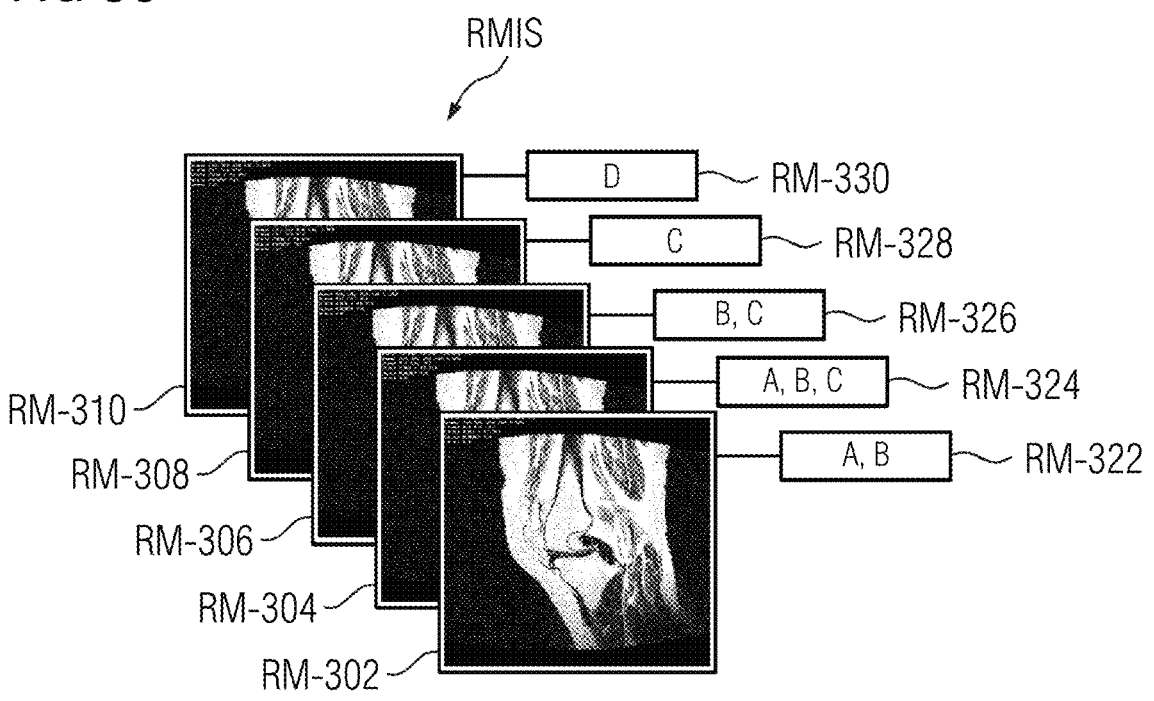
FIG. 30 is a schematic diagram illustrating image components in the form of image slices of a reference medical image series and associated annotations according to an embodiment.
Figure 31:
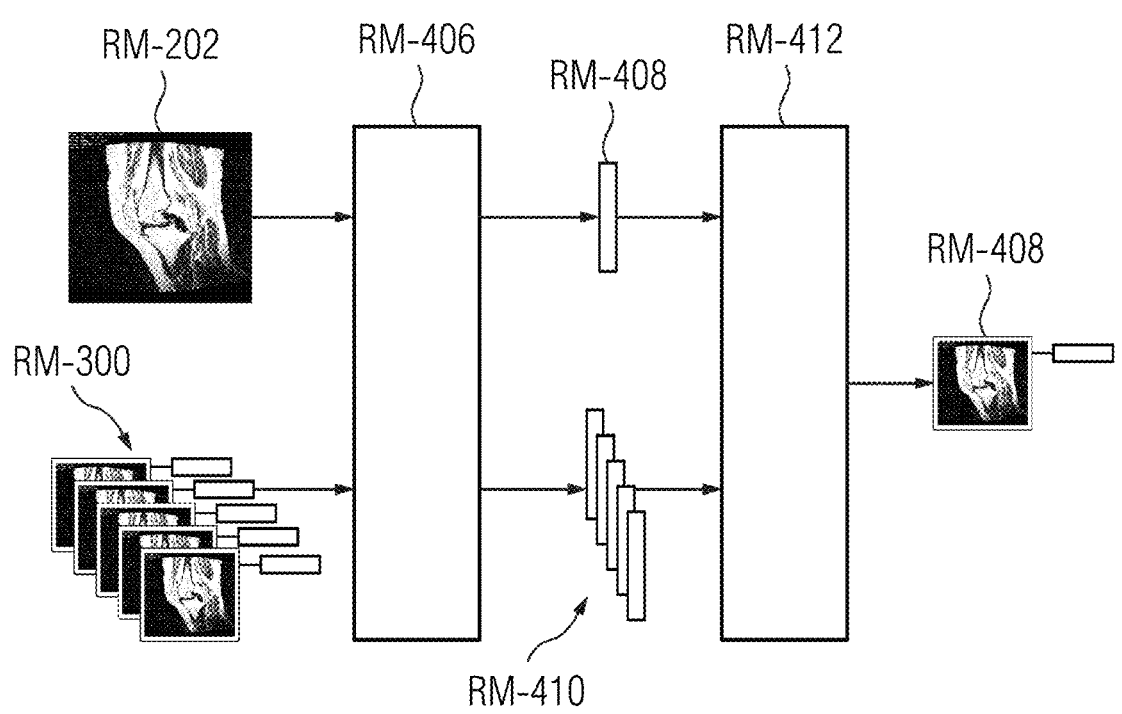
FIG. 31 schematically shows data streams associated with a method for annotating a target medical image series according to an embodiment.

In broad overview, the method comprises:

in step RM-S12-1, obtaining one or more target image patches of the target medical image series TMIS (see, e.g., target image patches RM-202 to RM-210 of the target medical image series TMIS in FIG. 29) and/or obtaining one or more reference image patches of the reference medical image series RMIS (see, e.g., reference image patches RM-302 to RM-310 of the reference medical image series RMIS in FIG. 30);

in step RM-S12-2, for each of the one or more target image patches RM-202 to RM-210 and for each of a plurality of reference image patches of the reference medical image series RMIS (see, e.g., reference image patches RM-302 to RM-310 of the reference medical image series RMIS in FIG. 30), determining a similarity metric indicating a degree of patch similarity between a reference image patch RM-302 to RM-310 and a target image patch RM-202 to RM-210, wherein each of the plurality of reference image patches RM-302 to RM-310 is annotated with one or more first words A-D corresponding to a respective one or more features represented in the reference image patch RM-302 to RM-310;

in step RM-S12-3, for each of the one or more target image patches RM-202 to RM-210, selecting a reference image patch RM-302 to RM-310 from among the plurality of reference image patches RM-302 to RM-310 based on the similarity metrics determined for the target image patch RM-202 to RM-210 and the reference image patches RM-302 to RM-310 or vice versa; and in step RM-S12-4, for each of the one or more target image patches RM-202 to RM-210, annotating the target image patch RM-202 to RM-210 with the one or more first words A-D with which the reference image patch RM-302 to RM-310, selected for the target image patch RM-202 to RM-210, is annotated (see, e.g., the resulting annotated target image patch RM-408 in FIG. 31).

In particular, the reference image patches RM-302 to RM-310 may be obtained based on image data located relative to the respective reference positions of the annotations A, B, C, D comprised in the reference medical image series RMIS. The target image patches RM-202 to RM-210 may be obtained based on image data located relative to the respective target positions, wherein the target positions may be appropriately distributed in the target medical image series TMIS and/or the region of interest ROI. According to some examples, the target positions may be obtained by employing sampling patterns essentially as described in connection with FIGS. 19 to 26.

In any case, each of one or more target image patches RM-202 to RM-210 of the target medical image series TMIS or the region of interest ROI may be annotated with one or more words A-D corresponding to a respective one or more features represented in the reference image patch of the reference medical image series RMIS. For example, a text file associated with the target image patch RM-202 to RM-210 may be generated or modified to include the one or more words A-D.

Annotating the target image patch RM-202 to RM-210 with words A-D with which a reference image patch RM-302 to RM-310 of the reference medical image series RMIS, selected for the target image patch RM-202 to RM-210 based on a similarity between the target image patch RM-202 to RM-210 and the reference image patch RM-302 to RM-310, is annotated, may allow for flexible and/or efficient annotation of the target image patch RM-202 to RM-210. For example, this may be as compared to applying Landmark Detection to the target image patch RM-202 to RM-210 to determine anatomical landmarks represented by the target image patch. Landmark Detection techniques apply trained classifiers to identify different anatomical landmarks in images, which requires a different classifier to be trained and applied for each different landmark that is to be detected, which is computationally expensive and in some cases not possible and/or depends on the imaging modality with which the image was acquired. However, according to the method of FIG. 28, the reference image patches RM-302 to RM-310 of the reference medical image series RMIS need only have been annotated with words corresponding to the features represented. The words with which the target image patch RM-202 to RM-210 is annotated is then based on the patch similarity of the target image patch RM-202 to RM-210 with the reference image patches RM-302 to RM-310, which can be done independently of the imaging modality used to acquire the target image patch and without needing to apply trained classifiers to detect features in the target image patch. Flexible and/or efficient annotation may therefore be provided.

The resulting annotated target image patch RM-202 to RM-210 has utility and may be used in many different ways. Some example ways in which the resulting annotated target image patch may be used are described below with reference to FIGS. 32 to 34. As one example, the one or more words A-D with which each target image patch RM-202 to RM-210 is annotated may be searched, e.g., by a suitably executed query, for a particular feature of interest (e.g., a particular anatomical feature), and one or more target image patches annotated with one or more words A-D matching the query may be extracted and, e.g., displayed to a radiologist. This may significantly y reduce the burden associated with a radiologist navigating through all of the plurality of target image patches RM-202 to RM-210 to identify those in which the particular feature of interest is represented. Moreover, by extracting and displaying one or more target image patches annotated with one or more words A-D matching the query, the computational and/or communications burden associated with extracting and displaying all of the plurality of target image patches RM-202 to RM-210 for the radiologist to assess, may be reduced.

Referring to FIG. 29, there is illustrated a further example of the target medical image series TMIS. In this example, the target medical image series TMIS is volumetric data, i.e., the target medical image series TMIS covers a three-dimensional (body) region or volume of the patient. The target medical image series TMIS may comprise a plurality of target image patches RM-202, RM-204, RM-206, RM-208, RM-210. Each of the target image patches RM-202 to RM-210 may correspond to a respective slice of the patient target medical image series TMIS. As illustrated, the slices RM-202 to RM-210 are slices through an imaging volume containing a knee of a patient. As illustrated, the slices RM-202 to RM-210 are in a sequence and each successive slice in the sequence corresponds to medical imaging data at a successive axial position. For example, if each slice RM-202 to RM-210 extended in an plane defined by two perpendicular axes (e.g., x, y axes) each successive slice in the sequence would correspond to a successive position along an axis orthogonal to the two axes (e.g., z axis). In some examples, each slice RM-202 to RM-210 may be 2-dimensional in the sense that each slice has a thickness of one voxel. In some examples, each slice may be pseudo-2-dimensional in that each slice has a thickness of a few voxels or in any case significantly less than the thickness of the patient target medical image series TMIS overall. In either case, each slice of data can be rendered into a 2-dimensional image, as shown.

Alternatively, each target image patches RM-202 to RM-210 may correspond to an image region in the region of interest ROI.

As mentioned, the method comprises, in step RM-S12-2, determining a similarity metric indicating a degree of patch similarity between the target image patch RM-202 to RM-210 and each of a plurality of reference image patches RM-302 to RM-310 of the reference medical image series RMIS.

Similarly to as for the patient target medical image series TMIS, the reference medical image series RMIS may comprise an array of elements each having a value. For example, the reference medical image series RMIS may comprise a 3-Dimensional array of voxels, each voxel having at least one value, similarly to as described above.

Referring to FIG. 30, there is illustrated an example of the reference medical image series RMIS. The reference medical image series RMIS comprises a plurality of reference image patches RM-302, RM-304, RM-306, RM-308, RM-310. Similarly to as for the target image patches RM-202 to RM-210 of patient medical imaging data, each of the reference image patches RM-302 to RM-310 of the reference medical image series RMIS may correspond to a respective slice RM-302 to RM-310 of the reference medical image series RMIS, similarly to as described above. As illustrated in FIG. 30, the slices RM-302 to RM-310 are slices through an imaging volume containing a knee of a patient (or human who need not necessarily be a patient). The patient of the reference medical image series RMIS (i.e., the 'reference patient') need not necessarily be the same patient as the patient of the patient target medical image series TMIS, and in practice will not be the same patient as the patient of the patient target medical image series TMIS. However, the features (e.g., the anatomical features of a knee) of the reference patient and another patient will generally correspond because anatomy amongst human beings is generally shared. In some examples (as illustrated), there may be only one set of the reference medical image series RMIS. For example, it may be predefined that the method is to be used for patient target medical image series TMIS including generally the same anatomical region (e.g., a knee region) as the reference medical image series RMIS generally depicts. In other examples, there may be multiple sets of the reference medical image series RMIS (not shown), for example each set being for a different anatomical region of a patient. In these examples, the method may comprise selecting the set of the reference medical image series RMIS to be used. This selection may comprise, for example, a user selecting the appropriate anatomical region (and hence appropriate the reference medical image series RMIS to be used), or the appropriate anatomical region being determined automatically from an analysis of the patient target medical image series TMIS (e.g., from information in image headers or from the image data itself). As illustrated, the slices RM-302 to RM-310 are in a sequence and the sequence extends in the same direction, relative to the patient, as the direction in which the sequence of target image patches 102-210 extends. For example, the direction, relative to the patient, in which the sequence extends may be standardized, for example standardized for each anatomical region. As another example, the direction in which the patient target medical image series TMIS is sliced may be chosen to match that of the reference medical image series RMIS. Alternatively, each reference image patch RM-302 to RM-310 may correspond to an image region within a slice.

In any case, each of the plurality of reference image patches RM-302 to RM-310 of the reference medical image series RMIS is annotated RM-322 to RM-330 with one or more first words A-D corresponding to a respective one or more features represented in the reference image patch RM-302 to RM-310. For example, each reference image patch RM-302 to RM-310 of the reference medical image series RMIS may be stored in association with text data RM-322 to RM-330 that consists of or comprises the one or more first words A-D corresponding to a respective one or more features represented in the reference image patch RM-302 to RM-310. For example, each reference image patch RM-302 to RM-310 may be associated with (e.g., stored in association with) a text file RM-322 to RM-330 including the one or more words A-D corresponding to a respective one or more features represented in the reference image patch RM-302 to RM-310.

For each of the reference image patches RM-302 to RM-310, the associated annotation RM-322 to RM-330 lists first words A-D corresponding to a respective one or more features represented in the reference image patch RM-302 to RM-310. For example, for a given reference image patch RM-302 to RM-310, the first words A-D may each be the names of anatomical features that are visibly present in the reference image patch RM-302 to RM-310. As illustrated in the example of FIG. 30, a first slice (reference image patch) RM-302 includes a representation of anatomical features A and B, and hence the first words corresponding to the name of the anatomical features A and B are included in the associated annotation RM-322. For example, the first slice RM-302 may show the anatomical features of the posterior cruciate ligament (pcl) and the anterior cruciate ligament (acl) of the knee. Accordingly, the words A, B included in the annotation 322 for the first slice may be the words 'posterior cruciate ligament' or 'pcl' and 'anterior cruciate ligament' or 'acl'. It is noted that, as used herein, 'word' may mean a single word or a combination of words, e.g., together constituting a name for a given feature, e.g., an anatomical feature. Similarly, the slice RM-304 shows features A, B, and C, and hence it is annotated 324 with words A, B, C. Similarly, the slice RM-306 is annotated 326 with words B, C; the slice RM-308 is annotated RM-328 with the word C; and the slice RM-330 is annotated with the word D. The annotations RM-322 to RM-330 may be made by a medical expert examining each of the reference image patches RM-302 to RM-308 and typing in the names of the features (e.g., anatomical features) present or illustrated in the reference image patch RM-302 to RM-310. Other methods may in principle be used to generate the annotations, for example by applying feature detection to each of the reference image patches RM-302 to RM-310.

The reference medical image series RMIS acts as a reference against which target image patches RM-202 to RM-210 of the target medical image series TMIS may be compared for follow-up reading. In other words, the annotations RM-322 to RM-330 contained in the reference medical image series RMIS may be carried over to the target medical image series TMIS to be used as a reference.

Referring to a particular target medical image series TMIS, as mentioned, the method comprises, for each of the target image patches RM-202 to RM-210, determining a similarity metric indicating a degree of patch similarity between the target image patch RM-202 to RM-210 and each of the plurality of reference image patches RM-302 to RM-310 of the reference medical image series RMIS.

In some examples, determining the similarity metric may for a given target image patch RM-202 and a given reference image patch RM-302 may be based on a measure of patch similarity between a first patch descriptor representing the target image patch RM-202 and a second patch descriptor representing the reference image patch RM-302. For example, the similarity metric may comprise the cosine similarity or Euclidian distance, or other similarity measure, of the first patch descriptor and the second patch descriptor. In some examples, the patch descriptors may be determined using a neural network, trained based on an input portion of medical imaging data, to generate a patch descriptor representative of the input portion of medical imaging data. For example, the neural network may be a convolutional neural network trained to determine a patch descriptor (e.g., a column vector) whose values are representative of the input portion of medical imaging data in feature space. For example, determining the similarity metric may comprise determining a measure of similarity between a first patch descriptor generated by inputting the target image patch RM-202 into the trained neural network and a second patch descriptor generated by inputting the reference image patch 302 into the trained neural network. The neural network may be a deep neural network.

In some examples, the second patch descriptors for each of the plurality of reference image patches RM-302 to RM-310 may be determined in advance (e.g., by inputting the reference image patches RM-302 to RM-310 into the trained neural network) and stored in association with the respective reference image patches RM-302 to RM-310 in the reference medical image series RMIS. In these examples, the reference medical image series RMIS need not necessarily include the imaging data itself, rather, for example, only the second patch descriptors for each reference image patch RM-302 to RM-310 and the annotations RM-322 to RM-330 associated with each. In these examples, determining the similarity metric may comprise determining the measure of similarity between the first patch descriptor determined for the given target image patch RM-302 and each of the pre-calculated second patch descriptors for each of the respective reference image patches RM-302 to RM-310.

In some examples, the first patch descriptor and the second patch descriptor may be obtained by first inputting the target image patch RM-202 into the trained neural network to obtain the first patch descriptor and then inputting the reference image patch RM-302 into the trained neural network to obtain the second patch descriptor.

In some examples, the trained neural network may be part of a Siamese neural network trained to output a similarity metric indicating a degree of patch similarity between two input portions of medical imaging data. For example, the Siamese network may comprise two 'twin' convolutional neural networks having shared (i.e., the same) weights. The target image patch RM-202 may be input into a first of these convolutional neural networks to generate the first patch descriptor and the reference image patch RM-302 input into the second of these convolution neural networks to generate the second patch descriptor. A similarity measure (e.g., Euclidean distance, cosine similarity, or the like) may be determined between the first and second patch descriptors, and this may be passed through an activation function (e.g., sigmoid function or the like) to produce a similarity metric indicating the degree of patch similarity between the target image patch RM-202 and the reference image patch RM-302. For example, the similarity metric may be between 0 and 1, where 0 indicates completely dissimilar and 1 indicates identical. In these examples, the Siamese neural network may be trained based on a training data set comprising pairs of images known to be similar and pairs of images known to be dissimilar. The similar pairs may be labelled with a similarity metric of 1, and the dissimilar pairs may be labelled with a similarity metric of 0. The Siamese neural network may then be trained, based on the training data set, and using the label of each pair as a supervisory signal. Other neural networks may be used.

As mentioned, the method comprises, in step RM-S12-3, for each of the one or more target image patches RM-202 to RM-210, selecting a reference image patch RM-302 to RM-310 from among the plurality of reference image patches RM-302 to RM-310 or vice versa based on the similarity metrics determined for the target image patch RM-202 to RM-210 and the reference image patches RM-302 to RM-310.

In some examples, selecting the reference image patch RM-302 to RM-310 may comprise, for a given target image patch RM-202, selecting that reference image patch RM-302 to RM-310 among the plurality which has the largest similarity metric with the target image patch RM-202. In some examples, selecting the target image patch RM-202 to RM-210 may comprise, for a given reference image patch RM-302, selecting that target image patch RM-202 to RM-210 among the plurality which has the largest similarity metric with the reference image patch RM-302. This may be repeated for each of the target image patches RM-202 to RM-210 or reference image patches RM-302 to RM-310.

In some examples, where there are a plurality of the target image patches RM-202 to RM-210, selecting a reference image patch RM-302 to RM-310 for each of the plurality of target image patches RM-202 to RM-210 may comprise generating a one-to-one mapping between the plurality of target image patches RM-202 to RM-210 and the plurality of reference image patches RM-302 to RM-310 that maximizes a total of the determined similarity metrics or vice versa. In other words, there may be enforced a condition that any given reference image patch RM-302 to RM-310 may only be mapped onto or paired with at most one of the target image patches RM-202 to RM-210 or vice versa, and within this constraint the pairings may be optimized so as to maximize the sum of the similarity metrics resulting from the pairings. This may allow for more accurate selection of the reference image patch RM-302 to RM-310 for a given target image patch 202 or vice versa. For example, this may particularly be effective in cases where the slice resolution (i.e., the physical distance between the regions that consecutive slices represent) or the number of slices in the reference medical image series RMIS is the same or similar to that of the patient target medical image series TMIS.

In any case, a reference image patch RM-302 to RM-310 is selected for each of the one or more target image patches RM-202 to RM-210 or vice versa. As mentioned, the method comprises, in step RM-S12-4, for each of the one or more target image patches RM-202 to RM-210, annotating the target image patch RM-202 to RM-210 with the one or more first words A-D with which the reference image patch RM-302 to RM-310, selected for the target image patch RM-202 to RM-210, is annotated. For example, referring to FIGS. 29 and 30, if the reference image patch RM-302 was selected for the target image patch RM-202 (e.g., based on the reference image patch 302 having the highest similarity metric with the target image patch RM-202 out of all of the reference image patches RM-302 to RM-310), then the words A and B included in the annotation 322 of the reference image patch RM-302 will be used to annotate the target image patch RM-202.

In some examples, annotating a given target image patch RM-202 to RM-210 may comprise storing text data that comprises or consists of the one or more first words A-D, with which the selected reference image patch RM-302 to RM-310 is annotated, in association the given target image patch. For example, a text file associated with the given target image patch RM-202 to RM-210 may be generated or modified to include the one or more first words A-D of the selected reference image patch RM-302 to RM-310. According to some examples, the text file may be in the form of a structured report.

As a result, each target image patch RM-302 to RM-310 is annotated with words that correspond to features represented in the target image patch RM-302 to RM-310. For example, the reference image patch RM-302 may be selected for the target image patch RM-202 because it is a high similarity metric. It may therefore be inferred that the features represented in the reference image patch RM-302 are the same as those represented in the target image patch 202. Accordingly, by annotating the target image patch RM-202 with the same words A, B with which the reference image patch RM-302 of the reference medical image series RMIS was annotated, the target image patch RM-202 is now annotated with words A, B that correspond to the features represented by the target image patch RM-202. This may be applied for all of the target image patches RM-202 to RM-210 of the patient target medical image series TMIS.

In some examples, the position of a target image patch RM-202 within the patient target medical image series TMIS, and the position of each of the reference image patches RM-302 within the reference medical image series RMIS, may be used to inform the selection of the reference image patch RM-302 for the target image patch RM-202. For example, as mentioned above, each target image patch RM-202 to RM-210 may be a slice of the patient target medical image series TMIS and each reference image patch RM-302 to RM-310 may be a slice of the reference medical image series RMIS. In some examples, each target image patch RM-202 to RM-210 may be associated with a first slice position value indicative of a position, within the patient target medical image series TMIS, of the respective slice to which the target image patch RM-202 to RM-210 corresponds; and each reference image patch RM-302 to RM-310 may be associated with a second slice position value indicative of a position, within the reference medical image series RMIS, of the respective slice to which the reference image patch corresponds RM-302 to RM-310. For example, the first slice position value may be an index of the position of the slice within the sequence of slices. For example, referring to FIG. 29, the first slice position value of slices RM-202, RM-204, RM-206, RM-208, and RM-210 may be 1, 2, 3, 4, and 5, respectively. Similarly, referring to FIG. 30, the second slice position value of slices RM-302, RM-304, RM-306, RM-308, and RM-310 may be 1, 2, 3, 4, and 5, respectively. In such examples, the method may comprise, for each of the one or more target image patches RM-202 to RM-210 and for each of the plurality of reference image patches RM-302 to RM-310, determining a slice position similarity metric indicative of a similarity between the first slice position value associated with the target image patch RM-202 with the second slice position value associated with the reference image patch RM-302. For example, the slice position similarity metric may be based a difference between the first slice position value and the second slice position value. For example, for first slice RM-202 and second slice RM-302, in the example mentioned above, the difference would be 0, indicating a high slice position similarity, whereas for first slice RM-202 and second slice RM-310, the difference would be 4, indicating a low slice position similarity. In such examples, for each of the one or more target image patches RM-202 to RM-210, selecting the reference image patch RM-302 from among the plurality of reference image patches RM-302 to RM-310 may be further based on the slice position similarity metrics determined for the target image patch RM-202 and the reference image patches RM-302 to RM-310. For example, an overall similarity metric may comprise a combination of, e.g., a weighted combination of, the similarity metric and the slice position similarity metric, and the reference image patch RM-202 to RM-210 may be selected for a given target image patch 202 based on the overall similarity metric. This helps encode the relative spatial positioning of the slices into the selection of the reference image patch RM-302. This may help improve the accuracy of the selection as compared to using similarity between the image data (e.g., patch descriptors thereof) alone.

Referring to FIG. 31, there is illustrated schematically a flow according to which the method may be implemented, according to an example. The illustrated flow is for a given target image patch 202 of patient target medical image series TMIS. The target image patch RM-202 is input into a patch descriptor generator RM-406 (e.g., a trained neural network as described above) which accordingly outputs a first patch descriptor RM-408 for the target image patch RM-202. The plurality of reference image patches of the reference medical image series RMIS are also input into the vector generator RM-406 to generate a set of second patch descriptors RM-410, one for each of the plurality of reference image patches. As described above, the second patch descriptors RM-410 may be determined in advance of or concurrently with the first patch descriptor RM-408, and the patch descriptor generator 406 may comprise, for example a convolutional neural network and/or may be part of a Siamese neural network.

The first patch descriptor RM-408 and the second patch descriptors RM-410 are input into a comparator RM-412, which determines a similarity metric between the first patch descriptors and each of the plurality of second patch descriptors RM-410, selects a reference image patch based on the similarity metrics, and annotates the target image patch RM-202 with the words with which the selected reference image patch is annotated (for example as described above). In some examples, the selection may also be based on a slice position similarity metric, as described above. In any case, the comparator RM-412 outputs the annotated target image patch RM-408. This may be repeated for each of the target image patches RM-202 to RM-210. Each of the target image patches may therefore be annotated with words A, B that correspond to the features represented by the target image patch RM-202.

As mentioned above, the method described above with reference to FIGS. 28 to 31 provides for flexible and/or efficient annotation of target image patches of patient medical imaging data, for example as compared to using Landmark Detection to identify the features represented by each of the target image patches. Moreover, having the patient target medical image series TMIS with target image patches RM-202 to RM-210 annotated with words A-D corresponding to the features represented thereby, has many uses. For example, the words are searchable by executing a suitable query. Accordingly, target image patches RM-202 to RM-210 that represent or include certain features (e.g., certain anatomical features) may be identified by such a word search, e.g., without requiring a radiologist to visually inspect all of the target image patches RM-202 to RM-210 and/or without having to extract and render all of the target image patches RM-202 to RM-210 for inspection.

Other example ways in which the annotated target image patches of patient medical imaging data may be used will now be described with reference to FIGS. 32 to 34.

Firstly, there is described a motivating scenario. In certain cases, it is useful or necessary for a radiologist to look back at a previous medical text report and its associated medical image slices. For example, the radiologist may wish to compare the previous medical image slices to a current medical image slice for which a medical text report is to be generated, in order to assess the progression of a disease of a particular anatomical feature. However, in order to do this, the radiologist must open and look through each of the previous medical image slices to identify the slice or slices which show the particular anatomical feature of interest. Conversely, the radiologist must read through all of the previous medical text report in order to identify the findings relevant to an anatomy shown in a particular previous image. This is time consuming and burdensome. Moreover, it requires all of the previous medical image slices to be extracted, communicated to a radiologist terminal, and displayed, which is resource intensive.

Accordingly, in some examples, the method according to the present disclosure may comprise obtaining one or more first sections F1-F3 of text of a medical text report RM-504 associated with the patient target medical image series TMIS, each first section F1-F3 comprising one or more second words; and for each of the one or more first sections F1-F3 and for each of the one or more target image patches RM-202 to RM-210: comparing one or more of the second words of the first section F1-F3 with one or more of the first words A-D with which the target image patch RM-202 is annotated to identify a match; and associating the target image patch RM-202 to RM-210 with the first section F1-F3 on the basis of the identified match. This allows for each section F1-F3 of the medical text report RM-504 to be linked to a particular one or more first slices RM-202 to RM-210 of the patient medical imaging data, according to the features represented in the particular one or more first slices RM-202 to RM-210 being mentioned in that section F1-F3. As described in more detail below, this link can be used e.g., to allow a radiologist to easily identify particular first slices RM-202 to RM-210 that correlate with a particular sections F1-F3 of the medical text report, and vice versa. This may in turn e.g., reduce or eliminate the burden associated with the radiologist finding a particular first image patches RM-202 to RM-210 of interest and/or reduce or eliminate the resource burden associated with needing to extract, communicate and display all of the first image patches RM-202 to RM-210.

As mentioned, the method may comprise obtaining one or more first sections F1-F3 of text of a medical text report RM-504 associated with the patient target medical image series TMIS, each first section F1-F3 comprising one or more second words. FIG. 32 illustrates schematically such a medical text report RM-504. In this example the medical text report RM-504 is a radiology report and the first sections F1-F3 are three findings. In this example each finding F1-F3 is a sentence of second words. Specifically, finding F1 is the text "grade I mucoid degradation of anterior horn of lateral meniscus", finding F2 is the text "acl mucoid degeneration", and finding F3 is the text "intact pcl, with no abnormal signal". The findings may be entered into the report RM-504 as separate findings, or the medical text report RM-504 may be pre-processed to segment the text into sections/sentences/findings F1-F3. A given one of these first sections F1-F3 may be obtained. The medical text report RM-504 may be the report generated based on a radiologist reading the patient target medical image series TMIS.

As mentioned, the method may then comprise, for each target image patch RM-202 to RM-210 and for each first section F1-F3, comparing one or more of the second words of the first section F1-F3 with the first words A-D with which the target image patch RM-202 is annotated to identify a match. For example, the target image patch RM-202 may show an anterior cruciate ligament (acl) and hence may be annotated with the first words "anterior cruciate ligament" and/or "acl" (as a result of the process described above with reference to FIGS. 27 to 30). These words may be compared to the words of the first section F2 i.e., to the words "acl mucoid degeneration". Based on this comparison there may be a match identified (e.g., a match of the word "acl"), i.e., in that the same word appears in both the first section F2 and the annotation of the first image RM-202. As a result of this match, the target image patch 202 may be associated with the first section F2. For example, the target image patch RM-202 (or a reference thereto) may be stored in association with the first section F2 (or a reference thereto) in a storage, for example in a table in a storage. Accordingly, a link is established between the finding F2 and the target image patch RM-202 which shows an anatomical feature to which the finding F2 relates. This may be repeated for each of the first sections F1-F3. Accordingly, for each first section F1-F3 of the medical text report, there may be identified the target image patch or portions RM-202 to RM-210 that show the anatomical feature relevant to that first section F1-F3. In particular, the target image patch may be the region of interest ROI.

In some examples, the method may comprise receiving data indicating a selection of one of the first sections F1-F3 of text; and generating display data for causing a rendering RM-502 of a said target image patch RM-202/the region of interest ROI associated with the selected first section F1-F3 to be displayed on a display device 11.

In some examples, the selection of the first section F1-F3 may be a user selection. For example, the pane RM-504 shown in FIG. 32 may be an element of a GUI, in which the GUI allows the radiologist to select (e.g., by hovering a curser over or clicking on) a particular one of the first sections F1-F3. In the illustrated example, the first section F2 has been selected. Accordingly, the target image patch RM-202 that has been associated with this first section F2 is determined (e.g., by reference to the table). The target image patch RM-202 may then be extracted from a storage, and a rendering RM-502 of the target image patch RM-202 may be displayed on a display device to the radiologist. Accordingly, the radiologist can immediately see the target image patch RM-202 that shows the feature of interest (e.g., the acl), and hence the burden and resource usage can be reduced, e.g., as compared to extracting and looking through all of the target image patches RM-202 to RM-210 to find the target image patch that shows the feature of interest.

In some examples, there may be a plurality of target image patches RM-202 to RM-210 associated with the selected first section F2. For example, more than one of the target image patches RM-202 to RM-210 may show the acl, and hence more than one of the target image patches RM-202 to RM-210 may be annotated with the word "acl". In these cases, a first section F2 may match to more than one of the target image patches RM-202 to RM-210. In these cases, the display data may be generated for causing a rendering RM-502 of a representative one RM-204 of the plurality of target image patches RM-202 to RM-210 to be displayed on the display device (not shown). For example, the representative target image patch RM-204 may be chosen from among the plurality of target image patches RM-202 to RM-210 that are associated with the selected first section F2 based on the representative target image patch 204 being centrally located among those plurality of target image patches RM-202 to RM-210. For example, if there are three first slices RM-202, RM-204, 206 associated with the selected first section F2, then the representative slice among these may be chosen as first slice RM-204, as it is centrally located or positioned with the sequence of target image patches RM-202, RM-204, RM-206. This may help maximize the chance that the representative target image patch RM-204 shows a major or central portion of the feature of interest, which may be the most helpful of the target image patches for assessing the feature of interest.

In some examples, the method may comprise receiving data indicating a selection of one of the target image patches RM-202 to RM-210 of the target medical image series TMIS, e.g., in the form of a region of interest ROI; and generating display data for causing a said first section F2 associated with the selected target image patch RM-202 to be displayed or highlighted on a display device 11.

For example, as shown in FIG. 31, for a given selected target image patch RM-202, the associated first section F2 (or sections as the case may be) may be highlighted in bold on the GUI pane RM-504. This may allow for a radiologist, given a particular target image patch RM-202 of interest, quickly to identify the sections F1-F3 of the medical text report RM-504 that relate to the anatomical features that are shown in that particular target image patch RM-202. This may reduce the burden associated with the radiologist having to read through all of the medical text report to identify findings relevant to a particular target image patch RM-202.

In some examples, the GUI may be configured such that the radiologist can scroll (backwards or forwards) through renderings RM-502 of different target image patches RM-201 to RM-210 in sequence. In these examples, the selection of one of the target image patches RM-202 to RM-210 may comprise selecting the target image patch RM-202 to RM-210 whose rendering RM-502 is currently displayed. In this way, as the radiologist scrolls through the renderings of the target image patches RM-202 to RM-210, the corresponding first sections F1-F3 may be highlighted accordingly in turn.

Figure 32:
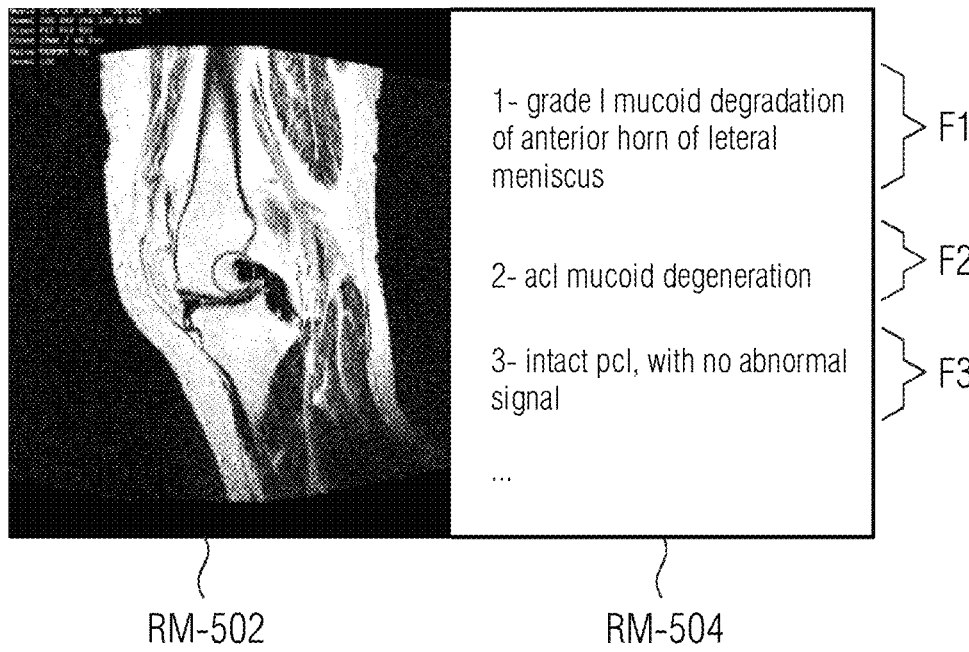
FIG. 32 is a schematic diagram illustrating a rendering of display data according to an embodiment.
Figure 33:
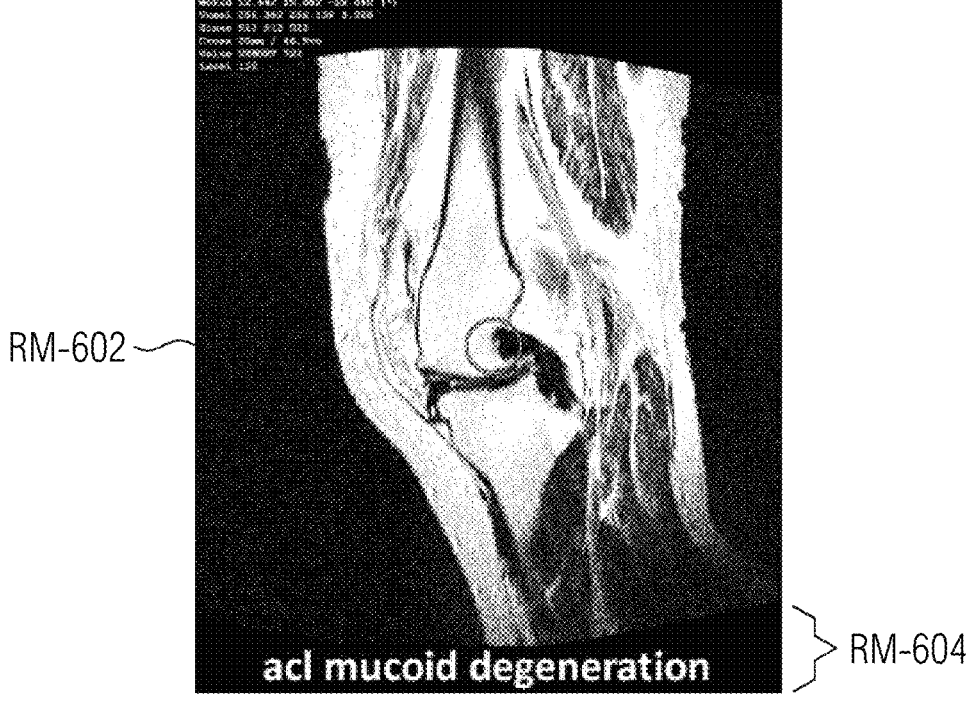
FIG. 33 is a schematic diagram illustrating a rendering of display data according to an embodiment.

In the example of FIG. 32, the text RM-504 is displayed on a separate portion of the GUI to the rendering 502. However, alternatively or additionally, in some examples, the generated display data may be for causing a said first section F1-F3 associated with the selected target image patch RM-202 to RM-210 to be displayed as overlaid on a rendering of the selected target image patch RM-202 to RM-210. For example, referring to FIG. 34, there is illustrated a rendering 602 of a selected target image patch RM-202, overlaid on which is text of the first section F2 associated with the selected image target patch RM-202. Specifically, in this example, the text "acl mucoid degeneration" is overlaid onto the rendering RM-602 of the target image patch RM-202 that shows the acl. This may help make readily apparent to the radiologist the first section or sections F1-F2 that are associated with the selected target image patch RM-202.

In some examples, the associations between the target image patches RM-202 to RM-210 of the target medical image series TMIS and the first sections F1-F3 of the medical text report RM-504 may be used to generate a new, second medical text report based on new, further medical imaging data. For example, a radiologist may be reading new, further medical imaging data for the same region of the same patient as for which the patient target medical image series TMIS was obtained. The new, further medical text report may be generated based on the first medical text report RM-504, but, for example, updated to account for developments of the previous finings and/or new findings, as assessed by the radiologist reading the new medical imaging data.

For example, the method may comprise generating display data for causing a given first section F1-F3 and a rendering of a said target image patch RM-202 associated with the given first section F1-F3 to be displayed on a display device. For example, the data displayed may be similar to that illustrated in FIG. 32. A given first section F1-F3 may be displayed on its own or highlighted (as is first section F2 in FIG. 32) to indicate that the given first section is selected. Further, in some examples, the display data may additionally or alternatively be for causing a GUI element RM-702 to be displayed on the display device, the GUI element RM-702 allowing a user to accept, reject, or modify the given first section F1-F3 for use in generating a second medical text report (not shown) associated with further medical imaging data (not shown). The method may comprise receiving user input via the GUI RM-702 indicating whether to accept, reject, or modify the given first section F1-F3 for use in generating the second medical text report. Responsive to the user input indicating to reject, the given first section F1-F3 is not included in the second medical text report. Responsive to the user input indicating to accept, the given first section F1-F3 may be copied into the second medical text report. Responsive to the user input indicating to modify, a modified version of the given first section may be obtained (e.g., from a text-editing window of the GUI element (not shown)) and the modified version of the given first section F1-F3 may be included into the second medical text report.

Figures 34, 35:
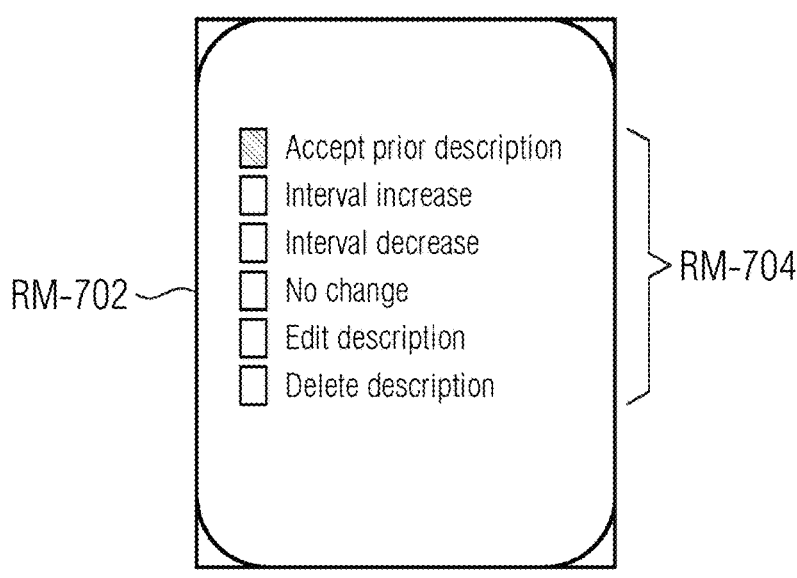
FIG. 34 is a schematic diagram illustrating an element of a Graphical User Interface (GUI) according to an embodiment.
FIG. 35 depicts a system for supporting evaluation of a target medical image series according to an embodiment.

An example GUI element RM-702 is illustrated in FIG. 34. As illustrated, in this example the GUI element 702 comprises a number of check boxes RM-704 that are selectable by the radiologist for a given first section F1-F3 of the first medical text report RM-504. The checkboxes RM-704 include "Accept prior description". If this is selected, then the given first section F1-F3 will be copied, unmodified, into the second medical text report. The checkboxes 704 also include "Interval increase", "Interval decrease", and "No change". If one of these are selected, then the given first section F1-F3 will be modified to insert the words "Interval increase in:", "Interval decrease in:", or "No change in:" respectively, in front of the given first section F1-F3, before being included in the second medical text report. The checkboxes 704 also include "Edit description". If this is selected, then a text editing window (not shown) may be opened to allow the radiologist to edit the given first section F1-F3, and the edited version of the first section may be included in the second medical text report. The checkboxes RM-704 also include "Delete description". If this is selected, then the given first section is not copied to the second medical text report, and the process may move on to the next first section F1-F3 to be considered.

Each of the first sections F1-F3 of the first medical text report RM-504 may be selected in turn. The radiologist may make the selection of whether to accept, reject or modify each first section in turn. In this way, the new, second medical text report may be generated based on the first medical text report RM-504. As mentioned above, in some examples, when the given first section F1-F3 is selected, a rendering 502 of the target image patch RM-202 to RM-210 associated with the given first section F1-F3 is displayed. Therefore, the radiologist can compare the relevant target image patch RM-202 to RM-210 to new, further medical imaging data (not shown), to assess whether the selected first section F1-F3 of the medical text report RM-504 should be accepted, rejected, or modified for use in the new, second medical text report for the further medical imaging data. This reduces both the burden of the radiologist in finding the relevant target image patch RM-202 to RM-210 with which to compare the further medical imaging data, and also the burden of generating the new, second medical text report. Further, since only the relevant target image patches RM-202 to RM-210 need be extracted and rendered, the resource usage associated with extracting, communicating, and rendering all of the target image patches RM-202 to RM-210 may be reduced.

FIG. 35 depicts an system 1' for generating display data according to an embodiment. The system is adapted to perform the method 1 according to one or more aspects, e.g., as further described with reference to FIG. 39. Like reference numerals as compared to FIG. 1 designate like components.

System 1' comprises an interface unit 10, e.g., in the form of a reading workstation. The system 1' further comprises a computing unit 30. According to some examples, the target medical image series TMIS may be shown on the output unit 11. For example, the output unit 11 may visualize a selected image slice out of the target medical image series TMIS or a projection image comprising image information of a plurality of image slices. The display of the target medical image series TMIS may comprise the presentation of tissue TIS in the examined body part of a patient under examination. The presented tissue TIS may comprise a suspicious or pathologic or abnormal structure, i.e., a lesion LES, which is likewise presented via output unit 11.

A region of interest ROI is defined by at least the area covered by the lesion LES, preferably a slightly bigger area. The output unit 11 is further adapted to visualize an evaluation tool ML-40. Preferably, the evaluation tool ML-40 is visualized as an overlay to the target medical image series TMIS, and most preferably to the region of interest ROI covering the lesion LES. The evaluation tool ML-40 comprises a field of view ML-44 for enabling a user to see/inspect the image information underneath. The displayed evaluation tool ML-40 further comprises an area ML-43, here ring-shaped, which temporarily conceals the image information underneath. Area ML-43 may be of other than circular shapes as well and comprises the display evaluation functions EVA1, EVA2, which may be selected and/or activated by a user. The output unit 11 is adapted to visualize the evaluation tool ML-40 in different shapes, sizes, and operation states, which will be described in more detail with respect to FIGS. 36, 37 and 38.

However, the output unit 11 is also adapted to present on the display screen an evaluation result window ML-45 which comprises at least one evaluation result RES. The result window ML-45 is preferably presented as an overlay to the displayed target medical image series TMIS and/or the evaluation tool ML-40. For example, the result window ML-45 may be positioned as an overlay to the field of view ML-44 and thus have the same shape as the field of view ML-44. Accordingly, an evaluation result RES may be presented as part of the evaluation tool ML-40. In FIG. 35, the result window ML-45 is displayed next to the evaluation tool ML-40. The output unit 11 is further adapted to present on the display screen at least one operation menu ML-46 (cf. FIG. 38) of the evaluation tool ML-40. The operation menu ML-46 may likewise be displayed as an overlay to the target medical image series TMIS and/or the evaluation tool ML-40. The evaluation tool ML-40 is adapted to be moved within the display screen, i.e., between different positions.

The interface unit 10 thus further comprises an input unit 12 for receiving user input relating to navigating the evaluation tool ML-40 in the displayed image, preferably to a region of interest ROI. The input unit 12 may be realized in the form of a computer mouse, corresponding cursor, and a keyboard. The evaluation tool may, e.g., be navigated by clicking and moving the mouse. The input unit 12 is further adapted to receive a selection of at least one evaluation function EVA of the evaluation tool ML-40. For example, each evaluation function EVA may for selection and/or activation be assigned a key of the keyboard.

Summing up, the output unit 11 may be adapted to graphically visualize a graphical user interface for medical image reading. Furthermore, the output unit 11 may be adapted to visualize an evaluation tool ML-40. The input unit 12 may be adapted to receive user input as regards tool navigation and/or evaluation function selection. Accordingly, the interface unit 10 may further comprise a respective processing unit 13 adapted, e.g., for providing a graphical user interface as laid out above, for displaying a target medical image series TMIS and/or for processing input received from user.

The computing unit 30 is further adapted process the user input received via the interface unit 10. In detail the computing unit 30 is adapted to process the user input to navigate the evaluation tool ML-40 to a selected position, e.g., the region of interest ROI. The computing unit 30 is further adapted to perform at least one selected evaluation function EVA and generate at least one evaluation result RES. The computing unit 30 is also adapted to generate a visualization representation of the evaluation result RES.

Figure 36:
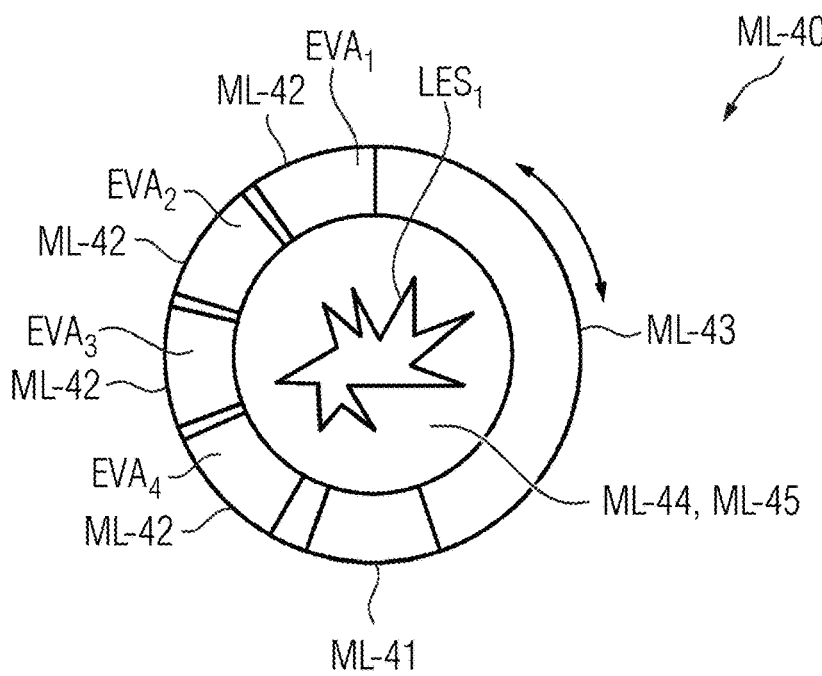
FIG. 36 depicts an evaluation tool according to an embodiment in a first operation state.

FIG. 36 depicts an evaluation tool ML-40 according to an embodiment in a first operation state. This operation state corresponds to an initial state, the evaluation tool ML-40 is in, when the tool is initially visualized, e.g., according to step ML-S20 of the method, as described in more detail with respect to FIG. 39. The evaluation tool ML-40 is depicted here is visualized on or via display screen 11. The evaluation tool ML-40 is displayed as an overlay to a displayed target medical image series TMIS. Deactivation of the evaluation tool ML-40 may immediately hide the tool itself and all its evaluation results RES and thus provide a clear view on the medical image data set MEDI as classically displayed The evaluation tool ML-40 of this embodiment comprises at its center a circular field of view ML-44. The field of view is transparent. In other words, anatomical structures comprised in the target medical image series TMIS displayed at the same time underneath the field of view ML-44, are visible via the field of view ML-44. Here, the evaluation tool ML-40 is positioned at a region of interest ROI comprising a lesion LES1, which is visible via field of view ML-44. Ring ML-43 at the circumference of the evaluation tool ML-40 comprises an activation area 41 or an activation position. This area ML-41 is stationary with respect to the ring ML-43. The ring ML-43 further one or more, here four, ring segments ML-42, wherein each ring segment embodies a specific evaluation function EVA1, EVA2, EVA3, EVA4. The ring segments ML-42 are rotatably arranged such that the ring segments ML-42 may be rotated around a center point of the field of view ML-44 (illustrated by the bidirectional arrow), until one of the evaluation functions EVA1, EVA2, EVA3, EVA4 takes the activation position ML-41. In this embodiment, as soon as the evaluation function is positioned at the activation position ML-41 via rotating movement of the ring segments ML42, the corresponding evaluation function is started.

Rotation of the ring segments may be realized by clicking on one of the ring segments and using the scrolling wheel of the computer mouse. Rotating the ring segments might likewise be replaced by clicking on one of the ring segments using the mouse cursor for choosing an evaluation function by the user.

Figure 37:
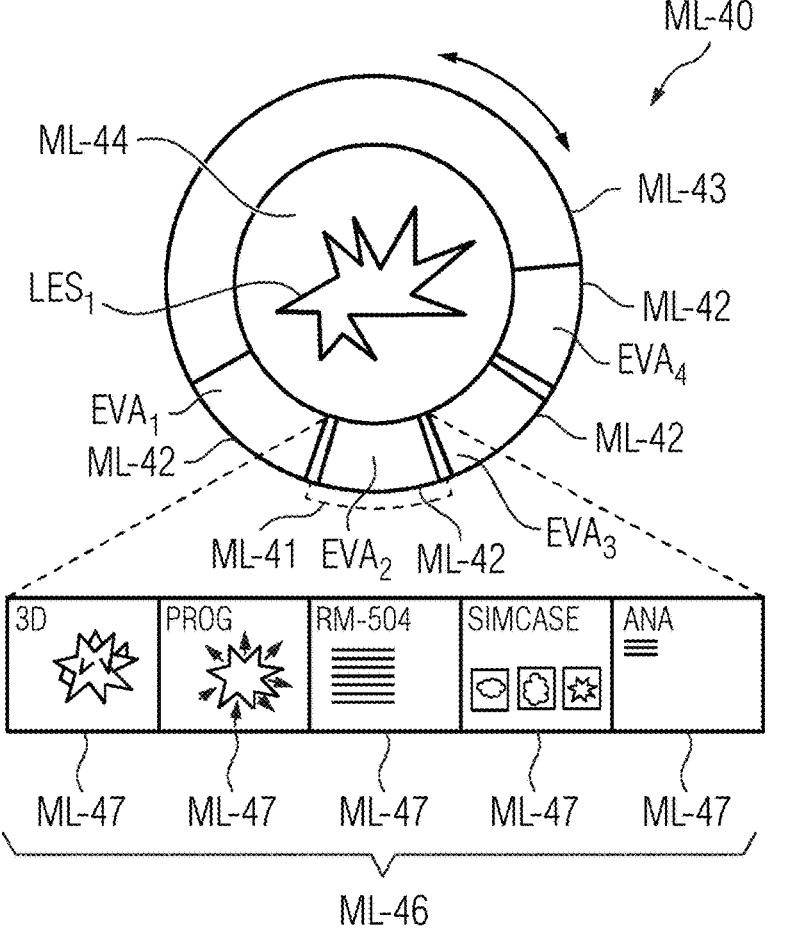
FIG. 37 depicts an evaluation tool according to an embodiment in a second operation state.

FIG. 37 depicts an evaluation tool ML-40 according to the embodiment in a second operation state. This operation state corresponds to a state, the evaluation tool ML-40 is in, when an evaluation function EVA was selected, here evaluation function EVA2 (according to optional step ML-S41 as described with respect to FIG. 5). Evaluation function EVA2 is the at least one evaluation function offering a plurality of different evaluation operations ML-47 to the user. Different, not necessarily all the evaluation operations ML-ML-47, are offered to the user via the display of an operation menu ML-46. The operation menu ML-46 in this embodiment comprises a plurality of operation windows, each window embodying a different evaluation operation ML-47 which upon user selection may be performed on either image element entries and/or additional data. Preferably, as illustrated, each operation window may comprise a picture/symbol/textual indication of the purpose of the evaluation operation ML-47. For example, one operation may be directed to calculating and/or providing based on the displayed medical data set a three-dimensional representation of lesion LES1, e.g., by providing a short video clip of two to ten projection views of lesion LES1, each projection view relating to a slightly different view angle (3D), thereby conveying a three-dimensional impression to the user. This evaluation operation would require a full segmentation of the lesion LES1 within the displayed image data set and might imply data interpolation steps between imaging slices. Another evaluation operation may be directed to providing an image series representing lesion growth or shrinkage (PROG) over time. This evaluation operation implies obtaining a reference study RS and a reference medical image series RMIS therein comprised according one or more of the above examples.

The selection of such additional data is conducted under consideration of at least one image element entry within the region of interest ROI. This evaluation operation might further comprise quantification and color-coding of volume/size changes over time in the image series. The image series might be toggled through in both directions in time, e.g., via mouse scroll wheel or the like, thereby highlighting the changes over time. Also, the image series might be presented to the user as an overlay to the field of view ML-44. Other evaluation operations might by acquiring and presenting to the user at least part of prior reports of the patient under examination RM-504 or a textual representation of a lesion analysis/quantification ANA like diameter, volume, heterogeneity, presence of biomarkers and so forth. As a further alternative, an evaluation operation might acquire and present to the user similar lesions to lesion LES1 from other patients to enable differential diagnosis. Preferably, the search for similar lesions is based on an extracted image feature signature specific for the region of interest ROI.

It goes without saying that each individual evaluation operation ML-47 might be embodied as an evaluation function EVA as well. Accordingly, all exemplary evaluation operations ML-47 might likewise correspond to evaluation functions. Of course, there are more functions/operations possible which are not explicitly mentioned here.

However, grouping evaluation operations ML-47 under one evaluation function EVA might be advantageous in those cases, e.g., where the number of evaluation operations ML-47 would require more and smaller ring segments ML-42 which would impede easy and fast operation of the evaluation tool ML-40. Apart from that grouping of evaluation operations ML-47 under one evaluation function might by performed topic-related. For example, operation functions ML-47 relating to or involving the acquisition and further processing of image data from prior studies of the patient under examination might be grouped under one evaluation function, to foster intuitive usage.

Figure 38:
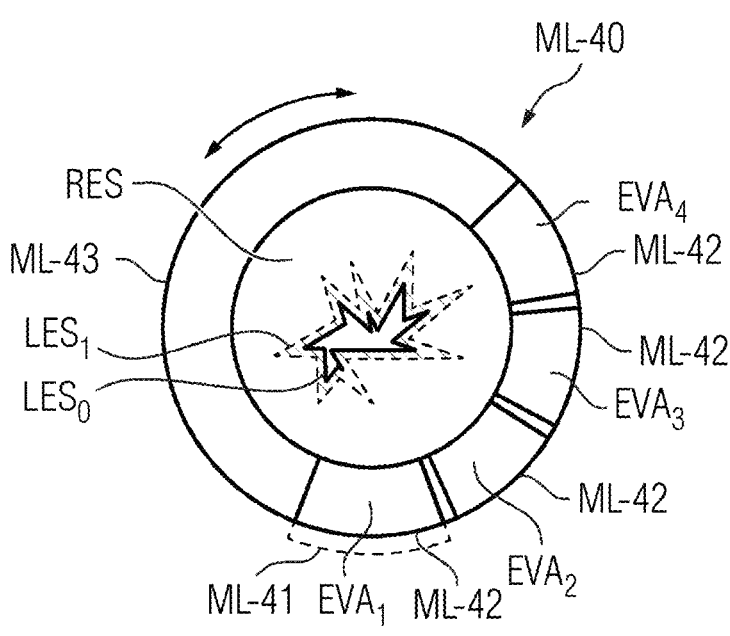
FIG. 38 depicts an evaluation tool according to an embodiment in a third operation state.

FIG. 38 depicts an evaluation tool ML-40 according to an embodiment in a third operation state. This operation state corresponds to a state, the evaluation tool ML-40 is in, when an evaluation function EVA was performed, and an evaluation result RES is displayed to the user via output unit 11 (according to step ML-60 as described with respect to FIG. 39). In this operation state, the graphical user interface thus comprises a field or an area or window as result window ML-45 which comprises the evaluation result RES to be inspected by the user. In this preferable embodiment, an evaluation result RES, e.g., in the form of a highlighted (color-coded, adapted contrast, magnified view or the like) medical image slice, a video clip or image series might be presented within the field of view ML-44 of the evaluation tool ML-40. Here, the evaluation result RES is visualized as an overlay to the field of view ML-44. Here, the evaluation result RES comprises an illustration using color coding of how much lesion LES1 has grown since a last examination. At that time, the lesion only had a size corresponding to LES0. Correspondingly, the dashed area within lesion LES1 illustrates lesion growth or change over time at one glance. Of course, alternatively, the evaluation result RES may be displayed at an arbitrary position within the display screen as an overlay to the displayed target medical image series TMIS as well.

Figure 39:
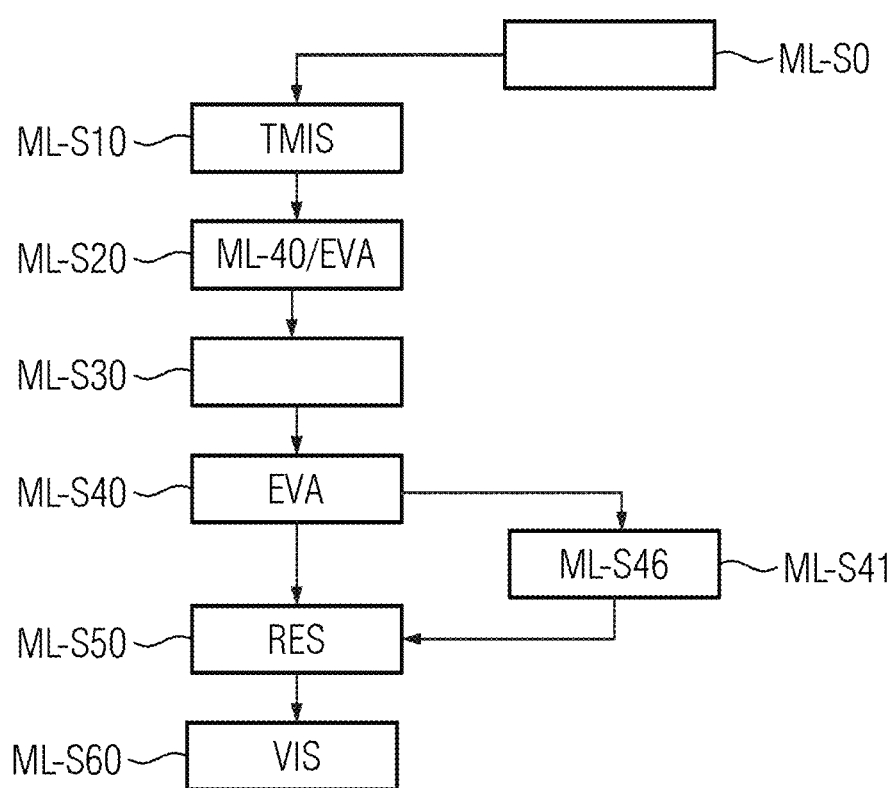
FIG. 39 depicts a flowchart illustrating a method for supporting evaluation of a target medical image series according to an embodiment.

FIG. 39 depicts a method for generating display data of a medical image series according to an embodiment. The method comprises numerous steps. This method is a computer-implemented method.

In a step ML-S10 a display of a target medical image series TMIS is provided to a user via an output unit 11. Preferably, one image slice of the target medical image series TMIS is rendered according to typically applied greyscale window.

In a step ML-S20 an evaluation tool ML-40 is visualized, too. The evaluation tool ML-40 may correspond to the one described with respect to FIGS. 36, 37 and 38. Visualization of the evaluation tool ML-40 is realized as an overlay, i.e., on top of the target medical image series TMIS. Thus, the evaluation tool ML-40 at least temporarily hides some of the displayed image elements, i.e., pixels. In one alternative, the evaluation tool ML-40 may be initially displayed at a preset position within the graphical user interface. For example, the initial position may be at one of the corners of the display screen. The initial position may also be changed or adapted according to user preferences while configuring or setting up the reading application. The evaluation tool ML-40 is adapted to be movably arranged in the displayed image data set ML-40 and to provide at least two evaluation functions EAV with respect to the displayed target medical image series TMIS. With other words, the evaluation tool can be moved around based on user request and corresponding input via input unit 12. Furthermore, display of the evaluation tool ML-40 comprises the display of at least two evaluation functions EVA as described with respect to FIGS. 37 and 38.

In an optional step ML-S0 at least one abnormality, e.g., LES1, may be detected in the target medical image series TMIS. Step S0 may be conducted prior to any of steps ML-S10 or ML-S20. Step ML-S0 may preferably be conducted by computing unit 30. Abnormality detection may comprise applying at least one computer aided detection algorithm to the target medical image series TMIS. Abnormality detection may likewise comprise application of a convolutional neural network to the target medical image series TMIS. Step ML-S0 may also comprise well known as such image segmentation steps.

Step ML-S20 may, according to this option, comprise to automatically display the evaluation tool ML-40 as an overlay to the thus detected abnormality, i.e., as an overlay to the abnormality. Preferably, the abnormality is automatically centered in the transparent field of view ML-44 of the evaluation tool ML-40, like lesion LES1 is with respect to FIGS. 36, 37 and 38. By doing so, the user is visually led to inspect the abnormality. This is particularly advantageous in cases, where an abnormality might be overseen at first glance. As a further alternative or in addition, step S2 may also comprise to visually highlight, e.g., by color coding or by adding a tag providing information on the detected abnormality. Thereby, the user instantaneously is provided diagnostically relevant information on the detected abnormality.

In a step ML-S30 user input relating to navigating the evaluation tool ML-40 in the target medical image series TMIS to a region of interest ROI is received via input unit 12. Here, any kind of input device including microphone or gesture or eye movement control (using at least one camera), may serve for receiving the user input. Step ML-S30 further comprising sending the signals received as user input to the computing unit 30 and there processing the user input to navigate the evaluation tool ML-40 in the target medical image series TMIS to the region of interest ROI. In other words, navigation orders are calculated according to moving the navigation tool ML-40 to a position desired by the user. Preferably, processing takes place instantaneously such that the user may, according to 'drag-and-drop' move the evaluation tool at a position he is wants to examine in detail.

In a step ML-S40 at least one of the displayed evaluation functions EVA is selected. Accordingly, more than one evaluation function EVA can be selected, preferably, consecutively, when at least one result RES relating to a selected evaluation function EVA was already presented via output unit 11 to the user. Preferably, an evaluation result window ML-45 of a previously selected evaluation function EVA may be continued to be presented while another result RES of a further evaluation function EVA is also displayed. Accordingly, step ML-S40 comprises to receive via input unit 12 and process via computing unit 30 user input as regards a desired evaluation function EVA. Selection of an evaluation function EVA further comprises sending an activation request from the interface unit 10 to the computing unit 30.

In an optional step ML-S41 the selection of an evaluation function EVA activates the generation and visualization of an interactive operation menu ML-46 comprising a plurality of operations, i.e., operation functions ML-47 related to the evaluation function EVA. Accordingly, in this alternative, selection of an evaluation function EVA leads the user to another function menu, e.g., a menu as described with respect to FIG. 37. The user can now select at least one of the operation functions ML-47 according to step S4. Selection of an operation function ML-47 likewise comprises sending an activation request from the interface unit 10 to the computing unit 30.

In a step ML-S50 computing unit 30 performs the selected evaluation function EVA/operation function ML-47 and thereby generates a result RES. By performing the evaluation function EVA/operation function ML-47, the computing unit 30 accounts for image data within the region of interest. With other words, the generated evaluation result RES is either based on image data entries of the displayed target medical image series TMIS, particularly the ones within the region of interest ROI or refers to at least one image element within the region of interest ROI, e.g., when the evaluation function comprises acquiring additional image data to be compared to the region of interest ROI. The result RES may comprise evaluation data and/or additional data wherein evaluation data are based on image data within the region of interest ROI and additional data are at least related to image data within the region of interest ROI and retrieved according to any of the methods herein described.

The evaluation result RES may correspond, but is not limited to one of the following types of evaluation results RMIS of a prior reference study RS related to the region of interest ROI, prognosis medical image data indicative of a disease progression the prognosis relating to the region of interest ROI, a video of image data within the region of interest ROI, a three-dimensional view of image data from the target medical image series TMIS within the region of interest ROI, a magnified view of image data from the target medical image series TMIS within the region of interest ROI, an augmented view of image data from the target medical image series TMIS within the region of interest ROI.

In a step ML-S60 a visualization of the evaluation result RES is generated and displayed via output unit 11 to the user. Preferably, the result RES visualized as an overlay to the evaluation tool ML-40, most preferably it is visualized within the field of view ML-44. To this end, evaluation result values may be transformed into a suitable representation for displaying to the user. The suitable representation can be in the form of adapted image element entries for the region of interest or a projection plane to be superimposed to the displayed medical image data set comprising additional information. The suitable representation may further comprise visual rendering of evaluation result windows containing additional data to be displayed as an overlay to any image area of the target medical image series TMIS or the reference medical image series RMIS. Accordingly, computing unit 30 may be configured to run or execute an algorithm for creating an overlay image/window to be superimposed over the target medical image series TMIS. Known volumetric rendering procedures, such as volume ray casting, splatting, shear-wrapping, or texture mapping may be used to generate may further be used to generate the representation.

The present embodiments are particularly advantageous in an oncological application. Here, the computing unit 30 may apply a model-based algorithm to predict disease progression or tumor growth with or without treatment based on at least some image element entries comprised in the region of interest. With other words, in this use case, one evaluation function may comprise applying a model or predictive algorithm to image element entries belonging to a identified lesion or tumor to predict its structural development. The algorithm may further include additional data like patient specific data, e.g., age, gender, genetic information, or the like, which may be requested from the medical information system 40.

As a result, RES of the thus described evaluation function EVA, an image sequence might be displayed to the user, which visualizes lesion growth over time as a video clip. Alternatively or in addition, the user might scroll through the image series to inspect in detail individual images of the series. Thus, embodiments of the disclosure allow to derive profoundly recommendations for follow-up examinations and/or to identify treatment options (by further visualizing potential treatment impact on the lesion).

Embodiments relate to a method and system for image visualization and exploration which may comprise multiple components which interact to provide an easy-to use, fast and intuitive tool for detection and evaluation of suspicious image areas. An interface unit allows the user to view a current imaging volume (in the form of a target medical image series TMIS) and navigate therein (e.g., by scrolling, 3D rotation, navigate through time or the like) and define a region of interest ROI therein. The interface unit 10 may preferably be embodied as part of any PACS review/reading station. Evaluation tools ML-40 as herein described allow inspection of any image area with/without requiring previous labeling of the image. Further, evaluation tools ML-40 as herein described allows to quickly explore relevant supplementary information such as a reference medical image series RMIS on top/next to the image area (ROI) or in separate view. Further, an optimized user interface to allow quick selection/browsing of different supplementary sources of information within one specific imaging context is provided.

Evaluation results, especially in the form of additional data may be visualized as a colorized overlay on top of the selected image area (ROI), e.g., a rotating 3D view, animated lesion growth over multiple examinations, different contrast, textual labels, extended tooltips, views showing visual or textural information next to and/or on top of the ROI.

Optionally, an abnormality detection may include to apply at least one CAD algorithm to automatically detect areas of abnormality in the target medical image series TMIS, the abnormality detection may comprise a query sent to at the medical information system 40 for retrieving previously reported findings with their anatomical position, e.g., as contained in the reference medical image study RS or a medical report RM-504. Abnormality detection may further include displaying or visually indicating potential or known abnormalities and thus catch the user's attention directly within the target medical image series TMIS at the relevant position/region. Abnormality indication may comprise overlay/labeling techniques.

Figure 40:
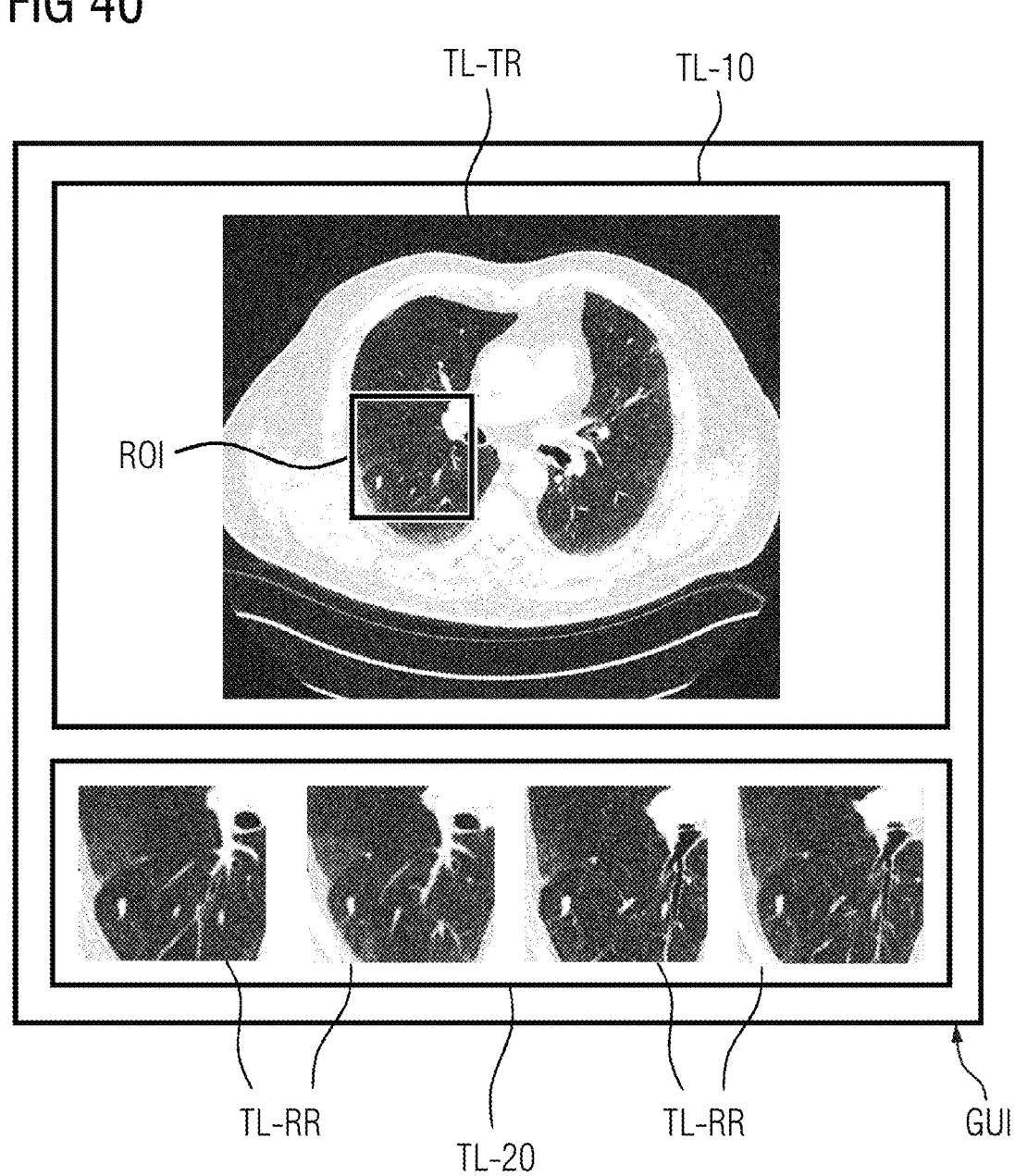
FIG. 40 depicts an evaluation tool for determining and visualizing reference medical image data according to an embodiment.

In FIG. 40, a further embodiment for an evaluation tool in the from of a graphical user interface GUI is shown. In a first display region TL-10 of the graphical user interface GUI, a target representation TL-TR of the target medical image series TMIS is shown. The target representation TL-TR may be based on initial display data generated based on the target medical image series TMIS. The initial display data may cause the graphical user interface GUI to display a rendering of the target medical image series TMIS as the target representation TL-TR. For instance, the target representation TL-TR may be a rendering of an image slice comprised in the target medical image series TMIS. The image slice may be selected by a user, e.g., by scrolling through the target medical image series TMIS. In the first display region TL-10, a region of interest ROI may be defined in the target representation TL-TR. As described, the region of interest ROI may be defined by the user or automatically.

Further, the graphical user interface may comprise a second display region TL-20. In the second display region TL-20, one or more reference representations TL-RR may be displayed. Each reference representation TL-RR may be generated based on a reference medical image series RMIS which may be identified as described before, in particular, in connection with FIGS. 1 to 11. Thereby, different reference representations TL-RR may relate to different reference medical image studies RS and/or different reference medical image series RMIS. Reference representations TL-RR belonging to the same reference medical image study and, thus, substantially to the same point in time, may be highlighted in the same manner, e.g., with a frame around the respective reference representation TL-RR of the same color. Vice versa, reference representations TL-RR of different reference medical image studies may be respectively highlighted in a different manner, e.g., with frames of different colors. If a plurality of different reference representations TL-RR belonging to different points in time is retrieved, the reference representations TF-RR may be displayed in an order according to the point in time they respectively represent. E.g., in the example shown in FIG. 40, the reference representation TL-RR pertaining to the "oldest" reference medical image study RS may be shown in the leftmost spot in the second display region TL-20 and the reference representation TL-RR pertaining to the "most recent" reference medical image study RS may be shown in the rightmost spot in the second display region TL-20, with intermediate reference representations TL-RR ordered in between according to the respective points in time the underlying image data has been acquired from old to more recent.

Each reference representation TL-TR may be based on display data generated based on the respective reference medical image series RMIS. The display data may cause the graphical user interface GUI to display a rendering of the respective reference medical image series TMIS as the reference representation TL-RR. In particular, the display data may be generated based on a registration between the target medical image series TMIS and the respective reference medical image series RMIS so as to identify image data in the respective reference medical image series RMIS which corresponds to the region of interest ROI. As described, this may be carried out by identifying, in the respective reference medical image series RMIS, patterns and corresponding image patches that are similar to the region of interest ROI essentially as described in connection with FIGS. 19 to 26. Alternatively, this may involve identifying, in the respective reference medical image series RMIS, images slices corresponding to the image slice of the region of interest ROI essentially as described in connection with FIGS. 12 to 18 or other image registration techniques. Further, generating the display data may involve cropping the thus identified reference image data to the size of the region of interest ROI. What is shown in the second display region TL-20 are then, in other words, representations of the region of interest ROI at different points in time. Whit that, a sort of a time lens is provided to the user with which she or he can explore the progression of a distinct region of a medical image over time.

The following clauses are also part of the disclosure. Embodiments therein defined may be combined with aspects herein described. Advantages provides in connection with any of the aspects herein described are likewise applicable to corresponding features of the following clauses.

G1. Method for generating display data of a medical image data set, the method comprising:

receiving (S10) a target medical image study (TS) of a patient at a first point in time, wherein the target medical image study (TS) comprises one or more target attribute values (AV) each comprising a text string indicating content of the target medical image study (TS), obtaining (S20) a region of interest (ROI) of the target medical image study (TS);

selecting (S40) a reference medical image study (RS) from a plurality of candidate medical image studies (CS), wherein:

the candidate medical image studies (CS) respectively comprise a plurality of candidate medical image series (CMIS) of the patient at a second point in time, and one or more candidate attribute values (AV) each comprising a text string indicating content of the respective candidate medical image study (CS), and the step of selecting (S40), for each of the candidate medical image studies (CS), is based on a comparison of the target attribute values (AV) and the respective candidate attribute values (AV), selecting (S50), from the plurality of candidate medical image series (CMIS) of the reference medical image study (RS), a reference medical image series (RMIS) based on the region of interest (ROI), and, optionally, based on a comparison of the target attribute values (AV) and the respective candidate attribute values (AV);

identifying (S60) reference image data (REF-SLC) from the reference medical image series (RMIS) based on image similarities between the region of interest (ROI) and image data comprised in the reference medical image series (RMIS); and generating (S70) display data to cause a display device to display a rendering of the reference image data (REF-SLC).

G2. Method according to G1, wherein:—the region of interest (ROI) is an extract of at least a part of a target medical image series (TMIS) comprised in the target medical image study (TS), and the step of selecting (S50), the reference medical image series (RMIS) comprises:

determining, for each candidate medical image series (CMIS) a degree of comparability with the target medical image series (TMIS), and selecting the reference medical image series (RMIS) based on the determined degrees of comparability.

G3. Method according to G2, wherein:

determining the degrees of comparability is based on a comparison of target attribute values (AV) and candidate attribute values (AV).

G4. Method according to any one of points G2 to G3, wherein the target medical image series (TMIS) depicts a target image volume, the reference medical image series (RMIS) depicts a reference image volume at least partially overlapping the target image volume, the method further comprises:

obtaining a plurality of first (or target) slices (S-1) respectively depicting a certain section of the target image volume, obtaining a plurality of second (or reference) slices (S-2) respectively depicting a certain section of the reference image volume, and the step of identifying (S60) reference image data (REF-SLC) comprises:

matching at least a part of the first slices (S-1) with at least a part of the second slices (S-2), and determining the reference image data (REF-SLC) based on the step of matching.

G5. Method according to G4, wherein the step of matching comprises respectively extracting image descriptors (D-1) from each of the first slices (S-1) and corresponding image descriptors (D-2) from each of second slices (S-2), and matching at least a part of the first slices (S-1) with at least a part of the second slices (S-2) based on a comparison of individual image descriptors (D-1) and individual corresponding image descriptors (D-2), the comparison optionally involving determining a degree of image similarity between individual first slices and individual second slices based on the respective image descriptors (D-1) and corresponding image descriptors (D-2).

G6. Method according to any one of the preceding points, wherein the step (S60) of identifying reference image data (REF-SLC) comprises:

extracting an image descriptor (D-1) from the region of interest (ROI) and corresponding image descriptors (D-2) from each of a plurality of image regions (S-2, PM-334, PM-340, PM-440, PM-448) in the reference medical image series (RMIS), and determining, for each image region (S-2, PM-334, PM-340, PM-440, PM-448) in the reference medical image series (RMIS), an image similarity based on the image descriptor (D-1) and the respective corresponding image descriptor (D-2).

S1. Computer-implemented method for identifying corresponding slices of medical image series (TMIS, RMIS), the method comprising the following steps:

receiving a first medical image series (TMIS);

receiving a second medical image series (RMIS) different from the first medical image series (TMIS), wherein the second medical image series (RMIS) depicts a second image volume, providing a trained function (TF) configured to determine a similarity between two-dimensional medical images;

identifying, from a plurality of slices (S-2) comprised/defined in the second medical image set (RMIS), the slices respectively depicting a certain section of the second image volume, at least one corresponding slice corresponding to image data comprised in the first medical image series (TMIS) by evaluating image similarities between the first and second medical image series (TMIS, RMIS) using the trained function (TF).

S2. Computer-implemented method for identifying corresponding slices of medical image series (TMIS, RMIS), the method comprising the following steps:

receiving a first medical image series (TMIS);

receiving a second medical image series (RMIS) different from the first medical image series (TMIS), wherein the second medical image series (RMIS) depicts a second image volume, identifying (S120, S120'), from a plurality of slices (S-2) comprised in the second medical image series (RMIS), the slices respectively depicting a certain section of the second image volume, at least one corresponding slice based on degrees of image similarity between the image data comprised in the first medical image series (TMIS) and individual slices of the second medical image series (RMIS).

S3. Method according to S1 or S2, wherein the first medical image series (TMIS) depicts a first image volume at least partially overlapping with the second image volume and comprises a plurality of slices (S-1) respectively depicting a certain section of the first image volume (a plurality of slices is defined in the first medical image series); and the step of identifying the at least one corresponding slice comprises:

identifying for each of a plurality of slices (S-1) of the first medical image series (TMIS) one corresponding slice of the second medical image series (RMIS) by evaluating similarities between the first and second medical image series (TMIS, RMIS) using the trained function (TF) so as to provide a slice correspondence between the first and second medical image series (TMIS, RMIS).

S4. Method according to S3, further with the steps:

determining an anatomical overlap between the first and second image volumes based on the identified slice correspondence (CS);

evaluating a degree of comparability of the second medical image series (RMIS) with the first medical image series (TMIS) (TMIS) based on the determined anatomical overlap;

providing the degree of comparability to a user via a user interface.

S5. Method according to any one of points S3 or S4, further with the steps of receiving an input from a user indicative of a selection of a slice of the first medical image series (TMIS) in order to designate a selected slice and/or to define a region of interest (ROI);

identifying, from the plurality of slices (S-2) of the second medical image series (RMIS), the slice corresponding to the selected slice and/or the region of interest (ROI) based on the identified slice correspondence; and providing the slice (REF-SLC) corresponding to the selected slice.

S6. Method according to any of points S3 to S5, wherein in the step of identifying for each of a plurality of slices (S-1) of the first medical image series (TMIS) one corresponding slice of the second medical image series (RMIS), one or more of the following constraints are additionally being used:

an overall degree of similarity is maximized, the overall degree of image similarity being a measure for the cumulative image similarity of individual slice pairs of first and second medical image series (TMIS, RMIS); and/or slice order of first and/or second medical image series (TMIS, RMIS) is retained.

S7. Method according to any of the preceding points, further with the steps:

extracting an image descriptor (D-1) from image data of the first medical image series (TMIS);

respectively extracting (S123) a corresponding image descriptor (D-2) from each of a plurality of slices (S-2) of the second medical image series (RMIS);

wherein the degrees of image similarity are respectively based on a comparison between the extracted image descriptors (D-1, D-2) of first and second medical image series (CMIS) (MIDS-1, MIDS-2).

S8. Method according to any of the preceding points, wherein the trained function (TF) is further configured to respectively extract image descriptors (D-1, D-2) from two-dimensional medical images and determine an image similarity between two-medical medical images based on the extracted image descriptors (D-1, D-2), wherein the method comprises:

extracting at least an image descriptor (D-1) from the first medical image series (TMIS) by applying the trained function (TF) to the first medical image series (TMIS);

extracting an image descriptor (D-2) from each of a plurality of slices (S-2) of the second medical image series RMIS) by applying the trained function (TF) to the second medical image series RMIS);

wherein the at least one corresponding slice (REF-SLC) is identified based on the extracted image descriptors (D-1, D-2) by the trained function (TF).

S9. Method according to S7 or S8, wherein the first medical image series (TMIS) the first medical image series (TMIS) depicts a first image volume at least partially overlapping with the second image volume and comprises a plurality of slices (S-1) respectively depicting a certain section of the first image volume and the method further comprises the step of:

extracting an image descriptor (D-1) from each of a plurality of slices (S-1) of the first medical image series (TMIS), optionally, by the trained function (TF).

S10. Method according to any of the preceding points, wherein the trained function (TF) applies a learned metric to determine the similarity between two-dimensional medical images, the trained function preferably comprising a deep metric learning network.

S11. Method according to any of the preceding points, wherein the trained function (TF) comprises a Siamese network and/or a triplet network.

S12. Method according to any of the preceding points, wherein the trained function (TF) has been trained using a triplet loss function or a contrasting loss function.

S13. Computer-implemented method for determining a degree of comparability of medical image series (TMIS, CMIS);

receiving a first medical image series (TMIS), first medical image series (TMIS) depicting a first image volume of a patient at a first point in time and comprising a plurality of slices (S-1) respectively depicting a certain section of the first image volume;

receiving a plurality of second medical image series (CMIS), each second medical image series depicting a second image volume of the patient at respective second points in time different than the first point in time and comprising a plurality of slices (S-2) respectively depicting a certain section of the second image volumes first and second medical image series (CMIS);

providing a trained function (TF) configured to determine an image similarity between two-dimensional medical images;

for each second medical image series (CMIS):

identifying those slices having a corresponding slice in the first medical image series (TMIS) as overlapping slices by evaluating image similarities between the first and second medical image series (CMIS) using the trained function; and determining an anatomical overlap between the first image volume and the second image volume of the respective second medical image series (CMIS) based on the overlapping slices;

determining a degree of comparability for each of the second medical image series (CMIS) with the first medical image series (TMIS) based on the determined anatomical overlaps.

S14. Computer-implemented method for identifying corresponding slices of medical image series (TMIS, RMIS), the method comprising the following steps:

receiving a first medical image series (TMIS);

receiving a second medical image series (RMIS) different from the first medical image series (TMIS);

identifying, from a plurality of slices (S-2) comprised in the second medical image series (RMIS), at least one corresponding slice based on degrees of image similarity between the image data comprised in the first medical image series (TMIS) and individual slices of the second medical image series (RMIS).

S15. Method according to S14, wherein the first medical image series (TMIS) comprises a plurality of slices (S-1); and the step of identifying the at least one corresponding slice comprises:

identifying for each of a plurality of slices (S-1) of the first medical image series (TMIS) one corresponding slice of the second medical image series (RMIS) so as to determine a slice correspondence between the first and second medical image series (TMIS, RMIS), with the degrees of image similarity being respectively based on an image similarity between an individual slice (S-1) of the first medical image series (TMIS) and an individual slice (S-2) of the second medical image series (RMIS).

S16. Method according to claim S15, further with the steps:

determining an anatomical overlap between the image volume of first medical image series (TMIS) and the image volume of the respective second medical image series (RMIS) based on the identified slice correspondence;

evaluating a degree of comparability of the second medical image series (RMIS) with the first medical image series (TMIS) based on the determined anatomical overlap;

providing the degree of comparability to a user via a user interface.

S17. Method according to S15 or S16, further with the steps of receiving an input from a user indicative of a selection of a slice of the first medical image series (TMIS) in order to designate a selected slice and/or a region of interest (ROI);

identifying, from the plurality of slices (S-2) of the second medical image series (RMIS), the slice (REF-SLC) corresponding to the selected slice based on the identified slice correspondence; and providing the slice (REF-SLC) corresponding to the selected slice.

B1. Computer implemented method of determining a body region (408) represented by medical imaging data (ID, TMIS, RMIS) stored in a first medical image study (TS), the first medical image study (TS) further storing one or more attributes (A) each having an attribute value (AV) comprising a text string indicating content of the medical imaging data (ID), the method comprising:

obtaining one or more of the text strings of the first medical image study (TS);

inputting the obtained one or more text strings into a trained machine learning model (406), the machine learning model having been trained to output a body region based on an input of one or more such text strings, and obtaining the output (408) from the trained machine learning model thereby to determine the body region represented by the first medical image study (TS).

B2. Method according to B1, wherein the method comprises:

comparing a first body region (408) represented by first medical imaging data (ID, TMIS) stored in the first medical image study (TS) with each of a plurality of second body regions (720) represented by a respective plurality of sets of second medical imaging data (ID, CMIS) stored in a respective plurality of second medical image study (CS), each second medical image study (CS) further storing one or more attributes (A) each having an attribute value (AV) comprising a text string (716) indicating content of the second medical imaging data (ID, CMIS) stored in the second medical image study (CS); and selecting one or more of the second medical image studies (CS) as relevant (i.e., as reference medical image study RS) to the first medical image study (TS) based on the comparison of the body regions;

wherein the first body region is determined by applying steps (a) and (b) to the one or more text strings of the first medical image study (TS); and/or wherein at least one of the second body regions is determined by applying steps (a) and (b) to the one or more text strings of a respective at least one of the second medical image studies (CS).

B3. The computer implemented method according to B2, wherein the plurality of sets of second medical imaging data are stored in a remote storage device, and the method comprises:

retrieving the selected one or more sets of second medical imaging data (ID, RMIS), or selected second medical image studies (RS) including the selected one or more sets of second medical imaging data (ID, RMIS), from the remote storage device without retrieving other ones of the plurality of second medical image studies (CS).

B4. Method according to B2 or B3, wherein the method comprises:

generating display data to cause a display device to display a rendering of the first medical imaging data (ID, TMIS) and a rendering of one or more of the selected or retrieved sets of second medical imaging data (ID, RMIS).

B5. Method according to any one of B2 to B4, wherein the method comprises:

determining, for each of the plurality of medical image series (CMIS) comprised in the selected second medical image study (RS), an imaging modality relevance score between a first imaging modality of the first medical imaging data (ID, TMIS) and a second imaging modality of the medical image series (CMIS); and wherein selecting the one or more of the second medical image studies (CS) further comprises selecting at least one of the plurality of medical image series as relevant to the first medical imaging data (i.e., as relevant medical image series) based on the determined imaging modality relevance score.

B6. The computer implemented method according to B5, wherein the imaging modality relevance score is determined using an imaging modality transition matrix, wherein each element of the imaging modality transition matrix represents a respective probability, determined based on statistical analysis of logged user interaction with medical imaging data, that given first medical imaging data associated with a particular first imaging modality a user will select for comparison with the first medical imaging data second medical imaging data having a particular second imaging modality.

B7. Method according to any one of B2 to B6, wherein each of the first and second medical image studies (TS, CS) stores one or more attributes each having an attribute value indicative of an imaging parameter used to capture the medical imaging data of the medical image study (TS, CS), wherein the method comprises:

for each of a plurality of medical image series (CMIS) of the selected second medical image study (RS), determining a similarity metric indicative of the similarity between a first vector (FV), generated based on one or more of the attribute values indicative of an imaging parameter used to capture the image data (ID, TMIS) of the first medical image study (TS), and a second vector (SV) generated based on one or more of the attribute values indicative of an imaging parameter used to capture the respective medical image series (CMIS) of the selected second medical image study (RS); and wherein selecting the one or more of the second medical image studies (CS) further comprises selecting at least one of the plurality of medical image series (CMIS) as relevant to the first medical imaging data is based on the determined similarity metric.

B8. Method according to any one of B1 to B7, wherein the trained machine learning model is a trained neural network.

B9. Method according to B8, wherein the trained neural network comprises a trained character-based neural network configured to take as: input individual characters of the obtained one or more text strings, whereby inputting the obtained one or more text strings into the trained neural network comprises inputting individual characters of the obtained one or more text strings into the trained character-based neural network.

B10. Method according to B8 or B9, wherein the trained neural network is configured to output the body region in the form of one or more numerical values, representing a region of a human body, that a regressor portion of the trained neural network has calculated for the input one or more text strings.

B11. Method according to any one of B8 to B10, wherein the neural network has been trained using a training data set comprising a plurality of training text strings, each training text string being from an attribute value of an attribute of an image file and indicating content of medical imaging data further stored in the medical image study, each of the plurality of training text strings being labelled with a body region to which the training text string corresponds, the label being used a supervisory signal in the training of the neural network.

B12. Method according to B11, wherein the training data set has been generated using a Graphical User Interface, GUI, configured to: present one or more of the training text strings and a representation of a human body divided into selectable body regions to a user; and for each of the one or more presented training text strings, receive a user input selecting a body region from the representation, and label the training text string with a label indicating the selected body region.

B13. Method according to any one of the preceding points, wherein the or each of the medical image studies (TS, CS, RS) comprises a DICOM file (300), and the one or more attributes (A) having attribute values (AV) comprising text strings indicating content of the medical imaging data thereof comprise one or more of the DICOM attributes 'Study Description', 'Series Description' and 'Body Part Examined'.

Wherever meaningful, individual embodiments or their individual aspects and features can be combined or exchanged with one another without limiting or widening the scope of the present invention. Advantages which are described with respect to one embodiment of the present invention are, wherever applicable, also advantageous to other embodiments of the present invention.

The invention claimed is:

1. A method for generating display data of a medical image data set, the method comprising:

receiving a target medical image series of a patient at a first point in time;

determining a target body region represented by the target medical image series;

selecting a reference medical image study from a plurality of candidate medical image studies based on a comparison of the target body region with a plurality of candidate body regions, wherein each of the plurality of candidate body regions corresponds to one of the plurality of candidate medical image studies and each candidate medical image study comprises a plurality of candidate medical image series of the patient at a second point in time, the selecting the reference medical image study from the plurality of candidate medical image studies including identifying, from the plurality of candidate medical image studies, a plurality of relevant medical image studies based on the comparison of the target body region with the plurality of candidate body regions, providing an indication of the plurality of relevant medical image studies to a user via a user interface, receiving a user selection via the user interface, the user selection indicating at least one of the plurality of relevant medical image studies, and selecting the at least one of the plurality of relevant medical image studies as the reference medical image study;

selecting, from the plurality of candidate medical image series of the reference medical image study, a reference medical image series based on a degree of comparability with the target medical image series;

performing a registration of the target medical image series and the reference medical image series; and generating display data to cause a display device to display a rendering of the reference medical image series based on the registration.

2. The method of claim 1, wherein the target medical image series and each of the plurality of candidate medical image studies are respectively associated to one or more attributes each having an attribute value comprising a text string indicating content of the target medical image series or context of a candidate medical image study of the plurality of candidate medical image studies, and at least one of, (i) the determining the target body region includes, obtaining one or more text strings of the target medical image series, and inputting the one or more text strings of the target medical image series into a trained machine learning model, the trained machine learning model trained to output a body region based on an input of the one or more text strings, and obtaining an output from the trained machine learning model to determine the body region represented by the target medical image series; or (ii) at least one of the plurality of candidate body regions is determined by, obtaining one or more text strings of the candidate medical image study, and inputting the one or more text strings of the candidate medical image study into the trained machine learning model and obtaining an output from the trained machine learning model to determine the at least one of the plurality of candidate body regions.

3. The method of claim 2, wherein the trained machine learning model is a trained neural network comprising a trained character-based neural network configured to take as input individual characters of the one or more text strings of the target medical image series or the one or more text strings of the candidate medical image study, and inputting the one or more text strings of the target medical image series or the one or more text strings of the candidate medical image study into the trained neural network comprises inputting individual characters of the one or more text strings of the target medical image series or the one or more text strings of the candidate medical image study into the trained character-based neural network.

4. The method of claim 1, wherein each of the target medical image series and the plurality of candidate medical image series are associated with one or more attributes each having an attribute value indicative of an imaging parameter used to capture the target medical image series or a candidate medical image series of the plurality of candidate medical image series; and the degree of comparability is based on determining a correspondence of one or more attribute values between the target medical image series and a respective one of the plurality of candidate medical image series.

5. The method of claim 1, wherein determining the degree of comparability comprises:

obtaining, for the target medical image series, a first feature vector;

obtaining, for each candidate medical image series comprised in the reference medical image study, a second feature vector; and determining a comparability metric indicative of the degree of comparability between the first feature vector and the second feature vector.

6. The method of claim 5, wherein the first feature vector includes an indication of an imaging modality of the target medical image series and the second feature vector includes an indication of an imaging modality of a candidate medical image data series of the plurality of candidate medical image series; and the comparability metric comprises an imaging modality relevance score between the imaging modality of the target medical image series and the imaging modality of the candidate medical image data series.

7. The method of claim 1, further comprising:

obtaining a region of interest of the target medical image series, wherein the reference medical image series depicts a reference image volume, the method further comprising obtaining a plurality of candidate slices respectively depicting a certain section of the reference image volume, the performing the registration comprises identifying, from the plurality of candidate slices, at least one reference slice based on degrees of similarity between image data comprised in the region of interest and individual candidate slices of the plurality of candidate slices, and the generating the display data causes the display device to display a rendering of the at least one reference slice.

8. The method of claim 7, further comprising:

extracting an image descriptor from the target medical image series; and extracting a corresponding image descriptor from each of the plurality of candidate slices, wherein the degrees of similarity are respectively based on a comparison between the image descriptor of the target medical image series and the image descriptor of each of the plurality of candidate slices.

9. The method of claim 7, wherein the identifying the at least one reference slice comprises applying a trained function on the target medical image series and the reference medical image series, and the trained function is adapted to determine degrees of similarities between two-dimensional medical images.

10. The method of claim 1, further comprising:

obtaining a region of interest of the target medical image series, wherein the performing the registration comprises:

generating a first local image descriptor based on image data of the region of interest;

generating a second local image descriptor for each of a plurality of candidate locations in the reference medical image series, each second local image descriptor being generated based on image data of the reference medical image series located relative to a respective candidate location of the plurality of candidate locations;

calculating local image similarity metrics indicating a degree of similarity between the first local image descriptor and the second local image descriptor for each of the plurality of candidate locations;

selecting a candidate location from among the plurality of candidate locations based on the local image similarity metrics; and determining a location corresponding to the region of interest in the reference medical image series based on the candidate location, wherein the generating the display data includes generating the rendering based on image data of the reference medical image series relative to the candidate location.

11. The method of claim 1, wherein the identifying the plurality of relevant medical image studies comprises determining, for each relevant medical image study of the plurality of relevant medical image studies, a degree of conformance with the target medical image series based on the comparison of the target body region with the plurality of candidate body regions; and the providing the indication of the plurality of relevant medical image studies provides the degree of conformance for each of the plurality of relevant medical image studies to the user via the user interface, wherein the degree of conformance is based on an anatomical overlap between the target medical image series and the plurality of relevant medical image studies based on the comparison of the target body region and the plurality of candidate body regions.

12. The method of claim 1, further comprising:

obtaining a region of interest of the target medical image series, wherein the reference medical image study comprises one or more annotations corresponding to the reference medical image series and the method further comprises:

obtaining, from the one or more annotations, a reference annotation relevant for at least one of the target medical image series or the region of interest, and annotating the target medical image series or the region of interest with the reference annotation, the reference annotation including one or more first words.

13. The method of claim 12, further comprising:

obtaining a medical report associated with the reference medical image study;

obtaining one or more sections of text of the medical report, each section comprising one or more second words;

for each of the one or more sections and the reference annotation, comparing one or more of the one or more second words to the one or more first words of the reference annotation to identify a match; and associating the reference annotation with at least one of the one or more sections based on the match.

14. The method of claim 1, further comprising:

identifying the user to be provided with the display data; and obtaining one or more prior actions of the user, the one or more prior actions being directed to at least one of, a study selection action of selecting a reference medical image study from a plurality of candidate medical image studies, or a series selecting action of selecting a reference medical image series from a plurality of candidate medical image series of a medical image study;

wherein at least one of the selecting the reference medical image study or the selecting the reference medical image series are based on the one or more prior actions.

15. A system for supporting evaluation of a target medical image series of a patient acquired at a first point in time, the system comprising:

an interface unit configured to provide a rendering of the target medical image series to a user; and a computing unit configured to cause the system to, determine a target body region represented by the target medical image series, select a reference medical image study from a plurality of candidate medical image studies based on a comparison of the target body region with a plurality of candidate body regions, wherein each of the plurality of candidate body regions corresponds to one of the plurality of candidate medical image studies and each candidate medical image study comprises a plurality of candidate medical image series of the patient at a second point in time, selecting the reference medical image study from the plurality of candidate medical image studies including identifying, from the plurality of candidate medical image studies, a plurality of relevant medical image studies based on the comparison of the target body region with the plurality of candidate body regions, providing an indication of the plurality of relevant medical image studies to the user via the interface unit, receiving a user selection via the interface unit, the user selection indicating at least one of the plurality of relevant medical image studies, and selecting the at least one of the plurality of relevant medical image studies as the reference medical image study, select, from the plurality of candidate medical image series of the reference medical image study, a reference medical image series based on a degree of comparability with the target medical image series, perform a registration of the target medical image series and the reference medical image series, and generate display data to cause the interface unit to display a rendering of the reference medical image series based on the registration.

16. A computer program product comprising program elements that, when executed by a computing unit of a system for supporting evaluation of a medical image series, cause the system to perform the method of claim 1.

17. A non-transitory computer-readable medium having program elements that, when executed by a computing unit of a system for supporting evaluation of a medical image series, cause the system to perform the method of claim 1.

* * * * *